US011041464B1

(12) United States Patent
Michael et al.

(10) Patent No.: US 11,041,464 B1
(45) Date of Patent: Jun. 22, 2021

(54) MICROWAVE FLAME ENHANCEMENT OF ENERGETIC MATERIAL COMBUSTION

(71) Applicant: Iowa State University Research Foundation, Inc., Ames, IA (US)

(72) Inventors: James B. Michael, Ames, IA (US); Travis R. Sippel, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 891 days.

(21) Appl. No.: 15/452,531

(22) Filed: Mar. 7, 2017

Related U.S. Application Data

(60) Provisional application No. 62/304,767, filed on Mar. 7, 2016.

(51) Int. Cl.
| | |
|---|---|
| *F02K 9/95* | (2006.01) |
| *C06B 21/00* | (2006.01) |
| *F02K 9/24* | (2006.01) |

(52) U.S. Cl.
CPC ............ *F02K 9/95* (2013.01); *C06B 21/0058* (2013.01); *C06B 21/0066* (2013.01); *F02K 9/24* (2013.01)

(58) Field of Classification Search
CPC ................................ F02K 9/95; F02P 23/045
See application file for complete search history.

(56) References Cited

U.S. PATENT DOCUMENTS

| | | | | |
|---|---|---|---|---|
| 6,152,039 A | * | 11/2000 | Lee ........................... | F02K 9/95 |
| | | | | 102/200 |
| 2002/0020477 A1 | * | 2/2002 | Moser, Jr. ............. | C06B 45/105 |
| | | | | 149/19.5 |
| 2006/0011083 A1 | | 1/2006 | Perry et al. | |
| 2014/0227548 A1 | * | 8/2014 | Myrick ................... | C06B 45/30 |
| | | | | 428/570 |

FOREIGN PATENT DOCUMENTS

DE    19944415509 A1    11/1995

OTHER PUBLICATIONS

Michael "Subcritical microwave coupling to femtosecond and picosecond laser ionization for localized, multipoint ignition of methane/air mixtures" (Year: 2010).*
Chakravarthy "Mechanism of Burning Rate Enhancement of Composite Solid Propellants by Ferric Oxide" (Year: 1997).*
Wikipedia Energetic material (Year: 2012).*
Barkley, S.J., et al., "Pulsed Microwave Enhancement of Doped Composite Solid Propellants", presented at the 55th AIAA Aerospace Sciences Meeting, Grapevine, Texas, Jan. 9-13, 2017, pp. 1-8.
Barkley, S.J., et al., "Microwave-Supported Plasma Combustion Enhancement of Composite Solid Propellants Using Alkali Metal Dopants", presented at the 54th AIAA Aerospace Sciences Meeting, San Diego, CA, Jan. 4-8, 2016, pp. 1-9.

(Continued)

*Primary Examiner* — Gerald L Sung
*Assistant Examiner* — William L Breazeal
(74) *Attorney, Agent, or Firm* — McKee, Voorhees & Sease, PLC

(57) ABSTRACT

Apparatus, systems, and methods for enhancing solid propellant performance include seeding combusting energetic material, including solid propellant, with microwave energy at a controlled power and duration.

19 Claims, 32 Drawing Sheets
(22 of 32 Drawing Sheet(s) Filed in Color)

(56) References Cited

OTHER PUBLICATIONS

Barkley, S.J., et al., "Measurements of Dielectric Properties of Condensed Phase Aluminized Composite Propellants", presented at the 52nd AIAA/SAE/ASEE Joint Propulsion Conference, Salt Lake City, UT, Jul. 25-27, 2016, pp. 1-7.

Barkley, S.J., et al., "Microwave Seeded Plasma Enhancement of Composite Propellant Flame Temperature", presented at the 52nd AIAA/SAE/ASEE Joint Propulsion Conference, Salt Lake City, UT, Jul. 25-27, 2016, pp. 1-11.

Barkley, et al., "Microwave-Supported Plasma Combustion Enhancement of Composite Solid Propellants Using Alkali Metal Dopants," American Institute of Aeronautics and Astronautics (16 pages). Date unknown.

Sippel, et al, "Interaction of Pulsed Microwave Plasma with Alkali Metal Doped Propellant Combusion Flames," IPDR, (27 pages). Jun. 4, 2015.

Barkley, et al., "Pulsed Microwave Plasma Burning Rate Enhancement of Composite Solid Propellants," PowerPoint presentation, 2016 Aerospace Space Sciences Meeting, San Diego, CA, 25 pages. Jan. 5, 2016.

Sippel, et al., "Pulsed Microwave Plasma Burning Rate Enhancement of Composite Solid Propellants," PowerPoint presentation, 10 pages. May 13, 2015.

Sippel, et al., "Pulsed Microwave Plasma Burning Rate Enhancement of Composite Solid Propellants," PowerPoint presentation, 2015 Space Propulsion and Power Contractors Meeting, 15 pages. Sep. 30, 2015.

Barkley, et al., "Microwave-Supported Plasma Combustion Enhancement of Composite Solid Propellants Using Alkali Metal Dopants," American Institute of Aeronautics and Astronautics (9 pages). Date unknown.

Li, et al., "Plasma Ignition and Combustion of JA2 Propellant," Journal of Propulsion and Power, vol. 21, No. 1, Jan.-Feb. 2005, 10 pages. Apr. 29, 2004.

Li, et al., "Recombination of Electrothermal Plasma and Decomposition of Plasma-Exposed Propellants," Journal of Propulsion and Power, vol. 22, No. 6, Nov.-Dec. 2006, 9 pages. Jan. 27, 2006.

Porwitzky, et al. "On the Mechanism of Energy Transfer in the Plasma-Propellant Interaction," Propellants, Explosives, Pyrotechnics 32, No. 5, (2007), p. 385-391. Oct. 19, 2006.

Li, et al., "Interaction Features of Different Propellants Under Plasma Impingement," Journal of Applied Physics 112, 9 pages. Sep. 19, 2012.

Stockman, et al., "Measurements of Combustion Properties in a Microwave Enhanced Flame," Combustion and Flame 156, www.elsevier.com/locate/combustflame, p. 1453-1461. May 13, 2009.

Michael, et al., "Subcritical Microwave Coupling to Femtosecond and Picosecond Laser Ionization for Localized, Multipoint Ignition of Methane/Air Mixtures," Journal of Applied Physics 108, 093308, 4 pages. Nov. 10, 2010.

Michael, et al., "Subcritical Microwave Coupling to Femtosecond and Picosecond Laser Ionization for Localized, Multipoint Ignition of Methane/Air Mixtures," Journal of Applied Physics 108, 093308, 10 pages. Nov. 10, 2010.

Michael, et al., "Sustained Propagation of Ultra-Lean Methane/Air Flames with Pulsed Microwave Energy Deposition," Combustion and Flame 160, www.elsevier.com/locate/combustflame, p. 796-807. Jan. 15, 2013.

Lynch, et al., "Microwave-Supported Plasma Combustion Enhancement of Composite Solid Propellants Using Alkali Metal Dopants," American Institute of Aeronautics and Astronautics, 7 pages. Date unknown.

* cited by examiner

Exterior (left) and interior cut-away (center) diagram of existing propellant combustion vessel. Right: Schematic of propellant combustion vessel with installed microwave waveguide for microwave-plasma enhancement.

Left: Chamber state equilibrium flame cation, anion, and electron concentration of a $NaNO_3$-doped (3.5 wt.%) composite propellant flame. Right: Plot of the same, indicating the primary source of $Na+$ Left, (a): Image sequence of the flame structure of a NaNO₃-doped propellant (16 wt.%) burning at 1 atm pressure without microwave application. Right, (b): Image sequence of the same propellant burning at 1 atm pressure under the influence of 1 kW, 2.45 GHz continuous microwave application within an uncharacterized, multimode cavity.

Atmospheric pressure emission intensity (588.9 nm) from non-microwave enhanced propellant combustion as a function of flame height.

Still frame image sequence of atomic sodium filtered (589 nm, 10 nm FWHM) microwave plasma flame enhancement occurring from interaction with combustion of a bimodal AP composite propellant (3.5 wt.% NaNO3). Image exposure is 20 μs and false color is used to better indicate emission intensity.

Still frame image sequence of atomic sodium (589 nm, 10 nm FWHM) microwave plasma flame enhancement occurring from interaction with combustion of a coarse AP (200 μm) composite propellant (3.5 wt.% NaNO3). Image exposure is 20 μs and false color is used to better indicate emission intensity.

FIGURE 10 mock up diagram of one embodiment of the invention

FIGURE 11 BACKGROUND diagram showing strand-type solid propellant set up

FIGURE 12: Illustrations of a throttleable thruster

FIGURE 13 -- BACKGROUND: general illustration of a solid propellant rocket.

FIGURE 14 -schematic of solid propellant composite

FIGURE 15—flow chart of method of making solid propellant

MICROWAVE FLAME ENHANCEMENT OF ENERGETIC MATERIAL COMBUSTION

CROSS REFERENCE TO RELATED APPLICATIONS

This application claims the benefit of U.S. Provisional Application Ser. No. 62/304,767 filed Mar. 7, 2016, which is incorporated by reference herein in its entirety.

GOVERNMENT RIGHTS

This invention was made with government support under United States Air Force contract no. FA9550-15-1-0195 and FA9550-15-1-0481. The Government has certain rights in the invention.

I. BACKGROUND OF THE INVENTION

A. Field of the Invention

The present invention relates to energetic materials including but not limited to propellants and pyrotechnics and their use and, in particular, to enhancement of combustion of the same.

B. Problems in the Art

Energetic materials have a variety of uses. Several examples are explosives, pyrotechnic compositions, rocket propellants, and other energy generation compositions. Energetic materials are used as propellants in one class of material having a high amount of stored chemical energy that can be released. Achieving increasing the power output from an energetic material (e.g. thrust of a rocket motor) is not necessary trivial, as typical techniques beyond traditional catalysis routes involve the use of nanostructured fuel and/or oxidizer materials to reduce diffusion distances and enhance combustion rate. However, nanostructured ingredients (e.g. metallic fuels) can reduce the overall energy density of an energetic material and their incorporation throughout can result in deleterious effects to an energetic material's mechanical properties and uncured mix viscosity. Therefore, substantial work in this technical area is ongoing and has wide implications.

For example, some energetic materials are more suited for certain applications than others due to the variation in chemical reactions. The controlling rate of combustion is one critical factor that can come into play in designing a propellant and defining its applications. While combustion rate is typically defined by compositions, situations exist where in situ control of the combustion process is desired to tailor device performance to specific applications. The development of 'smart' energetic materials capable of being dynamically controlled may enable new device functionalities (e.g. solid rocket motor thrust control, propellant flame extinguishment, and light emission control) through enabling non-steady state device operation.

The study of non-equilibrium propellant combustion phenomena as well as the development of propellant burning rate control/extinguishment strategies necessitates the development of techniques capable of rapidly perturbing either the gas or condensed phase regime to far-from-equilibrium states. Propellant combustion control techniques which have been used to date in order to gain combustion control of either motors or subscale propellant strand combustion include pressure control (e.g. pintle nozzles or rapid depressurization quench) 1, infrared laser irradiation of the burning surface 2, development of inherently unstable combustion chamber geometries (producing either local pressure or velocity perturbations) 3, and the use of hydroxylammonium nitrate (HAN)-based formulations that have voltage potential sensitive burning rates 4. Some of these techniques suffer from drawbacks in that they are 'single shot' techniques capable of producing only a single (rather than series of) perturbations, are specific to low performance formulations, or are not easily implemented in motor configurations.

The use of plasmas for propellant ignition and burning rate enhancement has been studied previously in electrothermal-chemical (ETC) gun launch systems. In ETC propellant systems, plasma enhancement has led to improvements in flame spread, pressurization rate, and propellant burning rate 5,6. Recent studies suggest that the burning rate enhancement afforded by ETC plasmas is both thermal and ablative 7-9. Burning rate enhancements of up to 21% have been experimentally observed 9, and computational studies suggest much higher burning rate enhancement may be possible with higher propellant solid loading 10. However, arc discharge techniques (e.g. capillary plasma generation) are capable only of single plasma injections, have limited volume (10's of centimeters in length) 11, and cannot afford sustained plasma control over long combustion durations. As such, arc discharge plasmas cannot easily throttle motor-scale propellant combustion.

Pulsed microwave plasmas are a disruptive technology with which to gain control authority over combustion processes in order to enable the study of non-equilibrium combustion processes and could overcome the drawbacks of arc discharge or continuous-wave microwave generation. Pulsed microwave sources operate with high peak power and low duty cycle, allowing rapid generation of plasmas from volumes of high electron number density. High peak power (>100 kW) microwave sources are commercially available in the S- and X-band range (2-12 GHz), providing long wavelengths relative to typical reaction zones (mm to cm). Pulsed sources offer highly flexible operation with the ability to vary peak power, duty cycle, frequency, and pulse width. One strategy for pulsed microwave plasma generation involves operating in a subcritical regime, below the threshold for ionization in the ambient gas. This strategy allows for preferential coupling to regions of high ionization while avoiding parasitic gas breakdown and absorption at other locations 12-14 This strategy has previously been demonstrated for both laser generated ionization 12,15 and in atmospheric pressure hydrocarbon flames. Further, the microwave transparency of many propellants 16,17 would enable uniform plasma generation in complex grain shapes and multi-segment motors. The use of microwave plasmas within motors for control may also enable throttling of higher performance propellant formulations (e.g. aluminized composites) that have flame temperatures too high to be easily controlled with pintle nozzles. However, to our knowledge, there exists no published, thorough investigation on the electronic structure of propellant flames or their interaction with microwave radiation, which are critical to enabling use of microwave-supported plasmas in study of non-equilibrium propellant combustion and development of microwave-based solid propellant burning rate control techniques.

Therefore, prior work has been reported involving plasma ignition and combustion, including with solid propellants. Examples and details can be found in the following set of references, each incorporated by reference in its entirety, with background information for the present invention. See, e.g.:

Li, J., Litzinger, T. A., and Thynell, S. T., "Plasma Ignition and Combustion of JA2 Propellant," *J. Propul. Power*, vol. 21, 2005, pp. 44-53

Li, J, Litzinger, T. A., Das M., and Thynell, S. T., Recombination of Electrothermal Plasma and Decomposition of Plasma-Exposed Propellants, *J. Propul. Power*, vol. 22, No. 6, 2006, 1353-1361

Porwitzky, A. J., Keidar, M., and Boyd, I. D., "On the Mechanism of Energy Transfer in the Plasma-Propellant Interaction," *Propellants Explosives Pyrotechnics*, vol. 32, 2007, pp. 385-391

Li, X., Li, R., Jia, S., and Zhang, Y., "Interaction features of different propellants under plasma impingement," *Journal of Applied Physics*, vol. 112, 2012, p. 063303

Additionally, work has been reported regarding enhancement of ignition of energetic materials by microwave heating (see, e.g., Perry et al. U.S. Published Patent Application US 2006/0011083 A1, Jan. 19, 2006, incorporated by reference in its entirety) and use of microwave energy for enhancing combustion of gas/air fuel mixtures (see, e.g., Stockman E S, Zaidi S H, Miles R B, Carter C D, Ryan M D. Measurements of Combustion Properties in a Microwave Enhanced Flame. Combust Flame 2009; 156:1453-61), incorporated by reference herein). In particular, one of the present inventors has worked with use of microwave energy to enhance the combustion of methane/air flames. See Michael, J. B., Dogariu, A., Shneider, M. N., and Miles, R. B., "Subcritical microwave coupling to femtosecond and picosecond laser ionization for localized, multipoint ignition of methane/air mixtures," *Journal of Applied Physics*, vol. 108, 2010, p. 093308 incorporated by reference herein; and Michael et al. "Sustained Propagation of Ultra-Lean Methane/Air Flames with Pulsed Microwave Energy Deposition", COMBUSTION AND FLAME. 2013 April, V. 160, No. 4. Elsevier, p. 796-807, incorporated by reference herein.

Solid propellants have advantages over other types of energetic materials for certain applications in that they are capable of the highest mass/volume fractions and highest thrust/weight ratios of any fielded propulsion systems. In comparison to other propulsion systems, solid propellants are highly reliable due to their simplicity. Solid propellants are generally formed into composite fuel/oxidizer grain structures, the ignition of which facilitates controlled burning.

As can be seen by the foregoing, including the investigations in the Reference Appendices, this technical field is complex. There are many factors that must be evaluated. Some are antagonistic to others.

The inventors, in this work, have therefore concentrated on techniques to improve performance of energetic materials as propellants, including solid propellants.

II. SUMMARY OF THE INVENTION

A. Object of the Invention

It is therefore a principle object, feature, aspect, or advantage of the present invention to provide systems, methods, and apparatus which improve over or solve problems and deficiencies in the art.

Other objects, features, aspects, or advantages of the present invention include systems, methods, and apparatus as above described which provide for one or more of:

Improved performance (e.g. flame temperature or burning rate) of solid fueled propellants;

Improved understanding and control of combustion and use of solid propellants;

Applicability to wide range of solid propellant formulations and applications;

Applicability to a range of different energetic material compositions (e.g. propellants and pyrotechnic) compositions having high theoretical performance.

Unobtrusive control over solid propellant/energetic material burning rate without requiring the use of moving parts or actuators within the high temperature flame environment;

A system which can be implemented with relatively low-power, low-weight sub-systems.

B. Aspects of the Invention

One aspect of the invention are apparatus, methods, and systems using specific techniques of controlled use of microwave energy to enhance combustion of energetic materials. In one example, the microwave energy consists of low field strength, continuous/quasi-continuous energy and the energetic material is doped with ionization promoting materials. In another example, the microwave energy is pulsed regardless of whether the energetic material is doped or undoped. The microwave energy is generated and targeted to ionizing flame regions in a manner designed to enhance combustion.

Another aspect of the invention is controlled targeting of microwave energy to flames from combusting solid energetic material. The energetic material is doped with the material which is an ionizing enhancer (e.g. alkali metal based). By control of the microwave energy and dopant/dopant concentration, microwave coupling is promoted within ionizing regions of a propellant flame to deposit microwave energy to gas phase flames. Energy deposition to the flame improves burning rate, flame speed, and/or combustion performance of the propellant.

In another aspect of the invention, a method of making a solid phase propellant amenable to microwave enhancement comprises milling a starting material (e.g. sodium nitrate NaNO3) to desired grain size, mixing the milled grains with aluminum, ammonium perchlorate (AP), and a binder (e.g. hydroxyl-terminated polybutadiene (HTPB)), and forming the mixture into a composite solid propellant form factor. The solid propellant is amenable to improved performance by coupling to the microwave energy.

A further aspect of the invention comprises utilizing the system and/or propellant described above in a variety of applications. One example is as a rocket motor system. Another example is in research applications for optimizing propellant performance or studying dynamic combustion of propellants.

Further objects, features, aspects, and advantages of the present invention will become more apparent with reference to the accompanying specification and claims.

III. BRIEF DESCRIPTION OF THE DRAWINGS

The patent or application file contains at least one drawing executed in color. Copies of this patent or patent application publication with color drawing(s) will be provided by the Office upon request and payment of the necessary fee.

In particular, many of the figures are imaged flames or heat, some colorized, which cannot practicably be illustrated in line drawings.

IV. DETAILED DESCRIPTION OF EXEMPLARY EMBODIMENTS OF THE INVENTION

A. Overview

For a better understanding of the invention, several forms and examples will now be described in detail. The following descriptions refer frequently to the drawings. It is to be understood, however, that the invention can take many forms of embodiments and are not limited necessarily to the examples that follow.

Figure 11:
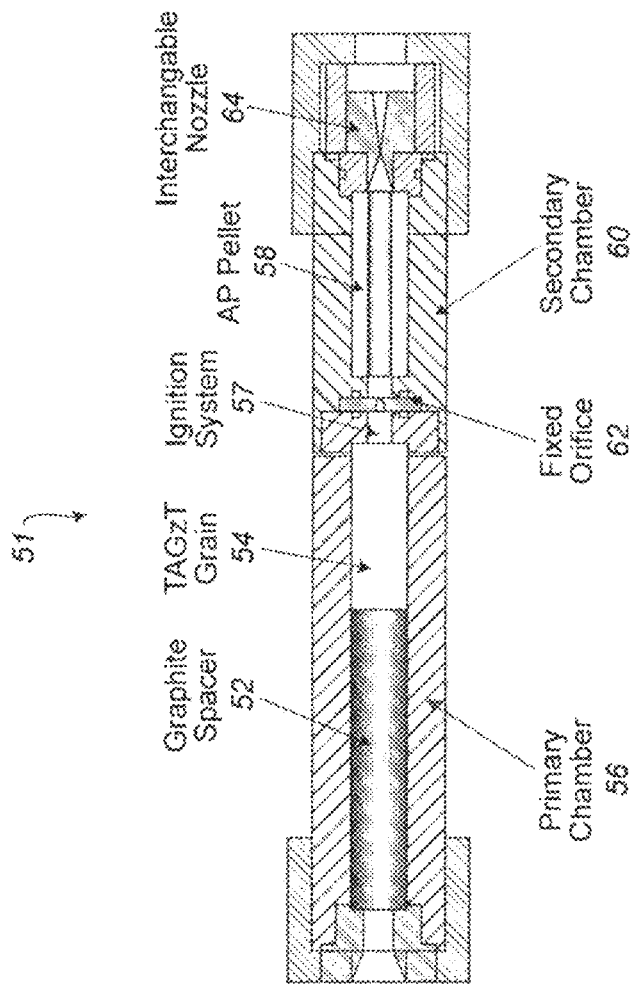
FIGS. 11 to 13 are background information comprising diagrams of how solid propellant, including granular form solid fuel grains, which can be configured as is known in the art, generally illustrating a few non-limiting examples of where the present invention might be applied.
Figure 12:
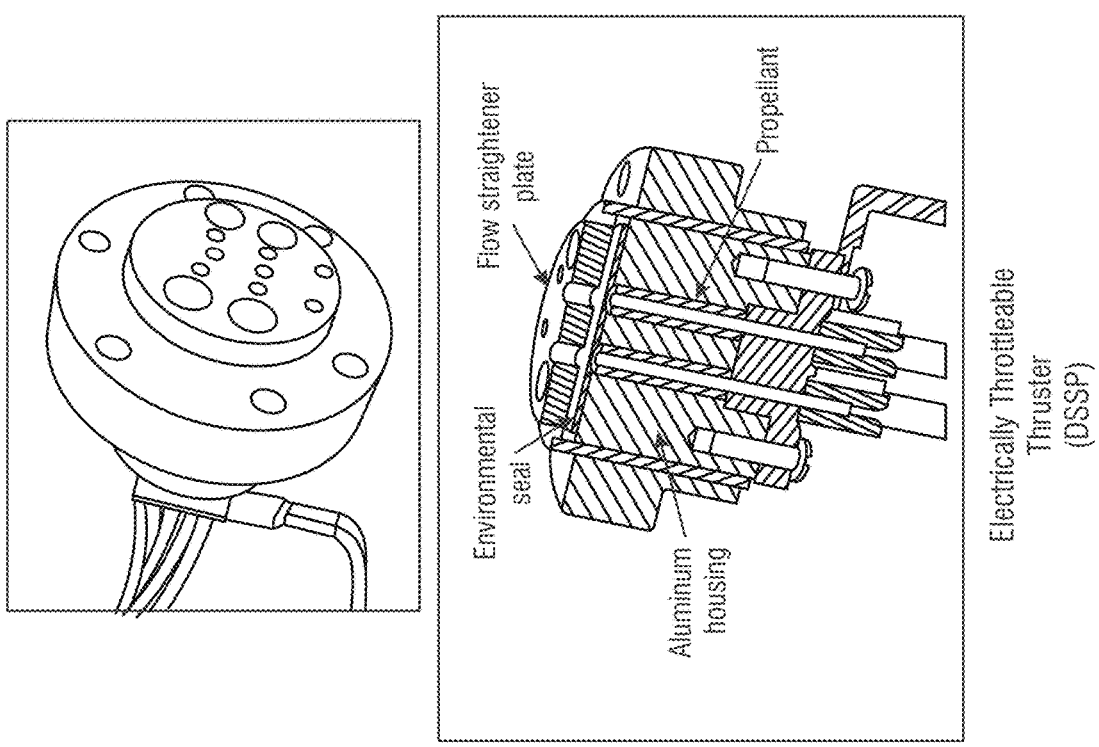
Figure 13:
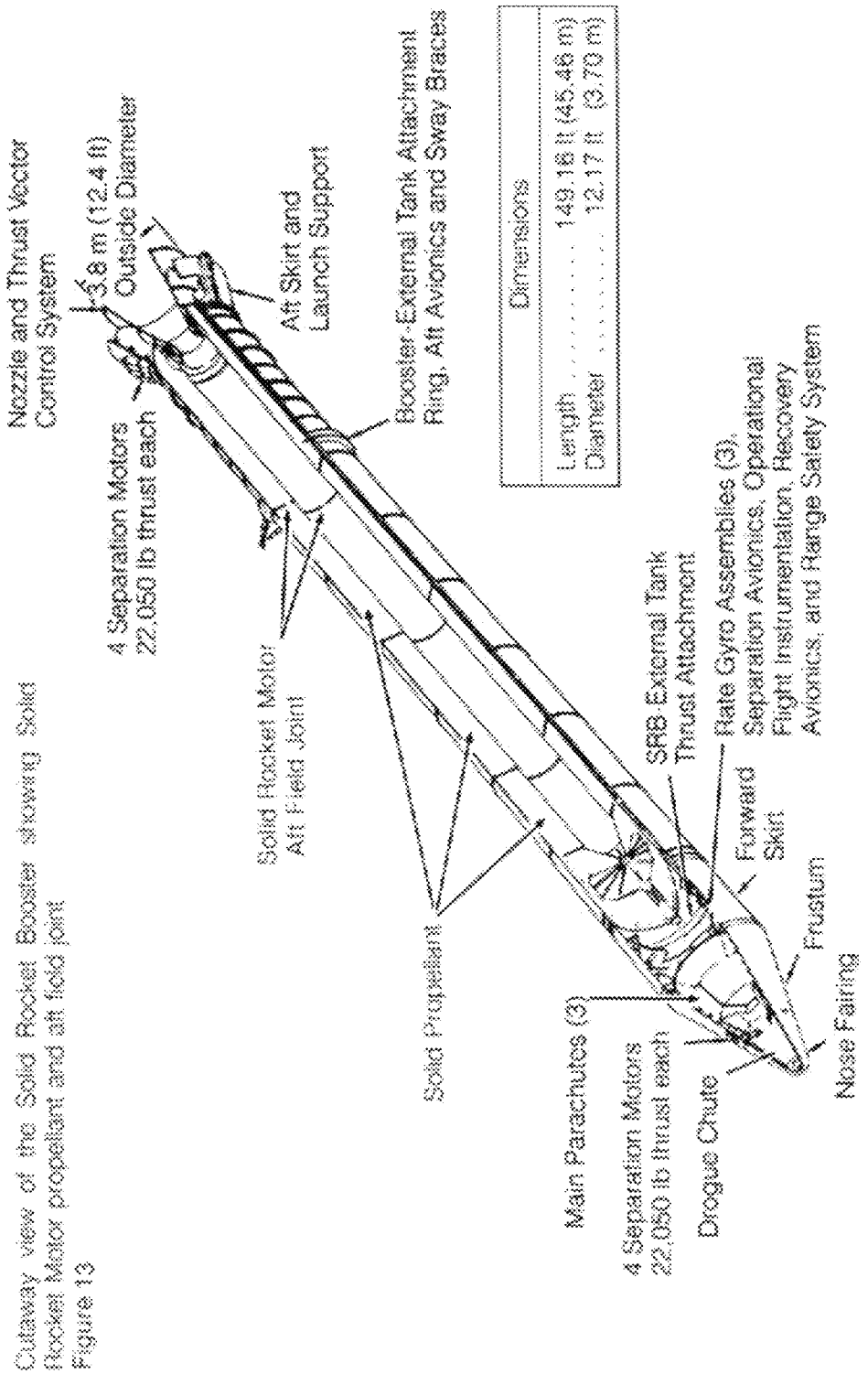

Examples of solid propellants and uses therefore can be found in some of the references in the Background of the Invention, supra. This can vary from a lab bench-top scale combustion vessel to rocket stages for atmospheric or space travel. FIGS. 11-13 are from available literature and show solid propellant can be utilized in such applications as various stages of large rockets (FIG. 13), as the main thrust source (FIG. 12) or in pellet or strand form in a small vessel. (FIG. 11). As will be appreciated by those skilled in the art, these are neither exclusive nor inclusive of all possible applications of aspects of the invention. In these contexts, the invention has the potential of improving the utility of a motor or the propellant, as well as having other advantages and benefits.

B. Generalized System According to Invention

It is to be understood that aspects of the invention may be applied in different ways and combinations. As discussed earlier, while the suggestion of use of microwaves to enhance combustion as been made, room for improvement has been identified.

For example, in one aspect, the specific control of microwave energy relative combustion can produce enhancements to combustion for a variety of energetic materials. In another aspect, enhancements to energetic material can be from different modes of microwave energy. One example is continuous wave versus pulsed. In another aspect, doping of the energetic material may improve microwave enhancement. Doping with an alkali metal in solid propellant is one example. In another example, selection and design of microwave energy may vary according to the type of energetic material.

Therefore, it is to be understood that at a general level, the invention can be applied in a variety of ways. Design and application of microwave energy can be adjusted and varied for different situations and energetic materials. Different energetic materials can be amended or produced to better take advantage of the application of microwaves.

Figure 10:
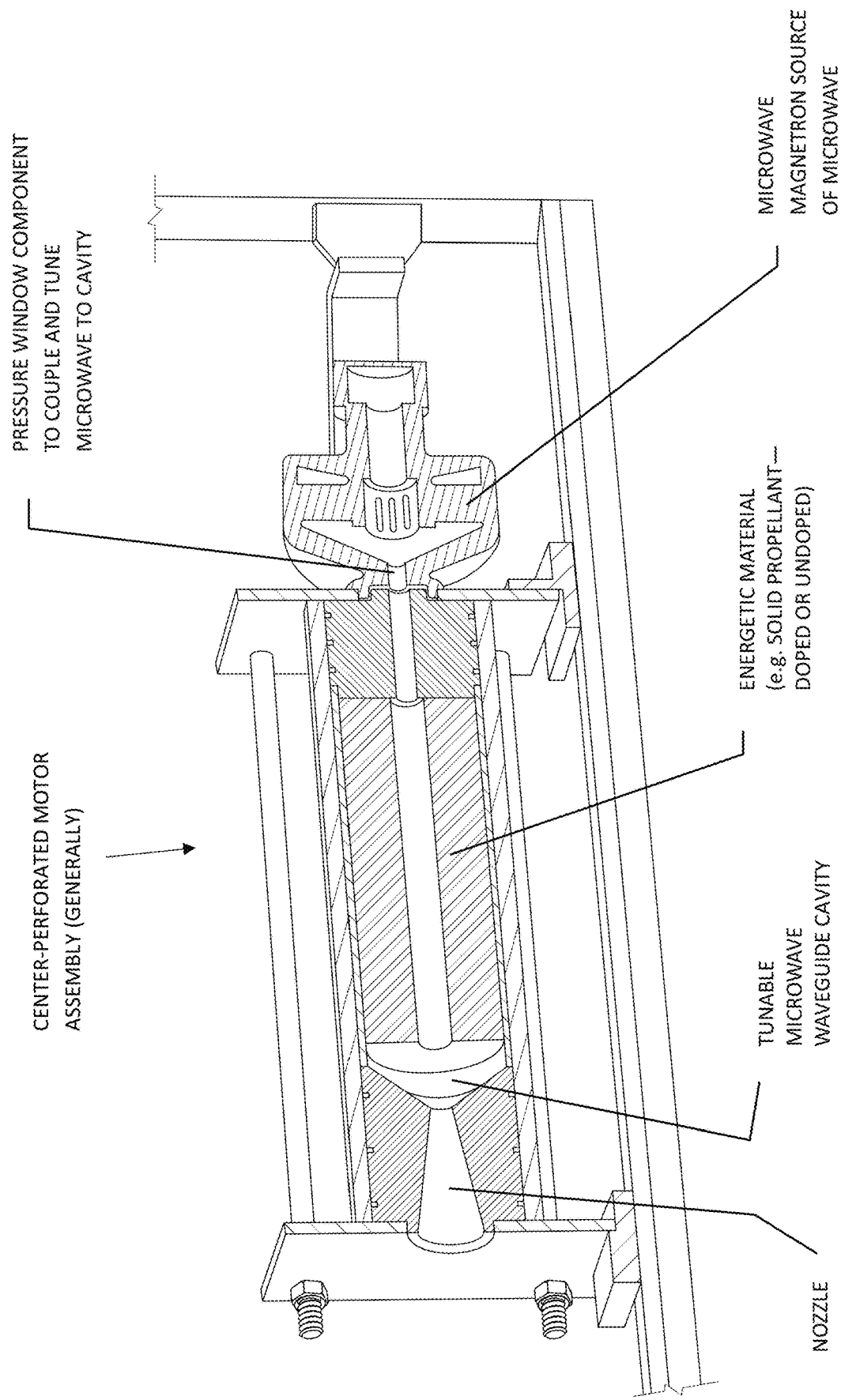
FIG. 10 is a sectioned 3D model of a lab scale rocket motor showing in diagrammatic form addition of a controlled microwave source according to aspects of the present invention.

For example, FIG. 10 is a solid model illustration of a center-perforated motor using solid propellant. The invention can be applied to other energetic systems in other forms. Examples include hybrid rocket motors and gas generators.

FIG. 10 indicates that the energetic material could be doped or undoped. Aspects of the invention include both. Examples of doping can be found in the specific embodiments. Importantly, aspects of the invention are indicated to apply to at least some undoped energetic materials, including some undoped solid propellants. The mode or other parameters of the generated microwaves used may vary depending on whether the fuel is doped or not.

FIG. 10 also indicates that this application would include a microwave generator. One form is a magnetron. Others are possible. Examples include an inductive coil or a klystron tube. The source of microwave irradiation would be isolated from the combustion environment using a microwave transparent window material such as poly(tetrafluoroethylene) or quartz.

FIG. 10 also indicates that the microwave energy mode of application can vary. One example is continuous wave. Another is pulsed. It is to understood that the designer also can select the operational parameters of the microwave energy. For example, as further discussed in the specific embodiments, pulsed mode at higher peak power may provide sufficient combustion enhancement but at lower overall power usage.

Thus, in general, aspects of the invention pertain to the use of microwaves to enhance combustion of energetic materials based on the discoveries and insights set forth herein. The specific examples that follow to inform the reader of a variety, but neither inclusive nor exclusive, of different applications, microwave modes, energetic material compositions, and combinations of the foregoing, relevant to the invention.

C. Specific Example 1 (FIGS. 1-10)

This first example is with reference to FIGS. 1 to 10. It is in the context of an energetic material in the form of a solid composite propellant and microwaves in continuous wave mode in an experimental setup. The example is proof of concept of enhancement of combustion.

Figure 1:
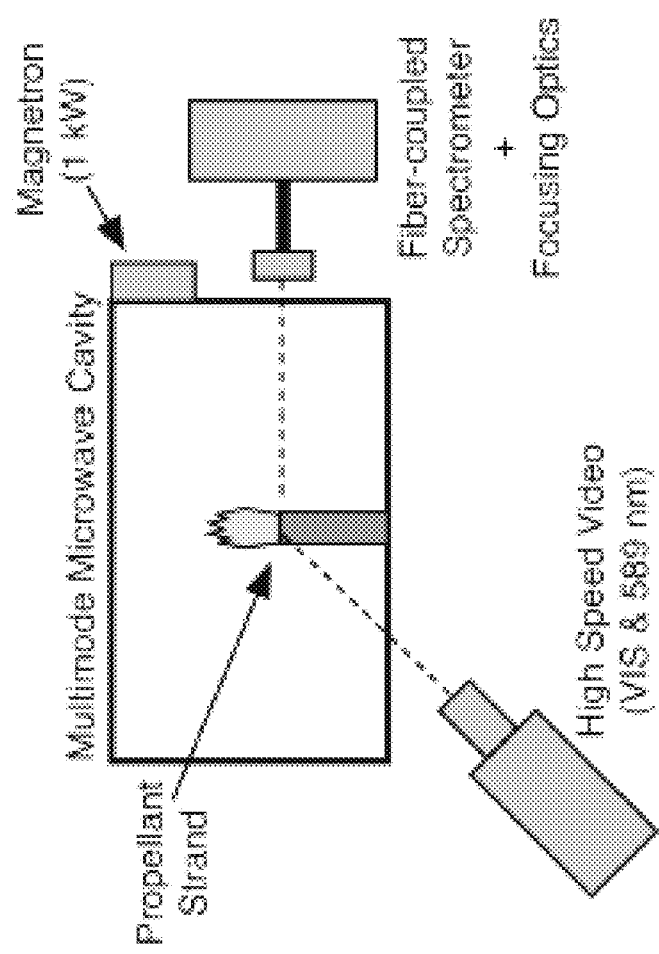
FIGS. 1-3 are several views of a propellant combustion chamber with an installed microwave waveguide for demonstrating microwave—plasma enhancement according to aspects of the present invention.
Figure 2:
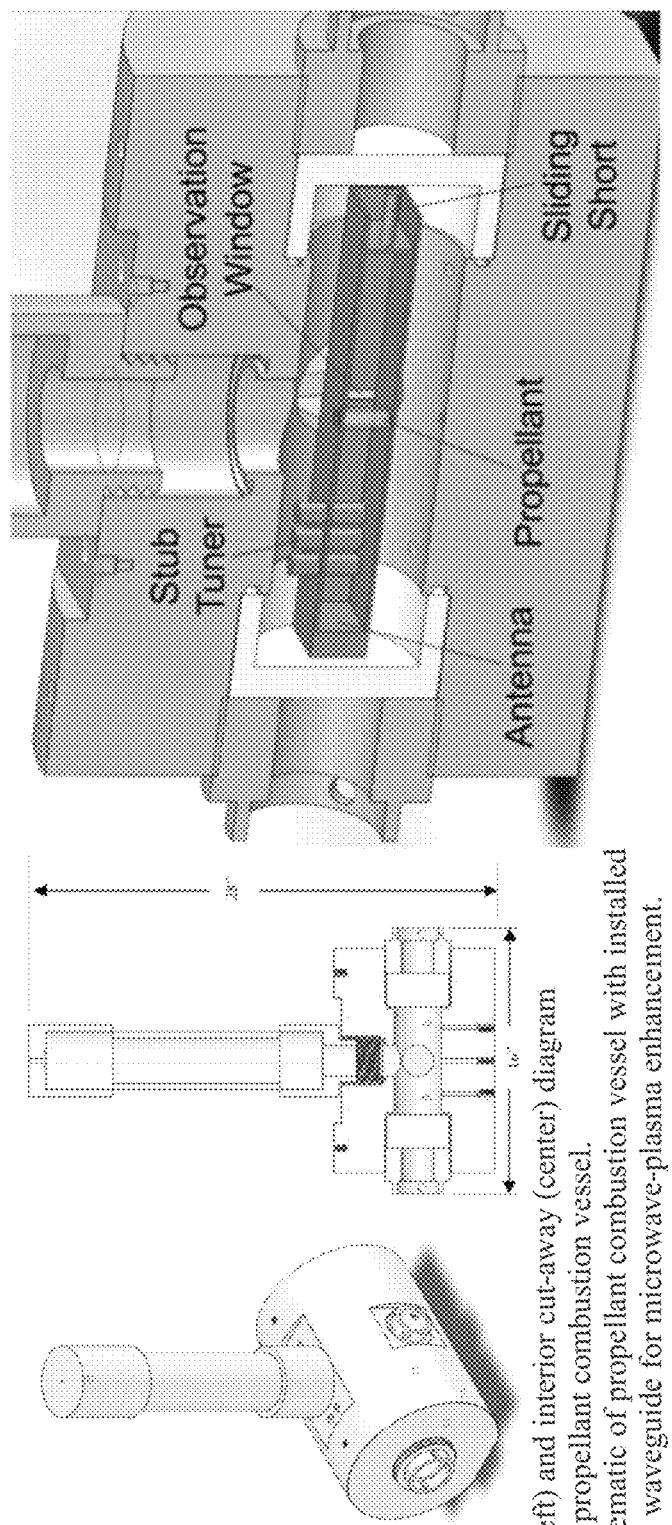
Figure 3:
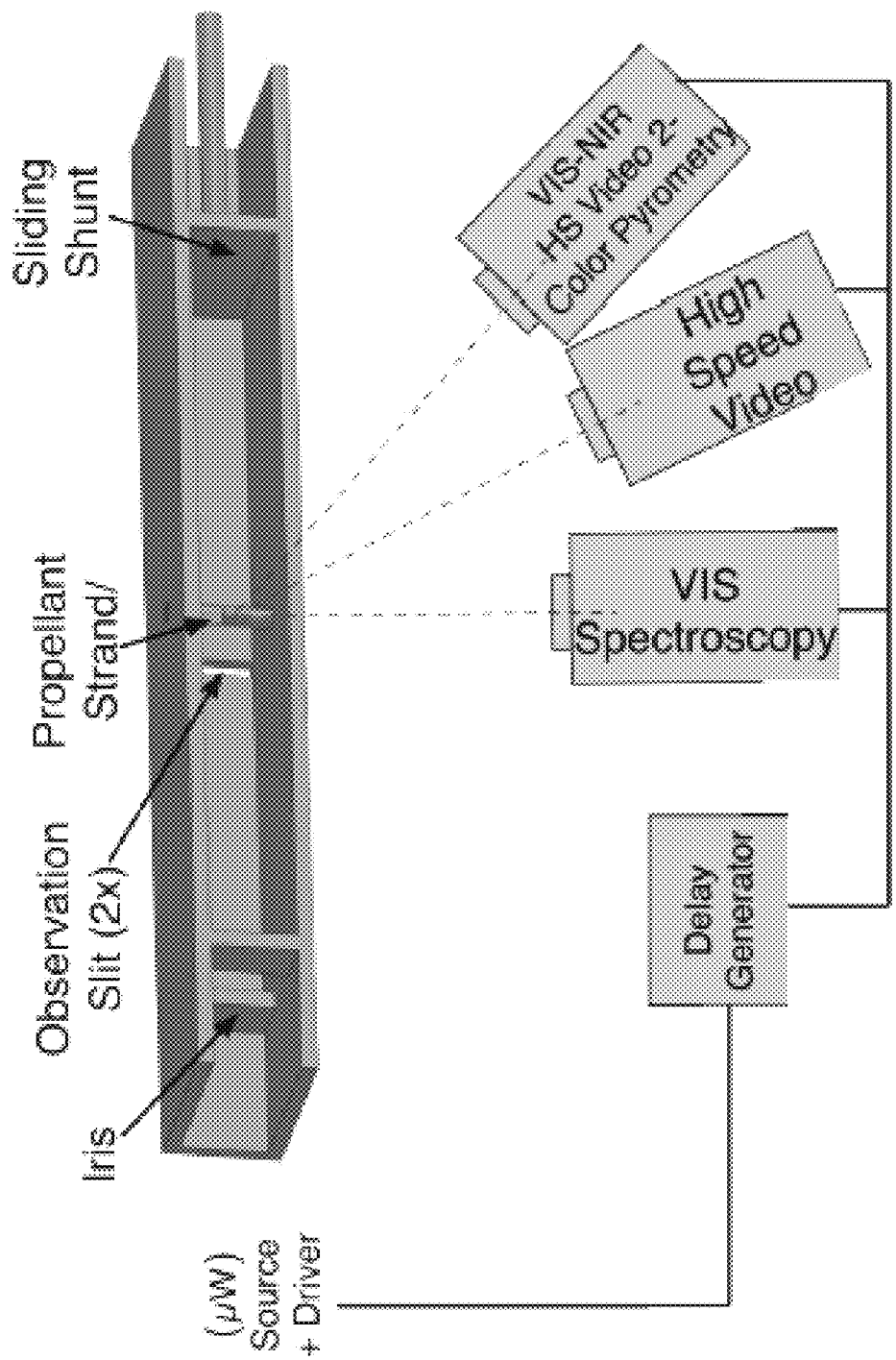
Figure 4:
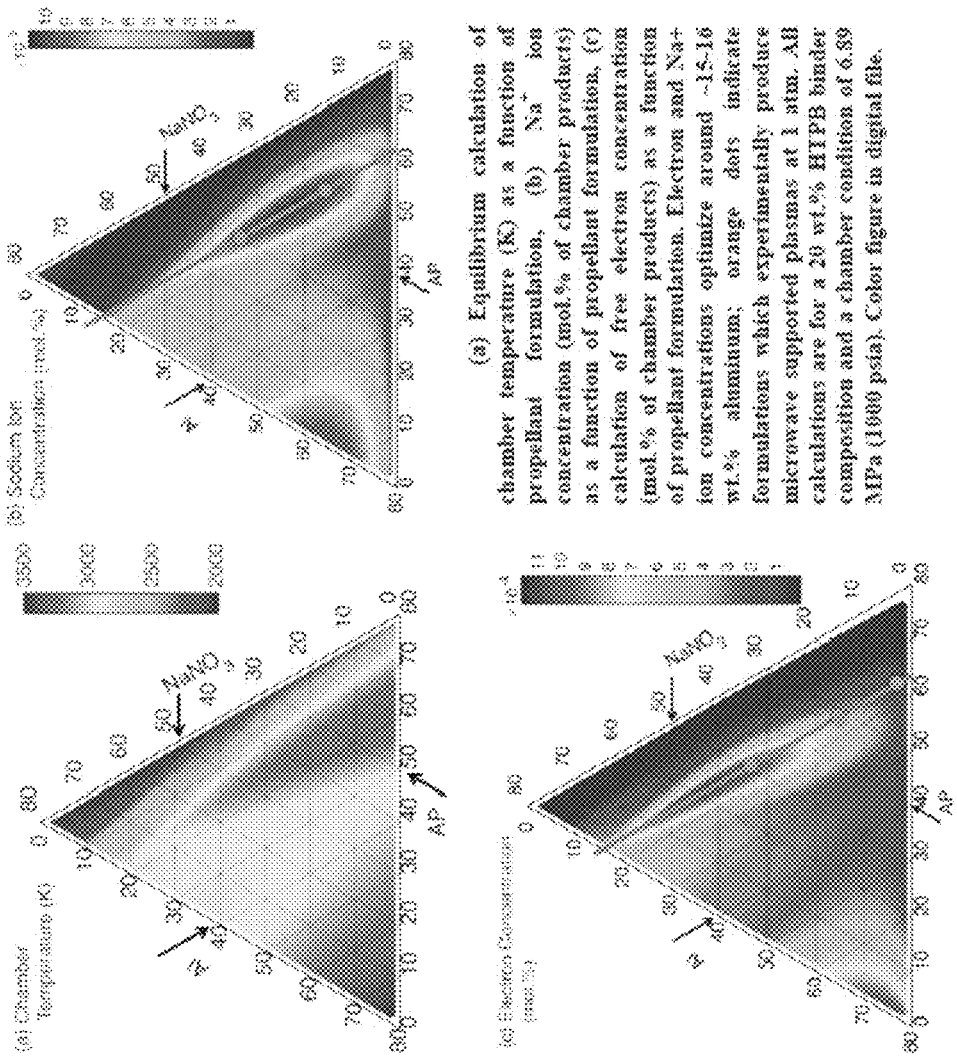
FIG. 4 is graphs illustrating theoretical performance of aluminized ammonium perchlorate composite propellant formulations containing a sodium nitrate dopant.
Figure 5:
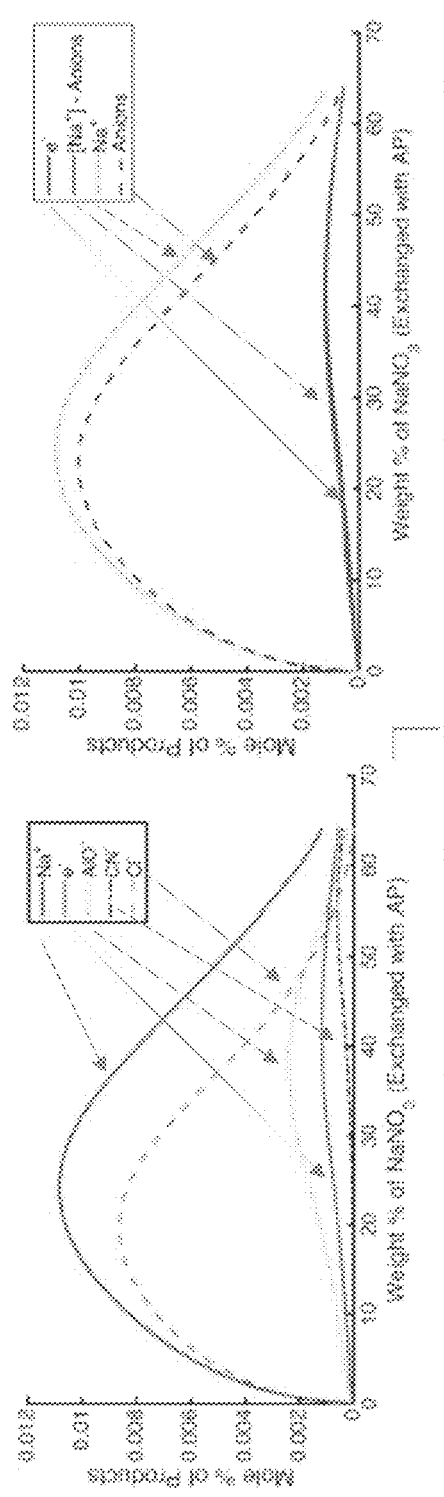
FIG. 5 is graphs illustrating theoretical performance of aluminized ammonium perchlorate composite propellant formulations containing a sodium nitrate dopant.
Figure 6:
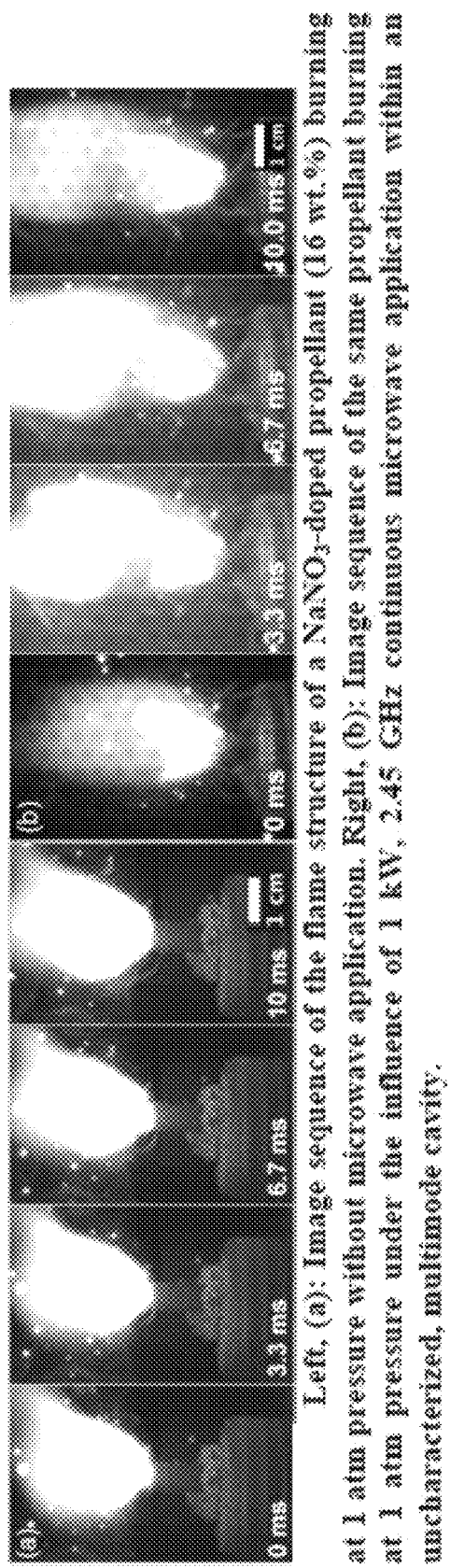
FIG. 6 is sets of four frames of high-speed photos of flames from non-microwave enhancement versus microwave enhancement according to tests with the set-up of FIG. 1.
Figure 7:
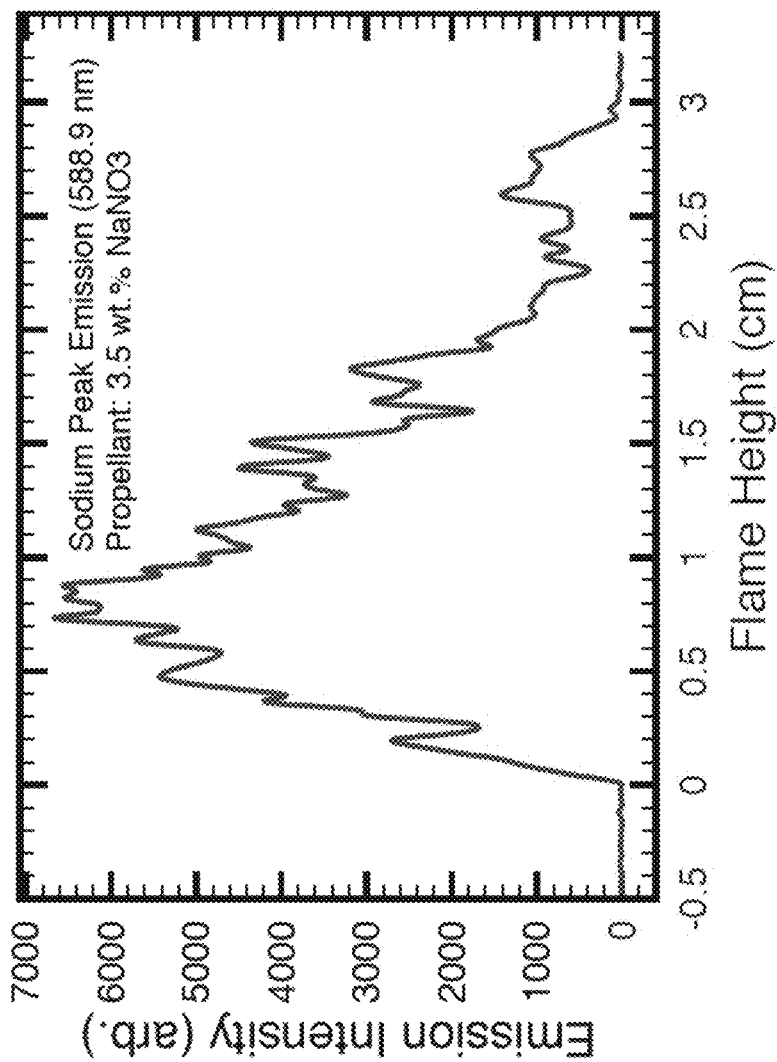
FIG. 7 is a graph used in discussing aspects of the invention.
Figure 8:
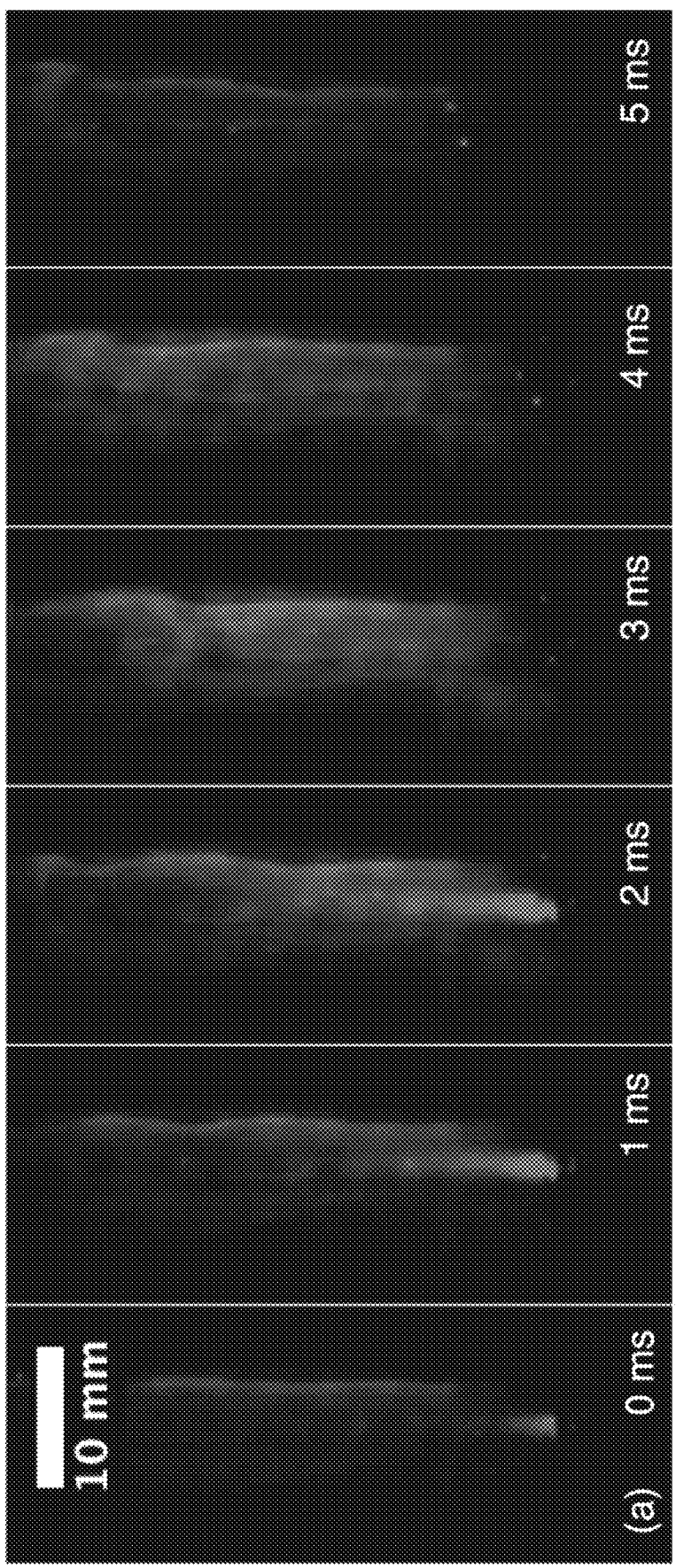
FIG. 8 is a set of color photographs illustrating aspects of the invention.
Figure 9:
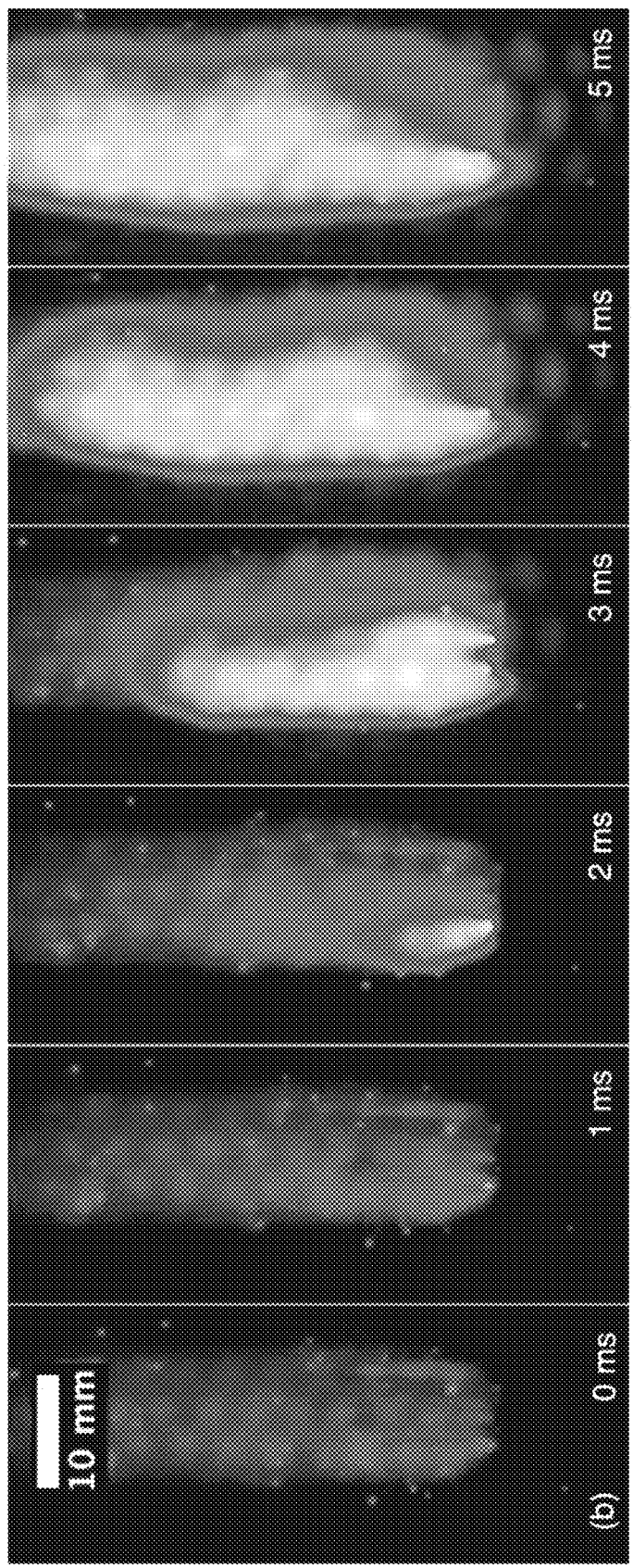
FIG. 9 is a set of color photographs illustrating aspects of the invention.

FIGS. 1-3 illustrate in a highly schematic form of the test set-up. A solid fuel (here in the form of a propellant strand) is positioned in the combustion chamber that also functions as a microwave cavity. A source of microwave energy (magnetron) is positioned adjacent or relative to the cavity to direct microwave energy through a protective, microwave transparent window and into the cavity. Appropriate operation of the magnetron and ignition procedures cause ignition of the strand. The resulting combustion flame of the solid fuel strand can be seeded with microwave energy and enhanced.

FIGS. 1-3 illustrates other lab-type set ups for microwave enhanced combustion, including additional components that can be used to monitor and validate this enhancement, as will be explained further later.

Figure 14:
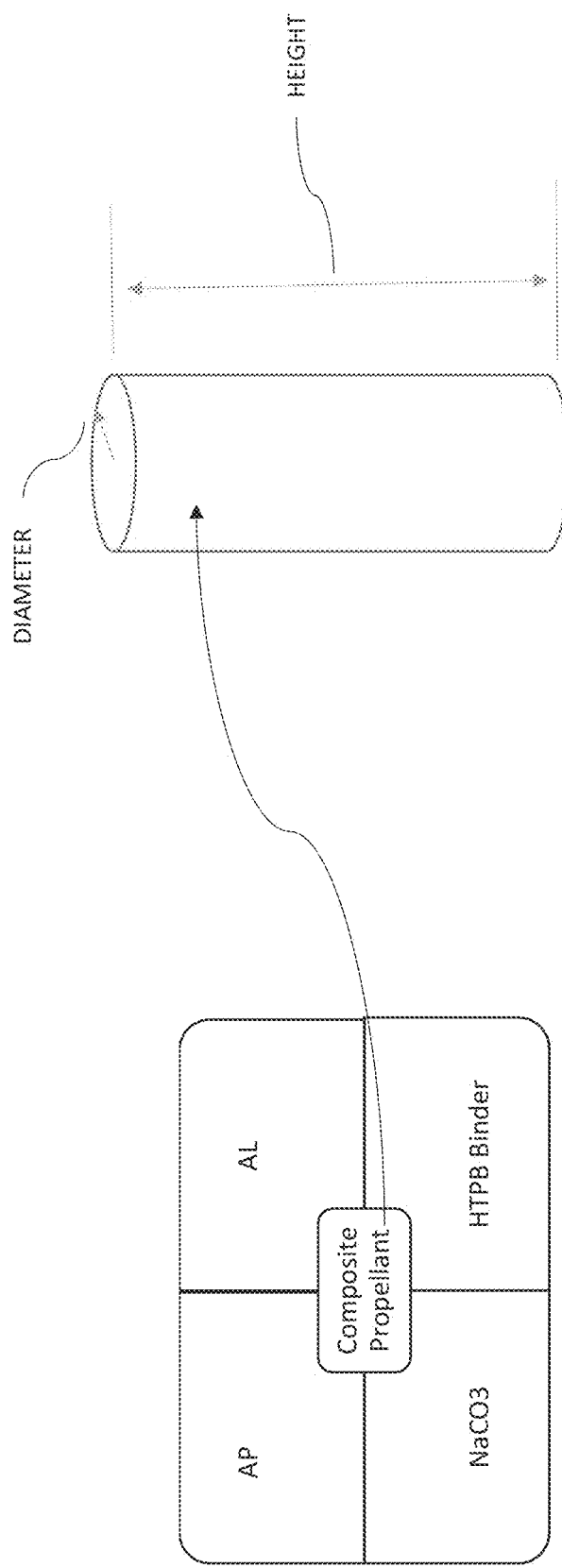
FIG. 14 is a highly diagrammatic illustration of a cast or molded pellet or strand of doped solid composite propellant according to one embodiment of the present invention.

A particular modified composite propellant can be used. FIG. 14 is a diagrammatic illustration of one form factor (e.g. strand having a cylindrical shape of diameter D and height H). It can be cast, molded, or formed into, as well as a schematic of the components that are mixed into the composite. As will be appreciated, the form factor can be scaled up or down or varied according to need or desire of the designer.

Figure 15:
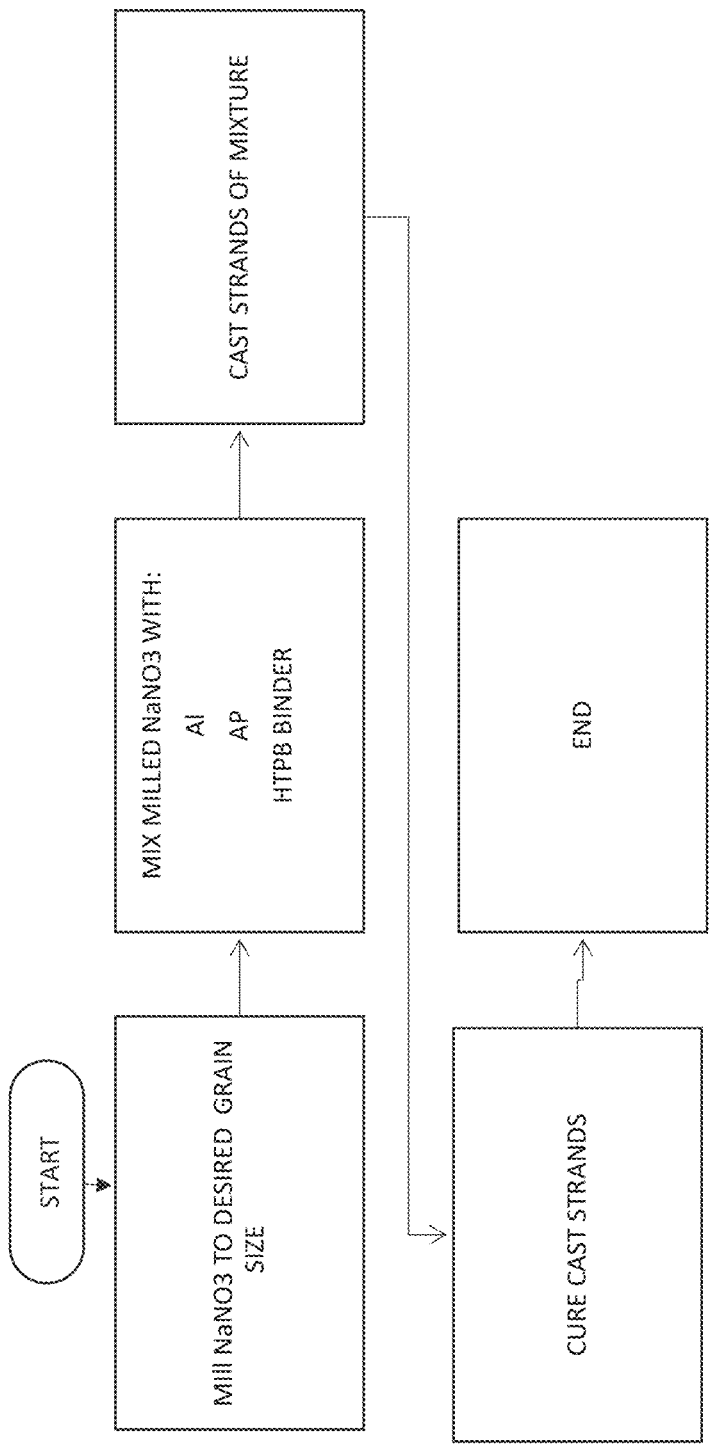
FIG. 15 is a flowchart of one method of making a doped solid composite propellant according to the embodiment of FIG. 14 present invention.

As is typical in this technical field, one form of solid propellant includes granulized particles of the propellant (AP) that are mixed with other components. As shown in FIG. 14, in this example AP is mixed in proportion to aluminum particles and sodium nitrate particles, and further bound together with HTPB. FIG. 15 describes one method of making such a solid propellant strand or form factor As will be further discussed in detail, testing has found this combination responds to the microwave enhancement. Additionally, controlling the microwave energy in a pulsed mode (PWM) could allow relatively low average power to provide relatively high peak power pulses for beneficial effect and low system power/weight requirements. Results of significant enhancement of burning rates and plasma formation have been found. These will be discussed below.

As will be appreciated by those skilled in the art, the ways in which the system can be configured and operated can vary according to need and desire. The system could be implemented in any of the applications of FIGS. 11-13, or others. This can include simply combusting the solid propellant and conducting research on microwave seeding for a variety of purposes.

1. Components of System

It is to be understood that the invention is not necessarily limited to the apparatus and methods of the specific examples given herein. The specific examples are focused on lab set-ups for proof of concept. As will be appreciated by those skilled in the art, the teachings of the specific examples can be applied in analogous ways to other set ups, including actual working machines or other, non-solid propellant propulsion and pyrotechnic systems such as but not exclusive of ramjet combustors, hybrid rocket motors, liquid rocket engines, and pyrotechnics.

2. Combustion Chamber

As mentioned, the combustion chamber and technique for directing microwave energy to the combustion can vary according to need or desire. Reference can be made to the publications cited in the Background of the Invention, supra, for additional discussion, and in particular regarding ways to generate and guide microwave energy to the flames. See also FIG. 10, and example of a lab-scale mockup of a rocket motor using microwave enhancement components. This includes a wave guide feature in the combustion cavity.

Another example of forms and characteristics possible regarding the combustion chamber include the use of an end-burning rather than ported propellant grain, where microwave enhancement is capable of producing thrust levels comparable to ported, non-microwave enhanced propellant grains but with much higher propellant mass/volume fraction.

3. Microwave Source

The microwave source can vary according to designer desire or need. In one of the examples it is a 2.45 Ghz, 1 kW, 60 Hz modulated magnetron of a size and characteristics that it can be mounted to or at the cavity and cooperate with the cavity to direct microwave energy to the flames therein. See diagram of FIG. 1. One example of such a magnetron is commercially available under model number 6324W1A002B from LG Electronics company of Seoul, (South Korea). The Michael, J. B., et al. *Journal of Applied Physics, vol.* 108, 2010, p. 093308 and Michael et al. COMBUSTION AND FLAME. 2013 April, V. 160, No. 4, cited earlier, discuss microwave generation in the context of directing it onto propellants, and can be referred to for additional discussion.

As will be appreciated by those skilled in the art, variations on this source will depend on the application. As a general rule, the operating characteristics of the microwave source will depend primarily on the following rules or parameters: >1 kW peak power, and modulated output.

As mentioned, control of the microwave source can vary. One technique is pulsed operation by pulse width modulation (PWM) of the source. Such control can be accomplished in a variety of ways. One is through the use of a pulsed magnetron and driver system in which discrete microwave pulses are injected at low duty cycle into the propellant combustion flame environment. Pulse duration, duty cycle, and power level could be explicitly set or could be dynamically controlled either by a user or through system feedback from motor pressure transducers, device accelerometers, and other sensory equipment. Another potential embodiment may use a continuous microwave source/driver with overall high duty cycle and slow modulation/pulsing rate in order to deposit energy to the flame. Control of modulation rate, power, and duty cycle in this embodiment could also be arbitrary or user/feedback controlled. Pulsing to some degree will likely be necessary to prevent parasitic conductive losses and to control plasma growth. A third embodiment may use a continuous microwave source/driver for continuous application of microwave energy to a flame; power level, and on/off control may be facilitated arbitrarily or through user/feedback control.

4. Propellant

Examples of propellants relevant to the invention are discussed in the specific examples herein. It is to be understood that these are non-limiting examples and the composition can vary according to need or desire.

Alternatives are possible and include materials containing elements having low first ionization energies, including but not limited to:

(a) Other low ionization energy alkali earth metals such as lithium and potassium either added to an energetic formulation in low levels as a dopant or innately present in an energetic formulation as a fundamental ingredient to enable combustion. Materials may be in an atomic form (e.g. sodium, lithium, or potassium metal), may be alloyed with other materials (e.g. alloys thereof with aluminum or magnesium), may be nanostructured additives mixed with other materials (e.g. nanostructured particles of alkali earth metals with other metals/metalloids) or may be present bound in the form of another energetic molecule (e.g. nitrates, perchlorates, chlorates, sulfates, or persulfates of alkali earth metals). Additionally, dopant materials may be present in co-crystals of the aforementioned energetic molecules with other energetic molecules including but not exclusive to ammonium perchlorate, RDX, HMX, ammonium nitrate, and other common energetic molecules.

(b) Other non-alkali earth metal atoms including but not limited to aluminum, calcium, gallium, silicon, titanium, chromium, manganese, boron, nickel, copper, tantalum, and bismuth as well as alloys and nanostructured mixtures with other materials as well as molecular ingredients containing these substances.

(c) Additives in energetic nano- or micro-particles blended with liquid fuels for multiphase combustion ignition and control.

5. Method of Making Propellant

A method of making a Na-doped propellant is shown in FIG. 15. As will be appreciated, the method can vary at least to some degree. For example, a well-versed user will understand that the relative compositions of ingredients in a propellant will vary in order to suit a particular application. Specifically propellants may be made with or without the addition of metallized additives, may include alternative metals (e.g. boron, magnesium, silicon or alloys/nanostructured particles thereof) and may include an alternate binder to HTPB (hydroxyl terminated polybutadiene) including but not exclusive to PBAN (polbutadiene acrylonitrile), GAP (glycidyl azide polymer), nitrocellulose, double base, triple base, polystyrene, nylon, as well as a number of other polymerizing and melt-castable high energy binder materials and polymers thereof. Use of alternative oxidizers to AP (ammonium perchlorate) may also be possible, including the explosives RDX, HMX, CL-20, and other high-energy oxidizers and cocrystals thereof.

Other dopings (e.g. lithium, or potassium) can be accomplished by similar or analogous methods.

6. Operation

Operation of the system will be described in more detail later. It is envisioned that the microwave source, directability of the source, and control of the source could be integrated in a practical manner in a variety of applications, including on board rockets or other functioning apparatus.

Examples of envisioned implementations include, but are not necessarily limited to:

a. Integration of a source and protective window axially at the fore-end of a rocket motor in order to establish transverse electric (TE) field fundamental modes within the combustion chamber using the motor case as a circular waveguide.

b. Integration of a source (or multiple sources) and protective windows radially along the exterior of a rocket motor to establish transverse magnetic (TM) field fundamental modes within the combustion chamber using the motor case as a circular waveguide.

c. Operation of a magnetron either axially or radially at higher-than-fundamental frequencies in order to facilitate shaping of microwave fields to tailor the energy deposition to specific locations within single ported, multi-ported, or end burning geometry motors d. Coupling of multiple magnetrons either axially or radially in order to simultaneously or selectively control microwave field shape within a motor in order to further tailor combustion rates and thrust.

D. Specific Example 2 (FIGS. 16-19)

This second example is with reference to FIGS. 16 to 19. It is in the context of an energetic material in the form of a solid composite propellant and microwaves in continuous wave mode in an experimental setup. The example is proof of concept of enhancement of combustion.

In particular, this example describes a general microwave enhancement technique, including a general overview of mechanism through which an energetic material flame can be made to interact with microwave radiation. One way is the microwave plasma enhancement of doped propellants.

Burning rate of a propellant can be improved/controlled using continuous microwave radiation of an alkali doped propellant.

Alkali-Seeded Microwave Plasma Enhancement of Composite Solid Propellants

This effort explores microwave-supported plasma enhancement of an aluminized ammonium perchlorate composite solid propellant flame through a novel alkali metal doping technique to perturb steady propellant burning rate. The technique employs targeted energy deposition to the propellant flame from a microwave field through the flame-induced ionization of alkali earth metal atoms (i.e. sodium, added to the propellant in the form of sodium nitrate, NaNO3) to establish free electron populations within the flame that serve as microwave energy deposition sites. Equilibrium propellant combustion calculations indicate that propellant formulations containing 10-20 wt. % aluminum and 15-40 wt. % $NaNO_3$ produce the highest equilibrium flame electron concentrations. This work demonstrates experimentally that only low levels of dopant are required to seed plasma formation and dynamically control propellant combustion. Using 3.5 wt. % dopant and a 1 kW, 2.45 GHz 60 Hz modulated source combined with a multimodal cavity, an average field strength of 7.0 kV/m can result in microwave-supported plasmas within the propellant flame. The ability to enhance propellant burning rate by as much as 21±3% at atmospheric pressure is demonstrated. During field application, plasma kernel formation is frequently observed near burning aluminum agglomerates in the propellant flame, and results in rapid plasma spread throughout the flame volume. Increases in bulk flame temperature due to (1) plasma formation and (2) dielectric absorption in hot aluminum oxide combustion features resulting in enhanced aluminum particle combustion are likely mechanisms in the enhancement of propellant regression rate. Additional microwave energy absorption in the propellant condensed phase can occur but is observed to be minimal. The ability to microwave-control the burning rate of composite propellants through low level doping is a promising technique with which to establish thrust/burning rate control of solid motor combustion and may enable transformative control of the combustion of a variety of energetic materials.

Control of solid rocket propellant burning rates requires robust throttling techniques capable of perturbing the combustion of high performance propellant formulations. Techniques for the control of propellant combustion include global pressure control (e.g. pintle nozzles or rapid depressurization quench),[1] infrared laser irradiation of the burning surface,[2] local pressure and velocity perturbations in the combustor through tailored combustor geometry,[3] and the use of hydroxylammonium nitrate (HAN)-based formulations having voltage-sensitive burning rates.[4] Some limitations of these techniques include lower propellant mass fraction (pintle nozzles), application to only lower specific impulse/flame temperature formulations (HAN and pintle), application to only a specific formulation (HAN), or difficulty in scaling to motor configurations (laser irradiation).

Plasma combustion enhancement of energetic materials has been previously demonstrated using electrothermal-chemical (ETC) launchers, which have demonstrated expedited ignition flame spread, pressurization rate, and global propellant burning rate of solid gun propellants.[5,6] With such techniques, recent studies have shown burning rate enhancements of up to 21% are possible,[7] with further enhancement possible in higher solids loading compositions.[8] However, burning rate enhancement techniques used in ETC launchers (e.g. capillary plasma generation) are limited to single plasma injections (a single shot technique) and have limited volume (10's of centimeters in length).[9] As a result, the long duration, sustained plasma control within the large combustion volume of a solid motor is not feasible. In consideration of a microwave—rather than ETC-generated plasma, the microwave transparency of many propellant ingredients[10,11] may enable long-duration, uniform plasma generation in large, complex grain shapes. Unlike pintle throttling techniques, modification of a motor for microwave enhancement requires no moving parts and is simplified by utilization of the motor casing as an in-situ waveguide, requiring only the addition of an RF pressure window transition for magnetron interfacing. Compared to pintle nozzles, the use of microwave-seeded plasmas within motors for control may also reduce aerodynamic loss and may enable throttling of higher performance propellant formulations (e.g. aluminized composites) that have flame temperatures too high to be easily controlled with pintles.

Pulsed plasmas have shown significant potential in both kinetic and thermal enhancement of gas-phase combustion processes. A variety of plasmas have been used for improvement of combustion limits, to access additional kinetic pathways, and to provide additional fuel flexibility. Much of this work has focused on gas-phase kinetic and global combustion enhancement. One technique of relevance to this work is the use of low duty cycle, high power microwave pulses for precise control over plasma growth. Notably, one strategy for pulsed microwave plasma generation involves operating in a subcritical regime, below the threshold for ionization in the ambient gas, where microwave energy deposition to the flame is facilitated through interaction of high field strengths produced from a ~30 kW pulsed source with weak electron populations produced from chemiionization radicals. This strategy allows for preferential coupling to regions of ionization while avoiding parasitic gas breakdown and absorption at other locations[12-16]. Previously, this approach been demonstrated for both laser-generated ionization[12,15] and in atmospheric pressure hydrocarbon flames[16]. Successful attempts at microwave supported plasma enhancement of premixed gas-phase flames[16] resulted in increased in flame speed, local increases of the flame temperature of ~500° C., and the extension of lean flammability limits.

While sub-critical mode coupling with weak electron populations produced from chemiionization is possible with higher power sources, use of lower source power (lower field strength) requires higher electron populations. With the goal of using lower field strengths to couple with a propellant flame, sub-critical mode operation can be further enhanced by doping of a propellant with materials that enhance electron population upon thermal ionization within a propellant flame.

We demonstrate the use of a novel alkali metal doping technique for efficient, targeted low power (field strength) microwave energy deposition to the flame structure in order to seed the formation of a combustion-enhancing plasma. The propellant is doped with a small quantity of material containing low ionization threshold atoms—in this case consisting of alkali earth metals (e.g. sodium in form of sodium nitrate, $NaNO_3$). During decomposition and combustion, thermal energy provided by the propellant flame ionizes free Na atoms, forming free electrons, which upon microwave irradiation leads to targeted microwave energy deposition to the gas phase propellant flame and subsequent plasma formation. The increase of gas phase flame temperature enhances heat feedback to the burning surface and increases the propellant surface regression rate (FIG. 16).

Furthermore, condensed phase heating via Maxwell-Wagner losses[17] within the propellant matrix of conductive particles (Al) dispersed within non-conductive AP/binder as well as combustion enhancement of Al agglomerates in the flame are two other possible microwave burning rate enhancement mechanisms that are considered.

Figure 16:
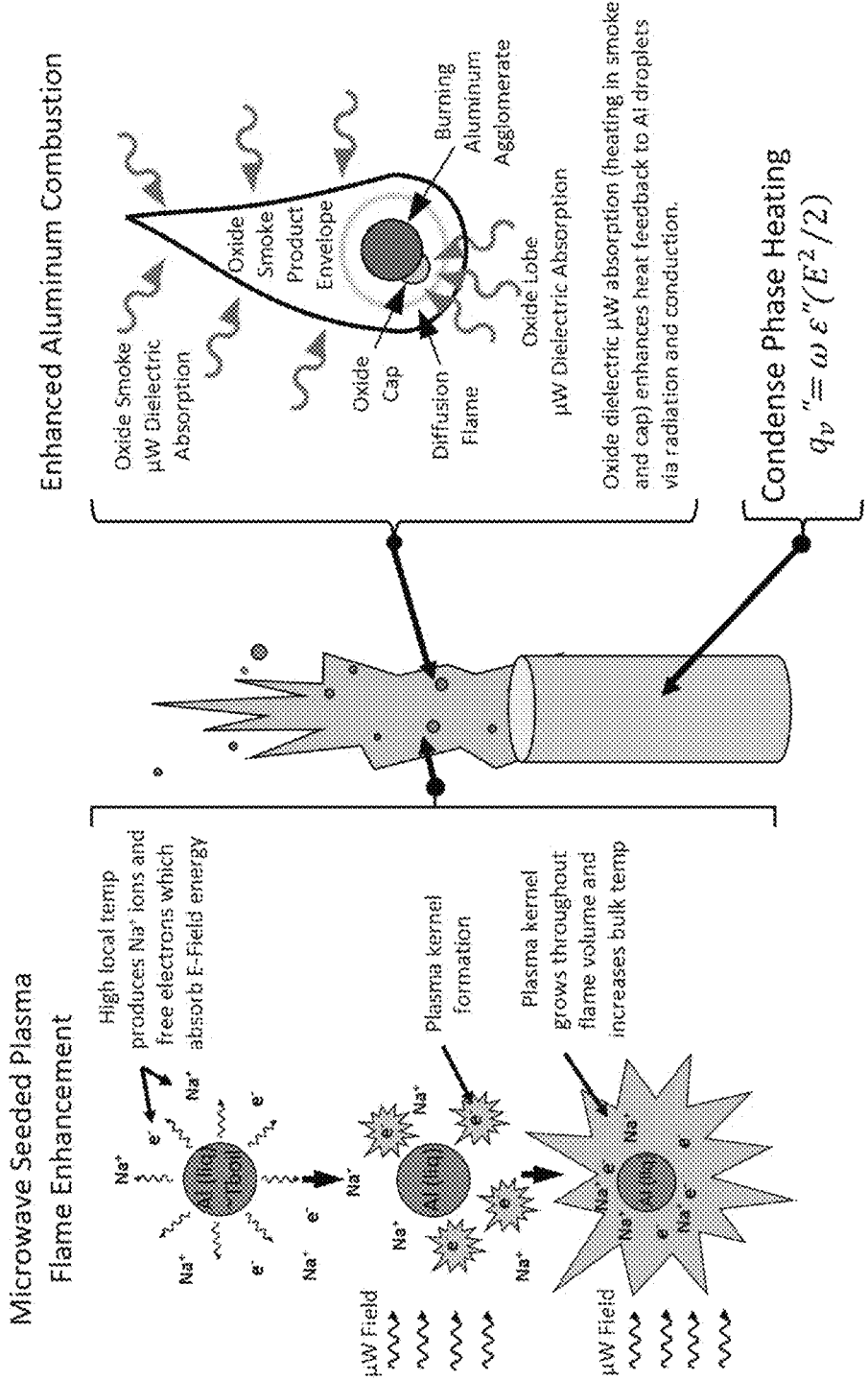
FIG. 16 is a schematic illustration of possible mechanisms of burning rate enhancement using one or more aspects of the present invention.

See FIG. 16. Illustration of possible mechanisms for burning rate enhancement. Plasma kernel seeding frequently occurs around Al particle flame structures due to high local flame temperatures and subsequently grows through the flame volume. Direct energy absorption (dielectric loss) to oxides (smoke and oxide cap) can occur. Condensed phase heating can also contribute to the burning rate enhancement. A color version of this figure is available in the online record.

The aim of this work is to use a low-level alkali earth metal doping technique combined with low power (field strength) microwave field application to generate a microwave-supported plasma within the flame of an aluminized composite propellant. Particularly, this effort aims to (1) explore the effects of dopant addition on equilibrium flame electron populations and propellant performance, (2) explore the effects of microwave plasma seeding on flame structure and burning rate enhancement, and (3) explore the mechanisms through which microwave fields enhance solid propellant combustion.

Equilibrium calculations were conducted using a copy of NASA CEA[18] that was modified to perform ternary compositional calculations. Equilibrium calculations using ionic chemistry were conducted for a chamber pressure of 6.89 MPa (1000 psia) and equilibrium expansion to an expansion ratio of 68. Calculations were conducted varying the weight percentage of aluminum, ammonium perchlorate (AP), and sodium nitrate ($NaNO_3$) varying from 0 to 80 wt. % using 20 wt. % fixed hydroxyl terminated polybutadiene (HTPB) binder weight fraction.

Aluminized, AP composite propellants containing $NaNO_3$ dopant were manufactured into propellant strands for combustion experimentation at 1 atm pressure. The propellant formulations used in this study are highlighted in Table 1 and consisted of aluminum (Valimet H30, ~35 μm), AP (200/90 μm, 80/20 coarse/fine wt. %, Firefox Chemicals), milled $NaNO_3$ (Firefox Chemicals), and a HTPB binder system. Prior to propellant fabrication, $NaNO_3$ was milled and sieved to achieve particle sizes of <75 μm. The binder system consisted of R45 monomer (Firefox Chemicals), isodecyl pelargonate (IDP, Firefox Chemicals) plasticizer, and HX-878 (tepanol, Firefox Chemicals) bonding agent, and MDI isocyante curative (RCS Rocket Motor Components). Propellant was mixed for 3 hours in a dual planetary mixer and was deaerated at room temperature for 30 minutes at roughly vacuum pressure. Strands were cast into 6 mm diameter cylindrical shape using polyethylene molds and allowed to cure for seven days at room temperature. After curing, propellant strands were cut to 1 inch lengths and the measured densities were >95% of theoretical maximum density (TMD).

Figure 17:
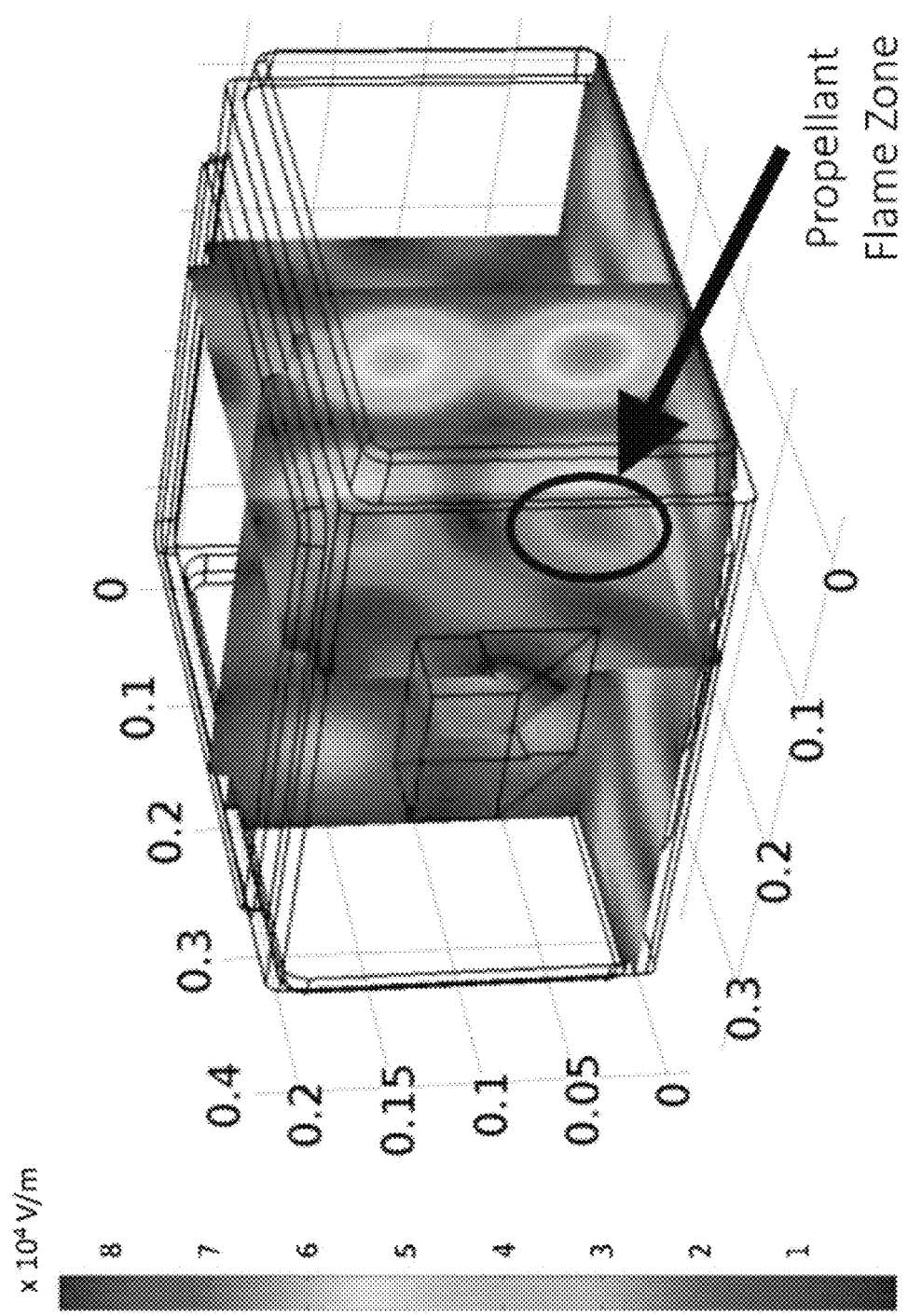
FIG. 17 is a color simulation of electric field distribution within microwave combustion chamber of FIG. 1.

A multimode microwave cavity connected to a 60 Hz modulated 2.45 GHz, 1 kW magnetron was used to conduct experimental studies. The location of a strong node in the cavity was determined using both experimental microwave power output measurement[19] and simulation techniques. Briefly, a ~100 g load of distilled water having roughly the same shape and dimension as the propellant flame volume was heated for 30 s at the identified E-field node and resulting temperature rise was used to calculate average E-field strength at this location. A model of the microwave cavity in COMSOL Multiphysics 5.0 was used to simulate the average field strength. Results from both experimental and computational field strength measurement techniques were within 10% and indicate a field strength of ~7.0 kV/m at the testing location. The resulting simulation of the cavity and location of the E-Field node in which the propellant flame is placed in this study is shown in FIG. 17. Combustion of propellants was conducted at 1 atm and observed using high speed video (Phantom ir300 with 50 mm Nikon lens, 1000 fps) with and without a sodium filter (590 nm, FWHM 10 nm) to view regions of high Na thermal activity. Burning rate measurements were taken of all the propellant formulations with and without microwave enhancement in the same location of the microwave oven using high speed video and ImageJ. Furthermore, backlighting and high magnification video (Photron Fastcam S A-X2 with Infinity K2 microscope lens, 12500 fps) observed near burning surface interaction with Al particles.

See FIG. 17. COMSOL 5.0 simulation of multimodal microwave heating cavity with propellant flame location indicated. The strength of the electric field within the flame volume is ~7.0 kV/m. A color version of this figure is available in the online record.

Equilibrium calculations conducted with varying reactant composition and dopant level (FIG. 18a) indicate that Na ion concentration and free electron concentration optimize for formulations containing ~16 wt. % aluminum, where high adiabatic propellant flame temperatures are expected to produce the greatest level of sodium thermal ionization. However, $Na^+$ ion concentration optimizes at higher $NaNO_3$ loadings (10-35 wt. %) as opposed to optimization of free electron concentrations (35-45 wt. % $NaNO_3$) as a result of electron scavenging of species to form $AlO^-$, $CN^-$, $Cl^-$, and other minor anion radicals, whose presence is more prevalent at higher flame temperatures produced from lower $NaNO_3$ dopant addition. Holding aluminum content constant at 16 wt. %, the overall effect of dopant addition and reduction in flame temperature is a decrease in specific impulse. With 16 wt. % $NaNO_3$, ISP is reduced significantly by 14 s from 259 to 245 s (Table 4). However, low-level addition of 3.5 wt. % $NaNO_3$ reduces ISP by only 3 s. While higher equilibrium free electron concentrations are accessible with greater dopant addition, the associated ISP performance reduction is significant.

Regardless of the low concentration of free electrons at low $NaNO_3$ loadings, very few free electrons are required to generate a plasma under microwave application. Using an experimental field strength of ~7.0 kV/m, it was possible to produce microwave-supported plasmas at 1 atm pressure using a $NaNO_3$ dopant level as low as 3.5 wt. %. In FIG. 18b (top), propellant combustion (3.5% $NaNO_3$) is shown without field application. The propellant flame size and intensity appears roughly uniform over the ~5 ms duration of the image sequence. However, with microwave application (FIG. 18b, bottom and in supplemental video), 589 nm thermal emission from gas is observed and a plasma flame kernel is observed to form, producing rapid 4 ms of plasma growth within the propellant flame. Plasma enhancement is accompanied by increased emission and increased flame size, suggesting an increase in flame speed. As indicated within the supplementary video, burning Al particles appear to frequently serve as plasma kernel formation sites, which is expected due to the aluminum diffusion flame having (1) the highest local flame temperature within the propellant flame[21] where preferential, local promotion of sodium thermal ionization is expected and (2) direct energy deposition to burning Al particles, which can occur through dielectric heating of aluminum oxide products within the aluminum particle flame (oxide smoke) and at the aluminum droplet surface (oxide cap). While the microwave dielectric loss of aluminum oxide at room temperature is low (tan δ=0.0003), at elevated temperature, dielectric loss increases exponentially due to electron promotion to valence shells and is 3000% more efficient at 1500 K, producing a thermal runaway.[21] At propellant flame temperatures (~2500-3000 K) alumina dielectric loss could be even more substantial. In high magnification video of aluminum agglomerate combustion, shown in supplementary video, direct energy absorption of the oxide smoke and oxide lobe surrounding burning agglomerates can be observed, where field application results in rapid rise in emission from these features. Field application is observed to result in growth of the aluminum diffusion flame sheet surrounding small aluminum agglomerates (~100 micrometer diameter and smaller), indicating faster liquid aluminum volatilization rates due to increased heating of aluminum through conduction (oxide lobe) and radiation (oxide smoke envelope) heating. These results indicate an ability to microwave enhance aluminum combustion rates within composite propellant flames (FIG. 19).

Figure 18:
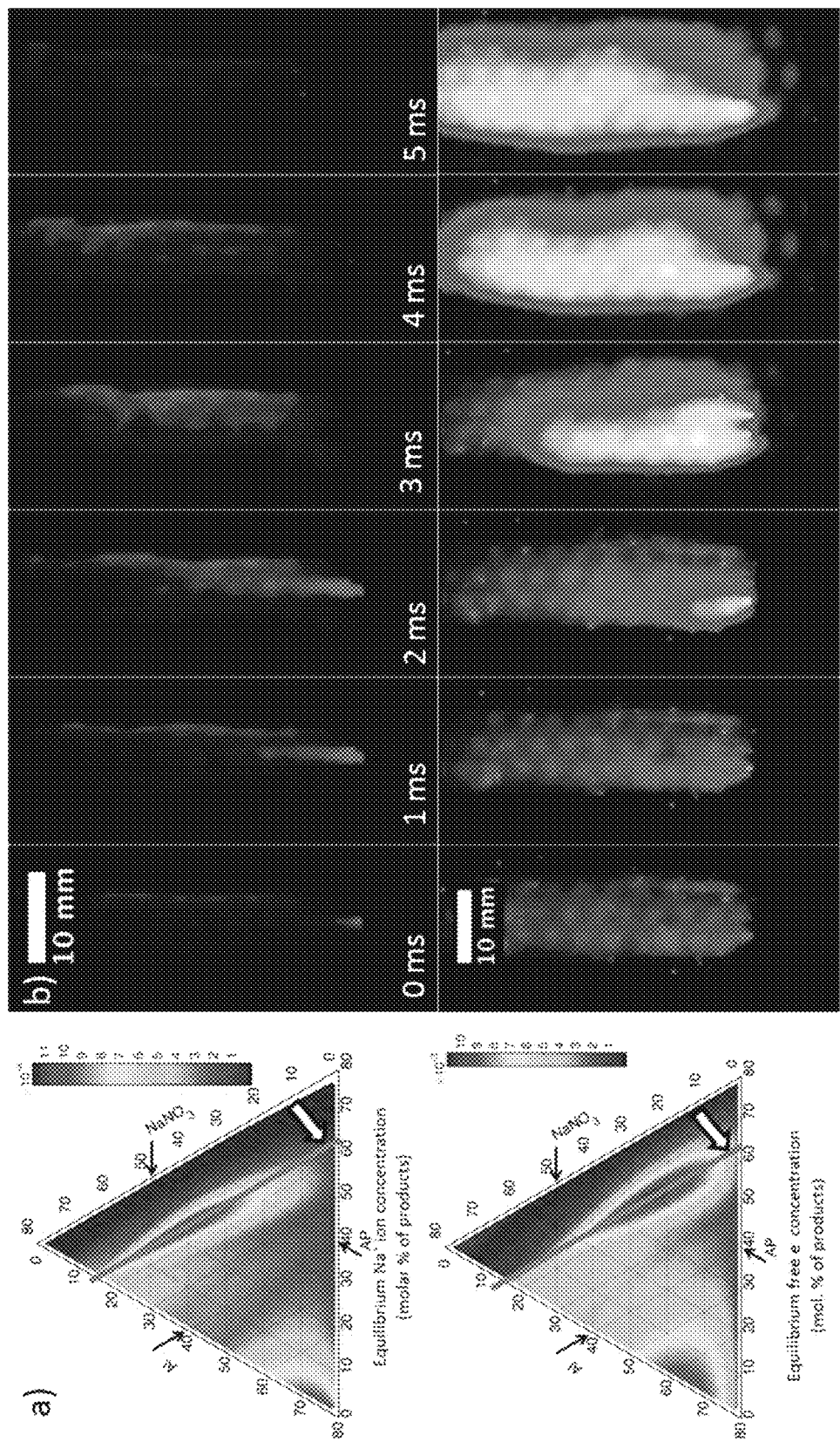
FIG. 18 are color photos and color graphs illustrating comparison of theoretical propellant performance (a) and experimental flames (b) without (top) and with (bottom) microwave enhancement according to aspects of the invention.

See FIG. 18. (a) Equilibrium calculation of Na ion concentration (mol. % of chamber products) as a function of propellant formulation and calculation of free electron concentration (mol. % of chamber products) as a function of propellant formulation. (b) Still frame image sequence of bimodal AP, aluminized (3.5 wt. % $NaNO_3$) propellant without (top) and with (bottom) microwave enhancement. Imaging is conducted with an atomic sodium filter (589 nm, 10 nm FWHM). Image exposure is 20 μs (both experiments) and false color is used to indicate emission intensity. A color version of this figure is available in the online record.

Figure 19:
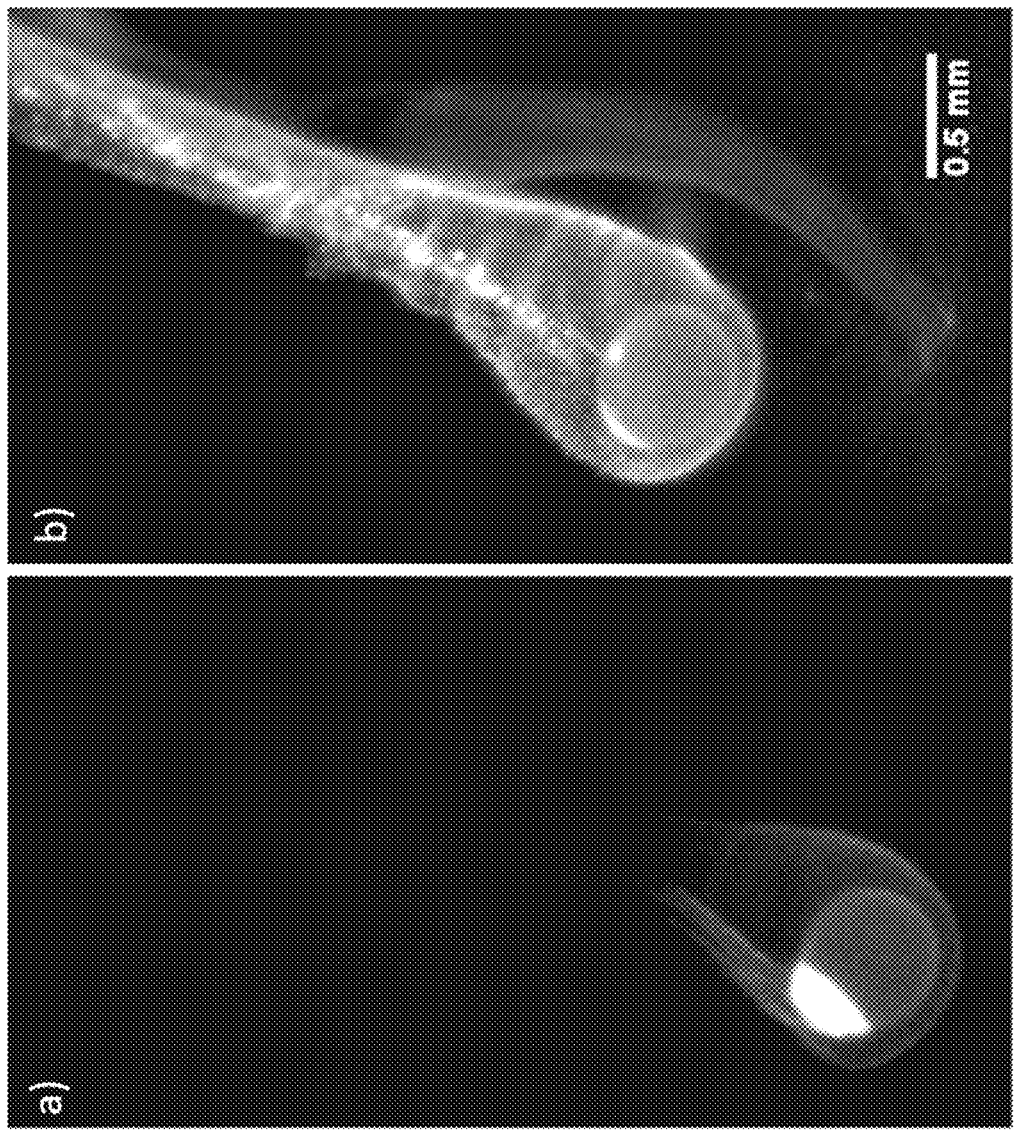
FIG. 19 are high magnification photographs of the diffusion flame of an aluminum agglomerate burning in a composite solid propellant before (a) and during (b) application of microwave energy according to aspects of the invention.

See FIG. 19. Image sequence of the combustion of an aluminum agglomerate within a sodium nitrate doped AP composite propellant flame at 1 atm pressure both before (a) and during (b) application of a microwave field within the experimental configuration described in FIG. 1.

Larger flame volumes observed during microwave plasma enhancement and aluminum combustion enhancement are expected to be the cause of observed propellant linear burning rate enhancement. As a result of microwave enhancement, the atmospheric pressure burning rate of the propellant (3.5 wt. % $NaNO_3$ dopant) is observed to increase by 21%. Burning rates without and with microwave enhancement are 0.104±0.002 and 0.129±0.004 cm/s, respectively (Table 4). Similar experiments on propellant containing a higher quantity of $NaNO_3$ dopant (16 wt. %) resulted in lower observed burning rate enhancement of 16% (0.124±0.002 to 0.146±0.009 cm/s). The higher observed burning rate enhancement of the 3.5 wt. % $NaNO_3$ doped propellant is expected to be a result of the reduced energy requirement of Na ionization. Additional experiments were conducted on undoped aluminized and doped unaluminized (16 wt. % dopant) propellant formulations. In these experiments, no microwave-seeded plasma formation was observed in doped unaluminized propellants due to the lower flame temperature (reduced thermal ionization). Experiments conducted on undoped aluminized propellants indicated formation of a far-from burning surface plasma. However, no burning rate enhancement is observed in either case, indicating that at field strengths investigated in this study, both aluminum and sodium nitrate are required in order to achieve the high local flame temperatures that are required to thermally ionize sodium and produce near-burning surface plasma events. No appreciable acceleration of burning rate was observed during experiments, indicating that direct dielectric heating of the condensed phase propellant is low and that the majority of energy is absorbed by the propellant flame structure rather than the bulk propellant reactants. Microwave enhancement of the burning rate of lower flame temperature compositions that could not be enhanced in this study may be possible using higher field strengths.

This effort demonstrates the ability to controllably enhance aluminized AP composite propellant flame structure and burning rate using a small concentration of sodium nitrate dopant to form a microwave supported plasma within the composite propellant flame. High-speed imaging indicates plasma formation is assisted by the localized high flame temperatures of aluminum agglomerate flames, in which free electron formation and subsequent plasma kernel formation preferentially occurs. In this process, kernel formation leads to rapid plasma growth through the flame. Using the existing modulated cavity source, doping with a low level (3.5 wt. %) of a sodium nitrate dopant can lead to burning rate enhancement of 21% at 1 atm pressure with an equilibrium specific impulse decrement of only 3 s. This work additionally demonstrates the ability to use microwave irradiation to enhance local aluminum agglomerate combustion and indicates direct heating of the propellant condensed phase is low. Finally, in the absence of high flame temperatures provided by Al and high electron concentrations provided by $NaNO_3$, no sustained plasma or burning rate enhancement is evident. Future efforts will focus on utilization of more efficient, high field strength, low duty cycle pulsed microwave enhancement techniques as well as direct measurement of the impact of aluminum combustion enhancement effects and dielectric loss within the propellant condensed phase. Exploration of the effects of pressure on seeding, plasma structure, and plasma extinction will also be explored. The use of an alkali-seeded flame to provide elevated free electron concentration suggests that with minor dopant modification of propellant formulations, dynamic control and enhancement of motor thrust and motor burning rate may be possible. The technique may be applied to a number of propellant/energetic material formulations to enable control over energetic output or to study combustion instability.

REFERENCES

[1] S. R. Chakravarthy, J. M. Seitzman, E. W. Price, and R. K. Sigman, J. Propul. Power 20, 101 (2004).
[2] T. Parr and D. Hanson-Parr, Solid Prop. Chem., Comb., and Motor Interior Ballistics 381 (2000).
[3] F. Culick, *Unsteady Motions in Combustion Chambers for Propulsion Systems* (NATO, Research and Technology Organization, 2006).
[4] W. N. Sawka, A. Katzakian, and C. Grix, in *The 19th Annual AIAA USU Conference on Small Satellites*, Logan, Utah, 8-11 Aug. 2005 (AIAA), pp. 1-7.
[5] J. Li, T. A. Litzinger, and S. T. Thynell, J. Propul. Power 21, 383 (2005).
[6] J. Li, T. A. Litzinger, M. Das, and S. T. Thynell, J. of Prop. and Power 22, 1353 (2006).
[7] X. Li, R. Li, S. Jia, and Y. Zhang, J. Appl. Phys. 112, 063303 (2012).
[8] R. Alimi and V. Berdichevsky, Prop., Explos., Pyrotech. 33, 118 (2008).
[9] A. Porwitzky, L. Scalabrin, M. Keidar, and I. Boyd, in 38*th Plasmadynamics and Lasers Conference*, Miami, Fla., 25-28 June 207 (AIAA), pp. 1-17.

[10] K. Hasue, M. Tanabe, N. Watanabe, S. Nakahara, F. Okada, and A. Iwama, Prop., Explos., Pyrotech. 15, 181 (1990).
[11] M. E. Daily, B. B. Glover, S. F. Son, and L. J. Groven, Prop., Explos., Pyrotech. 38, 810 (2013).
[12] J. B. Michael, A. Dogariu, M. N. Shneider, and R. B. Miles, J. Appl. Phys. 108, 093308 (2010).
[13] Popović S., R. J. Exton, and G. C. Herring, Appl. Phys. Lett. 87, 061502 (2005).
[14] I. I. Esakov, L. P. Grachev, K. V. Khodataev, V. L. Bychkov, and D. M. V. Wie, IEEE Transactions on Plasma Science 35, 1658 (2007).
[15] P. Barker, B. Mcandrew, S. Macheret, and R. Miles, IEEE ICOPS (2000).
[16] J. B. Michael, T. L. Chng, R. B. Miles, Comb. Flame. 160, 796 (2013).
[17] A. C. Metaxas and R. J. Meredith, *Industrial microwave heating* (Peter *Peregrinus*, London, U K, 1983).
[18] B. J. McBride and S. Gordon, *NASA Reference Publication* (NASA, Cleveland, Ohio, 1996).
[19] J. E. Gerling, Journal of Microwave Power and Electromagnetic Energy 22, 199 (1987).
[20] E. W. Price, in Fundamentals of Solid-Propellant Combustion, edited by K. K. Kuo and M. Summerfield (AIAA, New York, 1984), Vol. 90, p. 479.
[21] V. M. Kenkre, L. Skala, M. W. Weiser, and J. D. Katz, Journal of Materials Science 26, 2483 (1991).

Tables

TABLE 1

Solid propellant formulations with corresponding $I_{sp}$, adiabatic flame temperature, and burning rate with and without microwave enhancement.

| Formulation | Wt. % NaNO$_3$ Dopant | $I_{SP}$ (s) | $T_{flame,ad}$ (1 atm) (K) | $r_b$ w/o μW (cm/s) | $r_b$ w/ μW (cm/s) | $r_b$ Enhancement |
|---|---|---|---|---|---|---|
| AP/NaNO$_3$/Al/HTPB (70/3.5/14.5/12 wt. %) | 3.5% | 256 | 2730 | 0.104 ± 0.002 | 0.129 ± 0.004 | 21% |
| AP/NaNO$_3$/Al/HTPB (53/16/13/18 wt. %) | 16% | 245 | 2670 | 0.124 ± 0.002 | 0.146 ± 0.009 | 16% |
| AP/Al/HTPB (66/16/18 wt. %) | 0% | 259 | 2751 | 0.144 ± 0.002 | 0.142 ± 0.001 | None |
| AP/NaNO$_3$/HTPB (66/16/18 wt. %) | 16% | 226 | 2339 | 0.175 ± 0.007 | 0.175 ± 0.006 | None |

E. Specific Example 3 (FIGS. 20-28)

This third example is with reference to FIGS. 20 to 28. It is in the context of an energetic material in the form of a solid composite propellant and microwaves in continuous wave mode in an experimental setup. The example is proof of concept of enhancement of combustion.

This example shows how the technique can be used to increase the temperature of the flame with microwave application and enhancement is observed by making high speed measurement of the temperature of the flame.

Microwave Seeded Plasma Enhancement of Composite Propellant Flame Temperature

The development of game-changing throttling and performance enhancing technologies that are applicable to a variety of propellants formulations is required to for the advancement of solid propulsion. Previous work has demonstrated that using alkali earth metal doping techniques, composite propellant flames can be made to have strong electromagnetic coupling properties, resulting in significant enhancement of atmospheric pressure flame structure accompanied by ~20% enhancements in burning rate. In this technique, high localized flame temperatures provide the energy required to ionize alkali earth metals (e.g. sodium provided by a sodium nitrate, NaNO$_3$, dopant), producing free electrons within the flame that act as targeted microwave energy deposition sites for the microwave-supported formation of burning rate enhancing thermal plasmas. In this study, the atmospheric pressure combustion of composite propellants comprised of ammonium perchlorate (AP), aluminum (Al), and sodium nitrate dopant with different particle sizes are investigated under application of 1 kW, 2.45 GHz 60 Hz modulated radiation. Specifically, a variety of spectroscopic techniques, including UV—NIS and IR spectroscopy as well as two-color high speed video pyrometry are employed in order to explore the propellant flame enhancement occurring from microwave plasma propellant flame enhancement. Results indicate the plasma formation occurs at high localized temperature from Al combustion due to the ionization of Na$^+$ and rapid grow due to subsequently enhanced microwave coupling. During plasma coupling events, temperature enhancements of ~800 K above steady state temperature are observed from gray body fitting of IR emission and from two-color pyrometry. Thermal enhancement is observed to form near the propellant burning surface and is expected to be a significant source of burning rate enhancement observed in our previous studies. Taken together, the technique's ability to produce dynamic, significant increases in flame temperature and burning rate indicate promise as a technique to both enhance motor thrust/burning rate and establish control over solid motor combustion.

I. INTRODUCTION

The control and on-command enhancement of solid rocket propellant burning rate requires development of robust throttling techniques that are applicable to a variety of high performance propellant formulations through perturbation of a propellant flame. Propellant combustion control techniques that have previously been used include direct control of chamber pressure (e.g. via a pintle nozzle or hot gas valves)[1], infrared laser irradiation of the burning surface,[2] development of inherently unstable combustion chamber geometries (producing either local pressure or velocity perturbations),[3] and the use of hydroxylammonium nitrate (HAN)-based formulations that have voltage potential sensitive burning rates.[4] Some of these techniques suffer from drawbacks in that they are applicable only to low specific impulse formulations (e.g. HAN, 220-250 s) or are not easily implemented in motor configurations.

Alternately, plasmas have been previously studied as a technique to enhance ignition flame spread, pressurization rate, and global propellant burning rate of solid gun propellants through the use of electrothermal-chemical (ETC) gun launchers.[5,6] Recent studies suggest that the burning rate enhancement afforded by ETC plasmas is both thermal and ablative.[7-9] Experiments have proven burning rate enhancements of up to 21% are possible,[9] and that further enhancement is possible with higher solids loading.[10] Mechanisms responsible for burning rate enhancement in ETC systems include both plasma flame enhancement and direct regression rate enhancement through plasma erosion. However, such arc discharge techniques (e.g. capillary plasma generation) are capable only of single plasma injections, have limited volume (10's of centimeters in length)[11], and cannot afford sustained plasma control over long combustion durations. As such, arc discharge plasmas cannot easily throttle motor-scale propellant combustion.

Pulsed, microwave-seeded plasmas, however, are a disruptive technology with which to gain control authority over propellant combustion processes. The technique suffers from none of the aforementioned drawbacks and employs short duration, high power microwave pulses, affording precise control over plasma growth. One strategy for pulsed microwave plasma generation involves operating in a sub-critical regime, below the threshold for ionization in the ambient gas. This strategy allows for preferential coupling to regions of high ionization while avoiding parasitic gas breakdown and absorption at other locations[12-14] This strategy has previously been demonstrated for both laser-generated ionization[12,15] and in atmospheric pressure hydrocarbon flames. Successful attempts at microwave supported plasma enhancement of premixed gas-phase flames[12] resulted in an increase in flame speed, a ~500° C. increase in flame temperature, and higher flammability limits. Further, the microwave transparency of many propellant ingredients[16,17] would enable uniform plasma generation in complex grain shapes and multi-segment motors. The use of microwave plasmas within motors for control may also enable throttling of higher performance propellant formulations (e.g. aluminized composites) that have flame temperatures too high to be easily controlled with pintle nozzles.

Sub-critical mode operation can be further enhanced by doping of a propellant with materials that become selective microwave absorbers upon ionization (emission of free electrons) within a propellant flame. In this way, microwave radiation can be targeted to free electrons in a propellant flame. With application to composite solid propellant burning rate enhancement, we have demonstrated the use of a novel alkali metal doping technique for efficient, targeted microwave energy deposition to the flame in order to seed the formation of a plasma.[18] Briefly, the propellant is doped with a small quantity (~3-4 wt. %) of material containing easily ionizing atoms, such as alkali earth metals (e.g. sodium in form of sodium nitrate, $NaNO_3$). During decomposition and combustion, thermal energy provided by the propellant flame ionizes free alkali earth metal atoms, forming free electrons, which upon microwave irradiation leads to targeted energy deposition and thermal plasma formation. The expected increase of gas phase flame temperature enhances radiation heat feedback to the burning surface and improves the regression rate of the propellant. At energy levels investigated, we have additionally observed the significance of aluminum in enabling plasma seeding due to the high localized flame temperatures of aluminum particle flames and through additional eddy current particle heating mechanisms. As the composition of composite propellants dictates localized flame structures temperatures, and species concentrations (e.g. $Na^+$ ion/free electron presence), we expect particulate size plays an important role in enabling the plasma seeding of a composite propellant flame. Further investigation into the effects of particle size of AP, $NaNO_3$, and Al are needed to understand the mechanism of microwave seeded plasma formation.

The specific aims of the research include: (1) to investigate the effects of AP particle size on microwave seeded plasma kernel formation; (2) Explore effects of microwave enhancement of a doped propellant on spectral emission, and (3) obtain measure of the propellant flame temperature increase associated with microwave enhancement. These objectives will be achieved through high speed unfiltered video of near-surface flame structure, spectroscopy, 2-color video pyrometry flame temperature measurement, and high resolution spectroscopy.

II. EXPERIMENTAL PROCEDURE

A. Propellant Manufacture

The propellants used in this study were produced in 100 g batches. The formulation of the propellant was varied by using different sizes of AP (200 μm, <90 μm Firefox Chemicals), $NaNO_3$ (Firefox Chemicals) and Al (30 μm, Valimet) particles. Particle sizes are controlled through use of as-manufactured materials (AP, Al), or through milling, sieving (<75 μm) and size analysis ($NaNO_3$).

Each propellant contained the same weight % of AP, $NaNO_3$, Al and HTPB binder curative. Formulations utilizing bimodal AP blends are mixed with a 4:1 coarse/fine ratio (200/90 μm). Particle sizes are those reported by the manufacturer or are obtained by sieving where noted. Propellant is mixed using a 6 quart dual planetary mixer. The propellant formulations used in this study are shown in table 2. The binder system consisted of R45 monomer, isodecyl pelargonate (IDP) plasticizer, isophorone diisocyanate (IPDI) curative, and HX-878 (tepanol) bonding agent (RCS Rocket Motor Parts). Propellant was mixed for 1.5 hours in a planetary mixer and was deaerated at room temperature for 30 minutes at vacuum pressure. Strands were cast using a polytetrafluoroethylene (PTFE) propellant strand mold and molds were placed in an explosion proof oven at 60° C. (140° F.) for seven days to cure. Densities were measured and determined to be >95% of theoretical maximum density (TMD).

TABLE 2

Propellant formulations used in this study to investigate effects of $NaNO_3$, AP, and Al particle size.

| | Propellant Composition (wt. %) | | | | |
|---|---|---|---|---|---|
| Formulation | $NaNO_3$ (<75 μm) | cAP (200 μm) | fAP (<90 μm) | Al (30 μm) | HTPB |
| fNaNO$_3$, bimodal AP | 3.5 | 55.2 | 13.8 | 15 | 16 |
| cAP, fine NaNO$_3$ | 3.5 | 69.0 | — | 15 | 16 |

B. Microwave Cavity and Propellant Combustion

Figure 20:
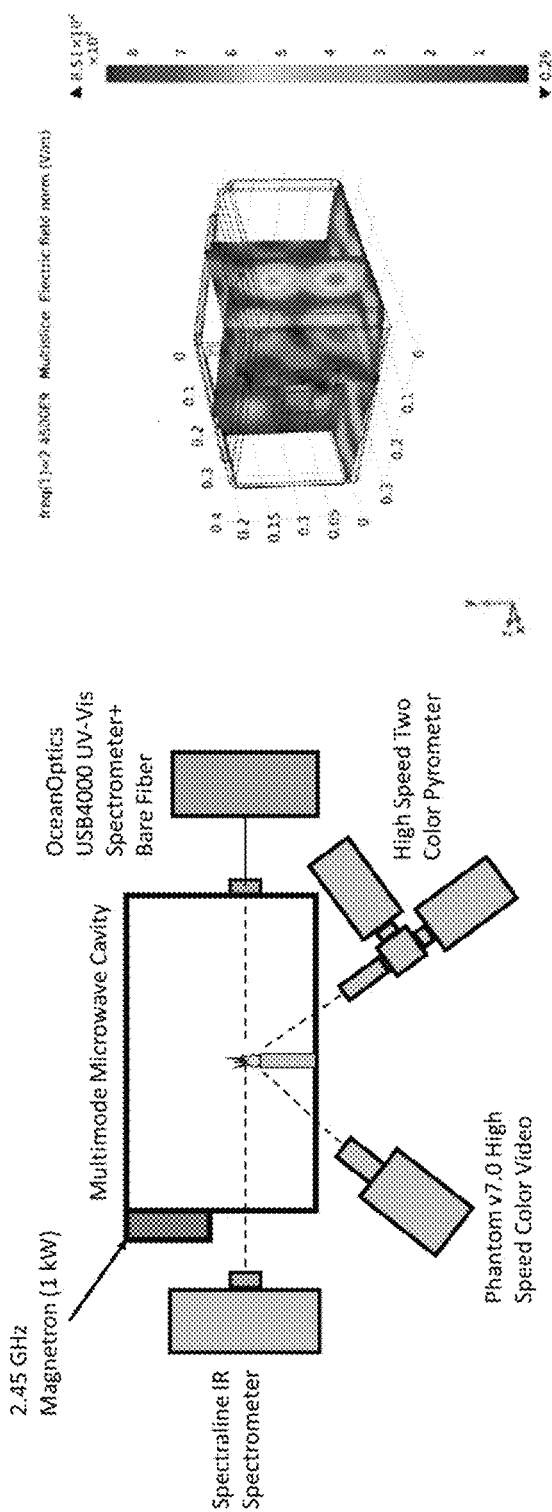
FIG. 20 is a diagram of a test set up to study the aspects of FIGS. 16-19 and a color simulation of combustion in one experiment with that set up.

A multimode microwave cavity connected to a 60 Hz modulated 2.45 GHz 1 kW magnetron was used to conduct experimental studies. The location of the strong node in the cavity was determined by finding areas of rapid heating in the cavity using both experimental and simulation techniques described later. Briefly, strands were cut to one inch lengths after curing and fixed to a flat surface behind protective shielding for observation. Combustion of propellants was conducted at 1 atm in open atmosphere. A Phantom v7.0 color camera was used to capture high speed video of the propellant combustion at frame rates of 500 frames/s (FIG. 20, left). An OceanOptics USB4000 spectrometer was used to capture UV-VIS emission spectra (200 to 1100 nm, 0.25 nm resolution, ~100 Hz) with a bare fiber and diffuser. A Spectraline ES200 IR spectrometer (0.7-5.4 µm, 0.03 µm resolution) was used to capture IR spectra at a rate of 1320 Hz. The divergence angle of the spectrometer is 0.5 degrees and is focused on a 0.5 mm wide by 6 mm tall area ~2 inches above the bottom of the propellant strand. As such, IR emission spectra are from a small point measurement just above the propellant strand and do not globally reflect emission from the entire near-burning surface flame structure. Prior to use, the IR spectrometer is intensity calibrated using a series of blackbody temperature measurements conducted at the experimental observation distance to compensate for the non-linear response of the detector and provide quantitative measurements of spectral radiance. Additionally, to capture spatial temperature information from experiments, a high speed two color video pyrometer was fabricated for these experiments and is described in detail in a subsequent experimental section.

The cavity electric field was model in COMSOL Multiphysics 5.0 and verified following procedures of the Foodservice Packaging Institute standard for microwave power output[19]. In the water heating experiment, a 100 ml beaker was filled with ~100 g of distilled water. Mass and temperature were measured before and after 30 s of microwave heating at the location of propellant combustion. From this measurement, input power can be calculated. This same experimental design was constructed in COMSOL. A volume of water with approximately the same volume, shape and mass was placed in the same location. The RF heating model was utilized to calculated bulk water heating of 30 sec. Results from both experimental and computational were in ~10% from each other. Furthermore, results from the COMSOL simulation of E-Field distribution of the multimode microwave cavity at the propellant burning location can be seen on FIG. 20 at right. From the verified simulation, the E-field strength within the node where combustion occurs is ~7.0 kV/m.

See FIG. 20. Left: Experimental Setup for the study of the two different propellant formulations. Right: COMSOL simulation of an unloaded 1 kW, 2.45 GHz microwave cavity. E-field distribution shown and multi-slices taken at the propellant burning location.

C. Two-Color Video Pyrometer

The pyrometer utilizes band pass filters (800±10 nm FWHM and 690±10 nm FWHM, Thorlabs). These two wavelengths were selected to minimize calculated temperature error from band emission occurring in propellant combustion. The pyrometer splitter and filter assembly was mated with two Phantom 7/9 high speed video cameras operating at 500 frames/s.

The two color pyrometer was calibrated using a 5 mm wide tungsten ribbon filament operated at 2000 to 3000 K within an argon filled quartz tube. The nonlinear response of detectors is well documented[20]. Calibration of the two color pyrometer was curve fitted and was approximately linear ($R^2=0.9477$) in the range of calibration, with nonlinearity as temperature approaches 3000 K. The specific advantages of this technique over either a QTH lamp or a blackbody cavity are the ability to eliminate directional emissivity errors resulting from large angles of incidence and the ability to calibrate to higher temperatures.

The two color pyrometer include a Nikon 50 mm Macro Lens, attached to a 50/50 splitting cube to two different bandpass filters and two high speed Phantom cameras. Both band pass filters of 800±10 nm FWHM and 690±10 nm FWHM were selected based on the emission spectrum of composite solid propellants having a gray body curve at these two locations, (i.e. not peak emission). Before every experiment, the cameras were registered by taking images of a registration photos, then post process to align up. Both camera were triggered and frame synced in order to make sure each image is at the same instant. Data collected from each experiment was post processed using MATLAB. Due to slight pixel misalignment error, erroneous temperatures at the edge of the flame were not reported. Moreover, saturated pixels were also not reported. The equation to a gray body curve utilizing two different wavelengths can be estimated by a modified Wien approximated to calculate temperature can be seen in equation (1), where A is the correction factor from calibration, h is the Planck's constant, c is the speed of light, k is the Boltzmann's constant, $\lambda_1$ and $\lambda_2$ is the bandpass filter selected, and $T_{obj}$ is the temperature of the object.

$$A * SR(\lambda_2, \lambda_1) = \frac{\lambda_1^5}{\lambda_2^5} \frac{e^{\frac{hc}{\lambda_1 T_{obj}}}}{e^{\frac{hc}{\lambda_2 T_{obj}}}} \tag{1}$$

Figure 21:
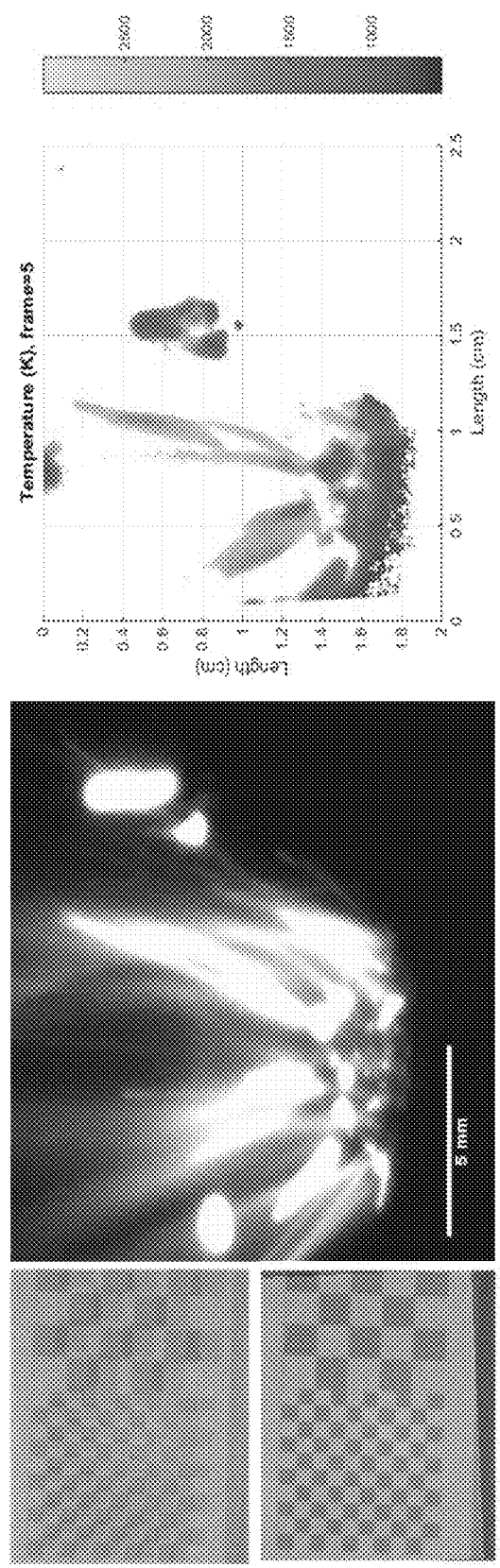
FIG. 21 are illustrations, photos, and color graphs relating to the test set up of FIG. 20 and its use.

See FIG. 21. Left: Demonstration of image registration procedure for the two unaligned cameras (top) to correct for alignment (bottom). Center: Still frame image of burning aluminized AP composite propellant. Right: Two-color pyrometer calculated temperature distribution of the same.

III. RESULTS & DISCUSSION

A. High Speed Video Image Sequences

Figure 22:
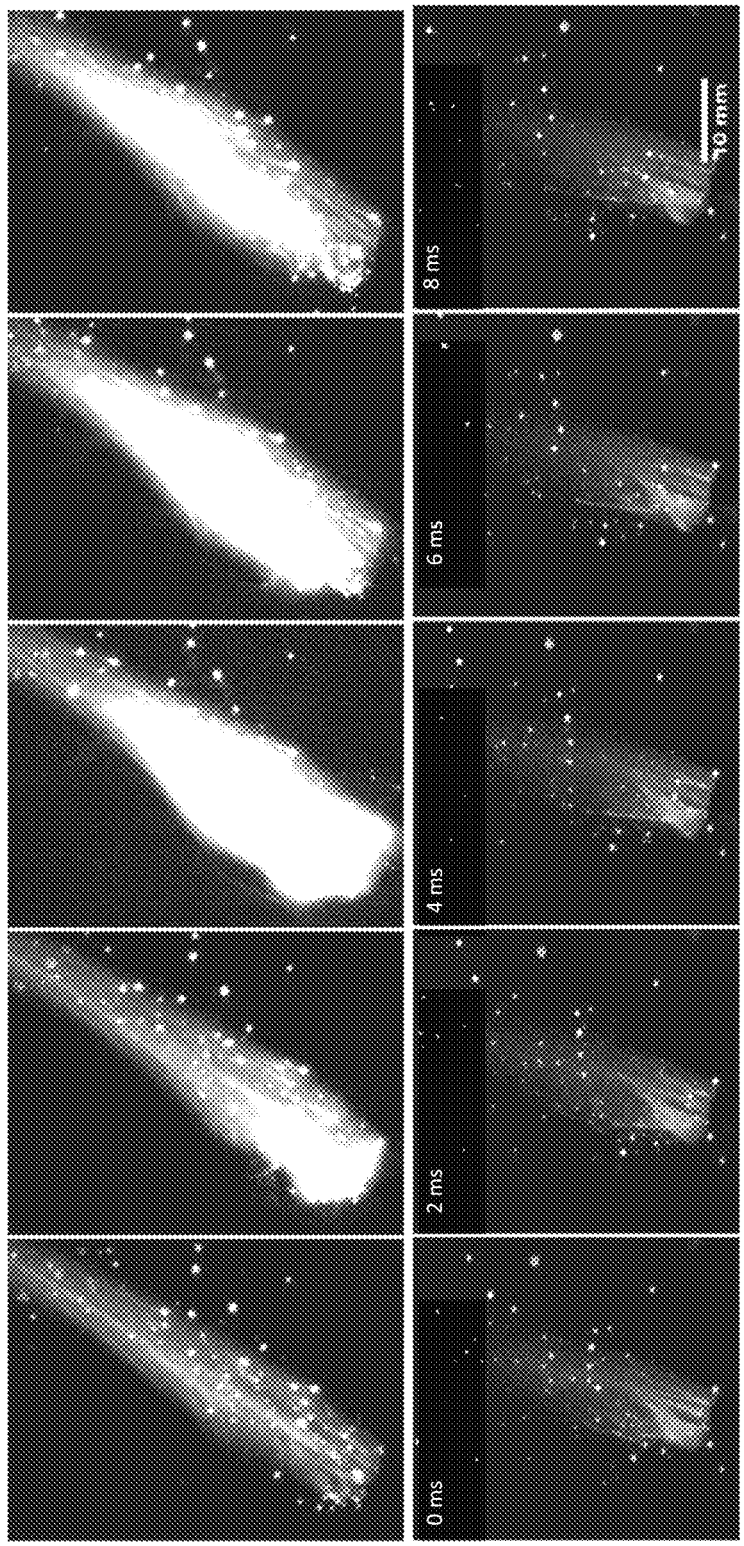
FIGS. 22 and 23 are high speed photographs of flame enhancement of a sodium nitrate doped composite solid propellant according to aspects of the present invention relative to flames with (top) and without (bottom) microwave enhancement within the experimental configuration described in FIG. 1.
Figure 23:
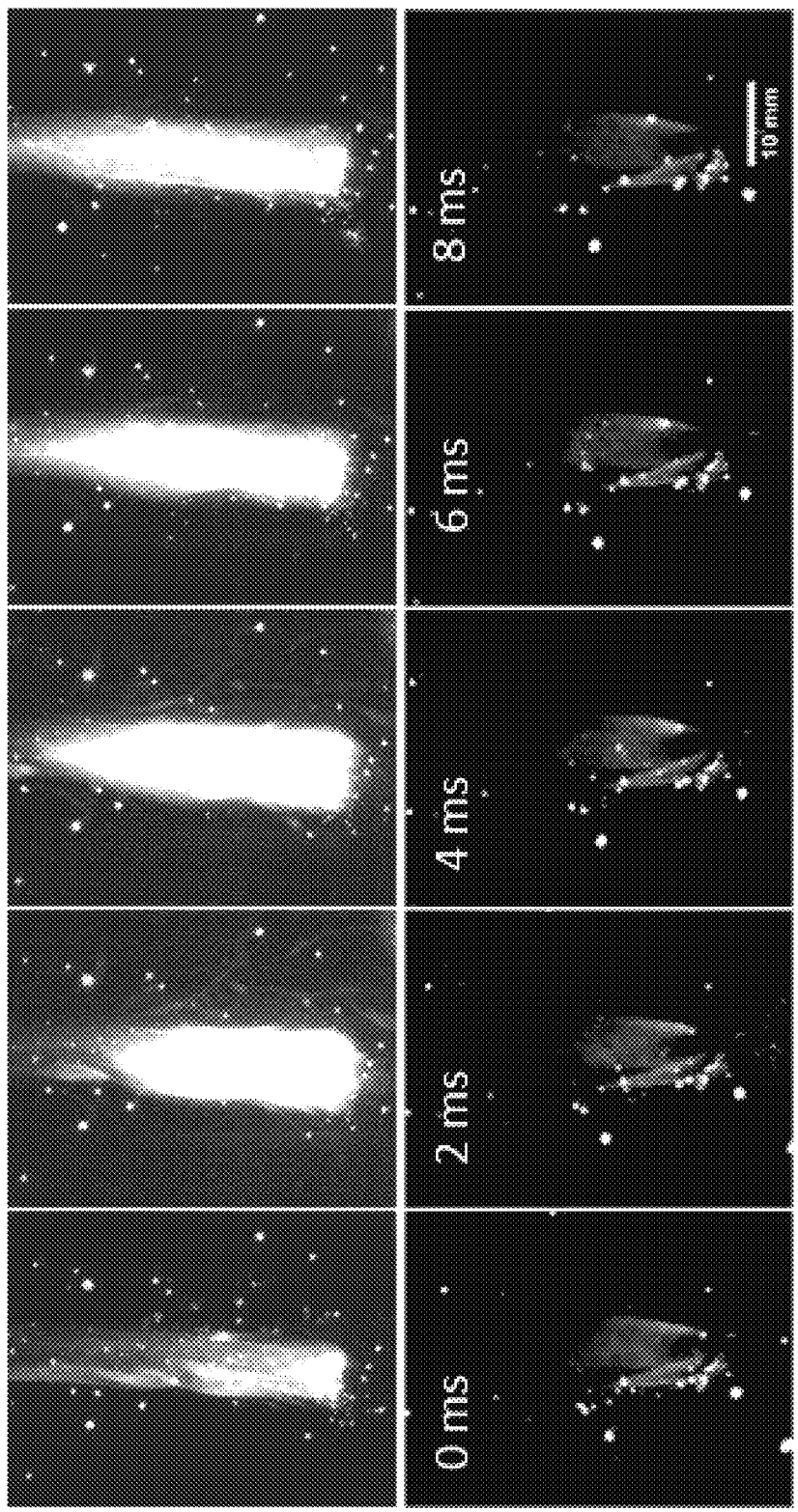

Very low concentration of sodium atoms are required to generate a plasma under microwave energy. This study was conducted using a 1 kW, 2.45 GHz multimode cavity. At the propellant flame volume location, 550 watts of power was measured and model with methods described above. High speed imaging of bimodal AP fine NaNO$_3$ propellant and Course AP fine NaNO$_3$ is shown in FIGS. 22 and 23. The coarse AP propellant flame structure is more compact and the formation of kernels are less disturbed and larger kernel size when compared to the 90 µm AP propellant. In the top sequence, discrete kernels feed the thermal plasma during microwave enhancement. The propellant flame appears to be roughly uniform in size and combustion in the absence of microwave field. However, when microwave field is applied to the propellant, the plasma results in a significant increase in emission intensity as well as the propellant flame size. Plasma formation and extinguishment is observed to occur within a ~7 ms duration. It is worth noting that plasma burning rate enhancement can occur from either or both of (a) enhanced radiative heat feedback from the higher temperature plasma to the burning surface, or (b) direct plasma ablation of the burning surface, which has been observed by others in electrothermal-chemical (ETC) launchers.[5,6,8] Additional burning rate enhancement may additionally occur from heating of propellant through a number of condensed phase loss mechanisms.

See FIG. 22. Image sequence captured by high speed video (50 μs exposure) of flame structure of 69/15 (AP/AL), 3.5% NaNO$_3$, Bimodal AP 90/200 μm propellant burning at 1 atm pressure with application of 1 kW, 2.45 GHz 60 Hz modulated microwave irradiation (top) and without microwave application (bottom). Objective, aperture, and exposure settings are the same for both experiments.

See FIG. 23. Image sequence captured by high speed video (50 μs exposure) of flame structure of 61/15 (AP/AL), 3.5% NaNO$_3$, Coarse AP 200 μm propellant burning at 1 atm pressure with application of 1 kW, 2.45 GHz 60 Hz modulated microwave irradiation (top) and without microwave application (bottom). Objective, aperture, and exposure settings are the same for both experiments.

B. UV-VIS Spectroscopy of Microwave Enhanced and Unenhanced Propellant Flames

Figure 24:
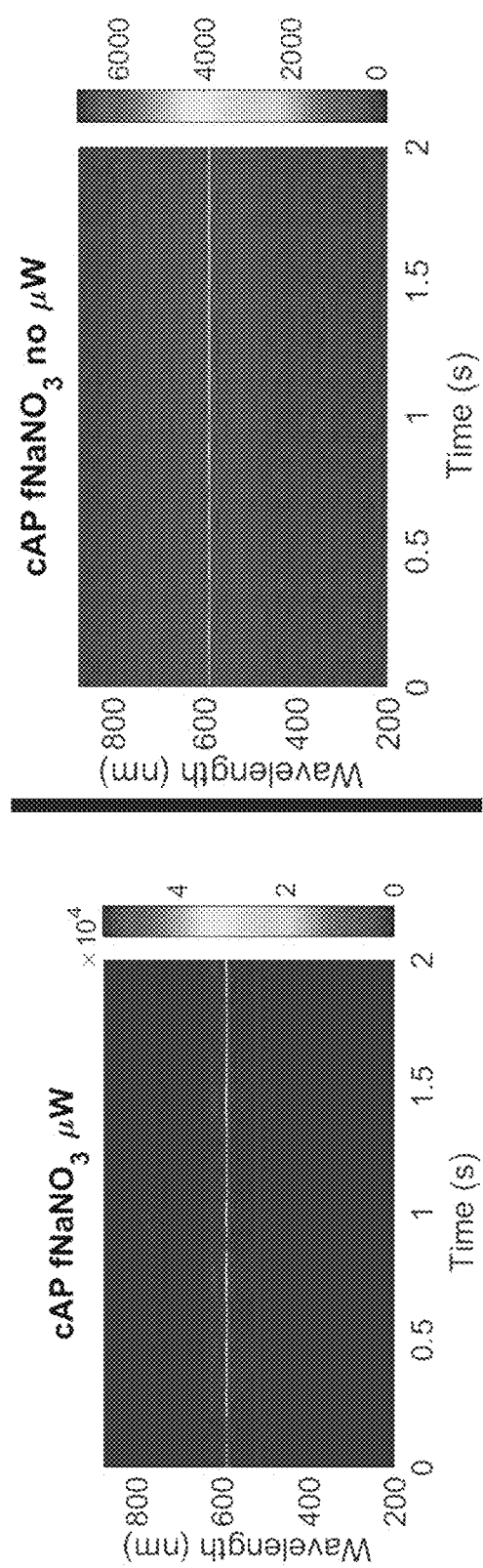
FIG. 24 are time-integrated emission spectra from the combustion of sodium nitrate doped AP composite propellants with (left) and without (right) microwave irradiation within the experiment described in FIG. 1.
Figure 25:
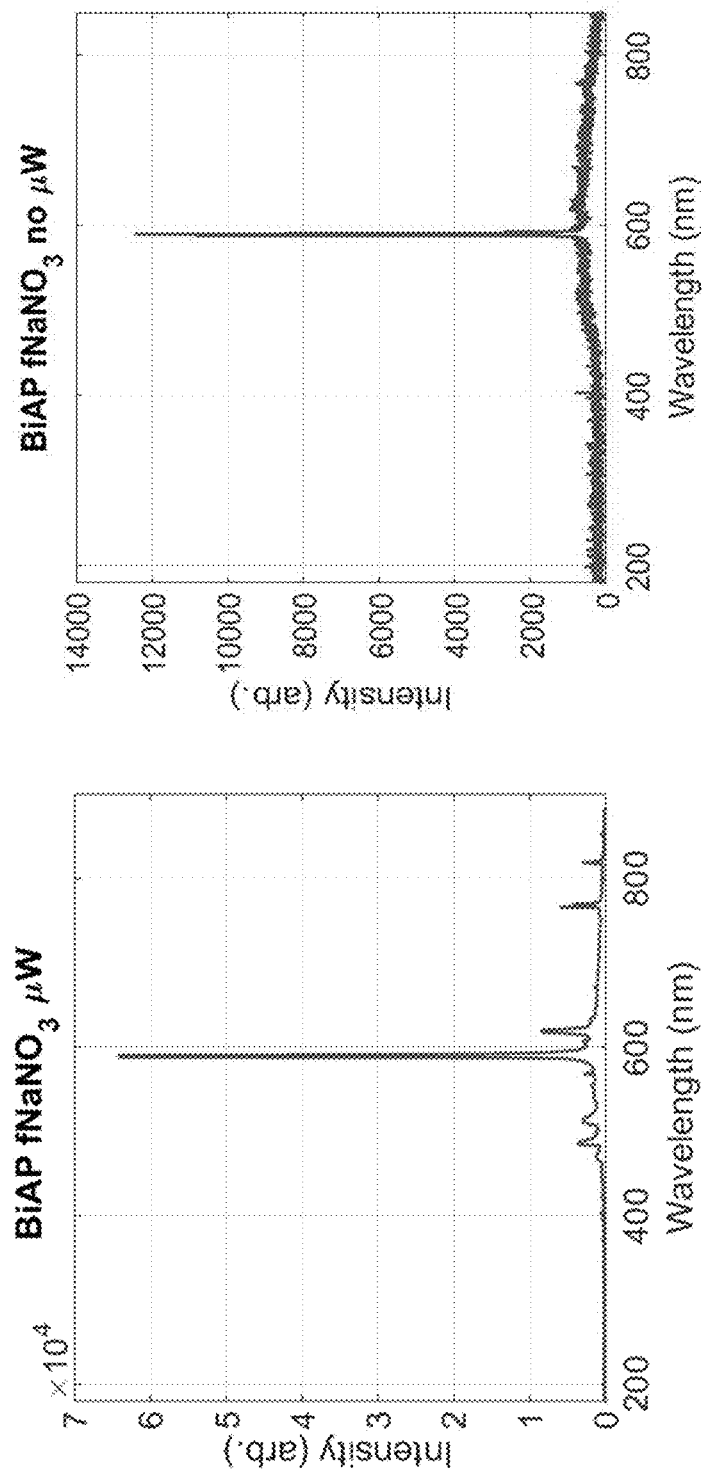
FIG. 25 are different graphs illustrating typical emission spectra from combustion of sodium nitrate doped composite propellant combustion with (left) and without (right) microwave enhancement within the combustion experiment described in FIG. 1.

Emission spectra (200-850 nm) of the combustion of bimodal AP fNaNO$_3$ both with and without microwave application were collected (FIG. 24). Spectra for both sets of data were collected with similar exposure times and indicate overall increase in visible spectrum emission intensity, with particularly increased sodium emission (589 nm). FIG. 25 shows a 2-D plot of UV-VIS emission intensity verse time of coarse AP fine NaNO$_3$ flame emission both with microwave application (during microwave plasma enhancement) and without microwave application. Plasma formation shows strong gray body thermal emission enhancement accompanied by strong metal combustion (AlO, Al, Na). Furthermore, there is no peak emission at the two wavelengths choices for the two color pyrometer (690 nm and 800 nm), validating it is an appropriate assumption for temperature measurements.

See FIG. 24. 2-D plot of spectrum intensity vs time of the 69/15 (AP/Al), 3.5% NaNO$_3$, Coarse modal AP 200 μm combustion with and without microwave enhancment. Color bars indicate emission intensity (arb. units) using the same exposure times for both experiments.

See FIG. 25. Selected UV-VIS spectra from combustion of 61/15 (AP/Al), 3.5% NaNO$_3$, bimodal AP 90/200 μm with (left) and without (right) microwave enhancement. Both spectra were acquired using similar exposure times.

C. IR Spectroscopy of Microwave Enhanced and Unenhanced Propellant Flames

Time-resolved IR spectra are collected from emission from propellant flames (FIG. 26) and indicate microwave-flame coupling produces significant spectral enhancement. As described previously, measurements are of a small volume above the burning surface of the propellant and as such do not necessarily represent bulk (average) emission from the propellant flame. For experiments without microwave enhancement, only emission from hydrocarbon combustion (~4.2 to 4.7 μm) can be observed. However, with microwave coupling, we observe significant emission enhancement within the flames over wavelengths of ~1 to 3 μm. Additional enhancement of emission from hydrocarbon combustion is observed at ~4.2 to 4.7 μm. The enhancement is observed to be periodic with a frequency of ~60 Hz, matching the frequency of magnetron modulation. Enhancement, however, is not observed during each period. This is a result of migration of the plasma to other regions of the cavity, which results in selective microwave energy deposition to these regions, which are not near the burning surface or within direct sight of the IR spectrometer. In some instances, however, transient events can quench during low field strength times, allowing selective deposition again to the near burning surface flame.

More specifically, the time variation of spectral emission (FIG. 26 bottom left) is observed to vary drastically on the time scale of one of the microwave-flame coupling events. As can be seen, coupling results in significant enhancement of gray body emission. Fitting of gray body emission spectra between 1.0 and 4.0 μm using a procedure described by Terry et al[21] (FIG. 26, bottom right) shows a temperature enhancement of ~800 K occurs during dynamic coupling events.

Figure 26:
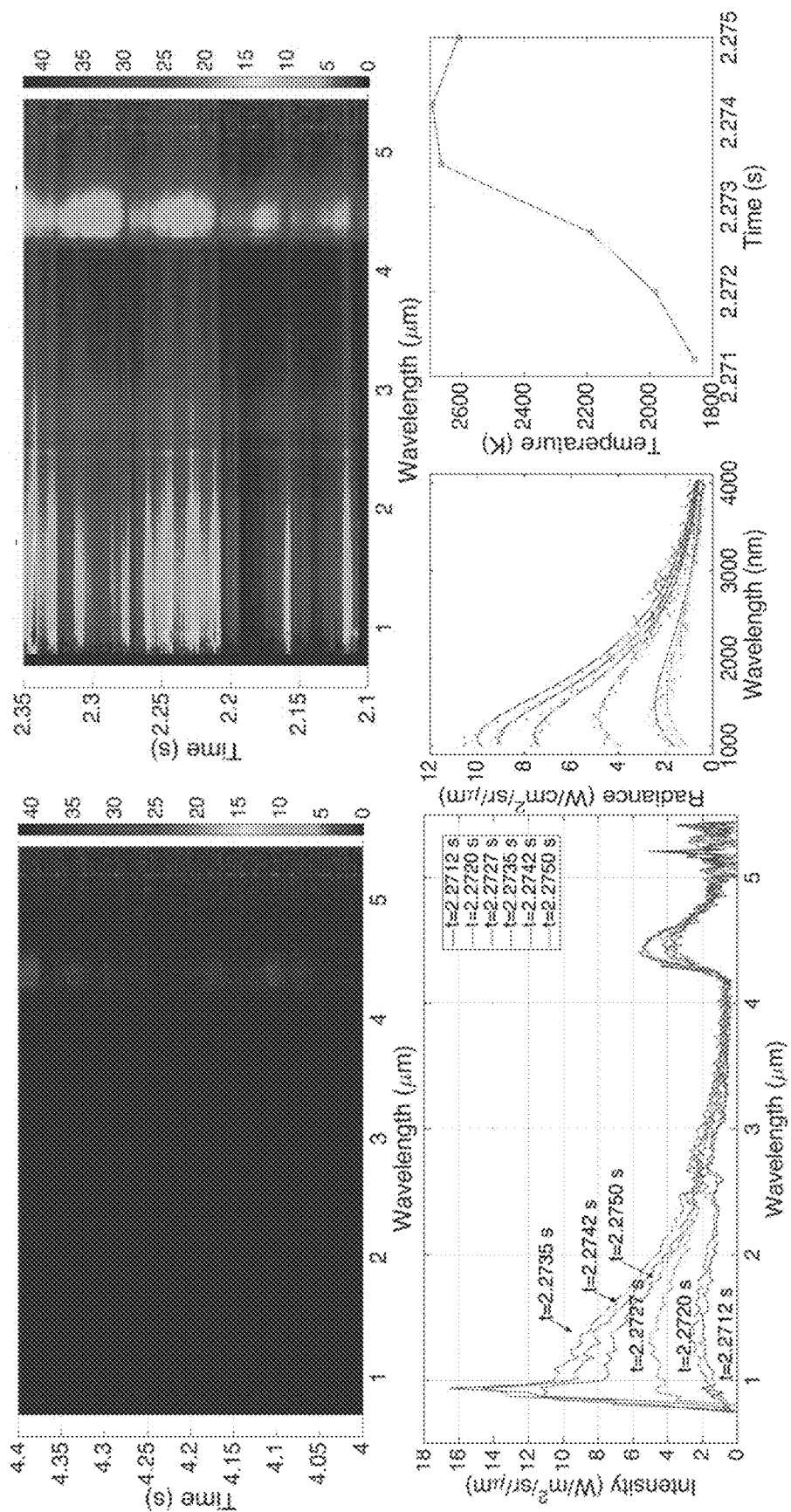
FIG. 26 are time-integrated measurements of infrared emission from combustion of sodium nitrate doped AP composite propellant flames without and with microwave enhancement and associated temperature enhancement as a result of microwave field application.

See FIG. 26. Top Left: Time-resolved IR spectral map of the flame of a non-microwave enhanced coarse AP, fine NaNO$_3$ composite propellant. Top Right: Time-resolved IR spectra from combustion of the same propellant with 60 Hz modulated microwave field application. Color bar color ranges for the two plots are the same and indicate calibrated spectral radiance in W/m$^2$/sr/μm. Bottom Left: Time-resolved spectral radiance intensity from microwave-enhanced coarse AP, fine NaNO$_3$ propellant flame indicating enhanced gray body emission during a microwave coupling event. Bottom Right: Gray body fits of spectral radiance and raw spectral radiance data from 1 to 4 μm with gray body fit calculated temperature as a function of time during one of the dynamic plasma coupling events.

D. High Speed Two Color Pyrometer Results

Notch filtered high speed video was collected of the two propellant formulations and post-processed to produce videos of temperature during microwave plasma enhancement of propellant combustion. Image sequences can be seen in FIGS. 26 and 27. Plasma formation and quenching occurs over a ~7 ms duration. Initially, high temperature Al particles can be seen pre-plasma formation, with approximate temperature of ~2400-2900 K, which is consistent with the diffusion flame temperature of burning aluminum particles within composite propellant flame.[22] When microwave energy is introduce into the composite propellant flame, large volume temperature enhancement is observed to nucleate near burning aluminum particles and rapidly grows. Temperature enhancement regions have temperatures of 3200 to 3700 K, with peak temperatures in localized regions of up to 4000 K being observed. The extent of the temperature-enhanced region remains narrow and enclosed within the flame volume and extends ~50 mm above the propellant burning surface. Pyrometer measured temperatures are higher than the predicted temperature enhancement measured from IR emission. It is expected that there is some error in IR gray body calculated temperatures due to the divergence of the IR spectrometer observation slit. However, IR-calculated temperatures indicate a temperature increase of ~800 K during a microwave enhancement event, which is consistent with the magnitude of temperature enhancement observed via two-color video pyrometer during an enhancement event.

Figure 27:
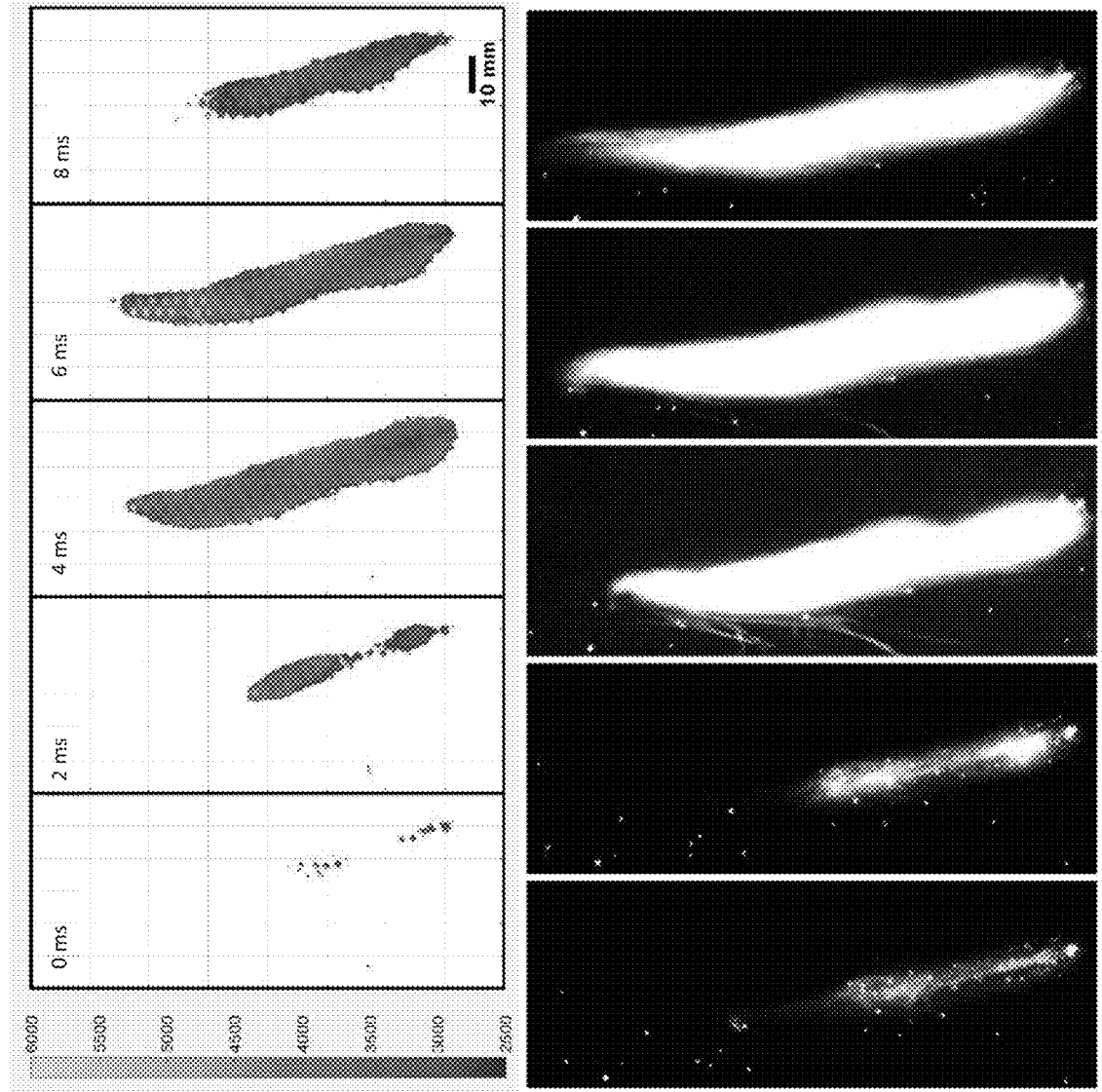
FIGS. 27 and 28 are temperature measurements and the associated still frame image sequence of the combustion of a doped composite propellant exposed to microwave irradiation in the experimental configuration described in FIG. 1.
Figure 28:
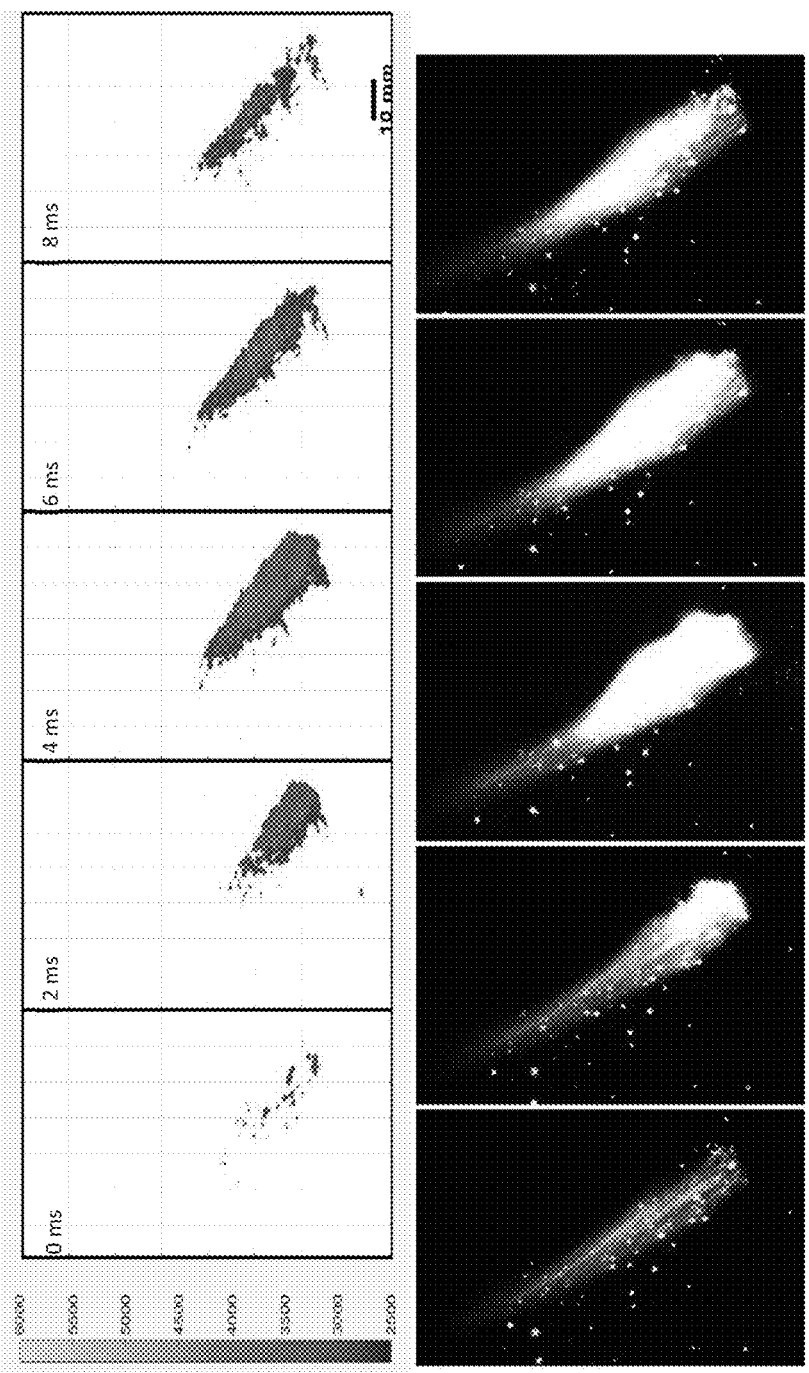

Burning Al particles appear to preferentially seed plasma formation occurs initially, then growing throughout the particle flame, also seen in FIGS. 27 and 28. Burning aluminum particles are expected to serve as preferential microwave coupling and plasma kernel formation sites because of their (1) high temperature (the highest temperature portion of the propellant flame) and (2) additional energy deposition to the particles through eddy current absorption modes. The resulting higher temperature near particles is expected to enhance thermal ionization of the NaNO$_3$ forming Na$^+$ ions and free electrons that interact with the microwave While microwave enhancement can enhance regression rate through a number of modes, the significantly increased bulk flame temperature is expected to have a significant effect on the enhancement of propellant regression rate, and similar studies using microwave enhancement of NaNO$_3$ doped composite solid propellants has demonstrated burning rate enhancement of ~67% is possible[18]. The abundance of seeding events occurring near the propellant burning surface suggest propellant heterogeneity effects are important to the plasma formation process. Comparing the two different formulation, it seems that solely Al is the key contributor of plasma enhancement with both formation have approximately the same plasma temperature.

See FIG. 27. (Top) Image sequence captured by two color pyrometer of flame temperature of 69/15 (AP/Al), 3.5% fine NaNO$_3$, coarse AP 200 μm propellant burning at 1 atm pressure with application of 1 kW, 2.45 GHz 60 Hz modulated microwave irradiation. The interference pattern observed the figure is a result of imaging through a faraday cage grating. Bottom: High speed color image sequence of the same.

See FIG. 28. Top: Image sequence captured by two color pyrometer of flame temperature of 69/15 (AP/Al), 3.5% fine NaNO$_3$, coarse AP propellant burning at 1 atm pressure with application of 1 kW, 2.45 GHz 60 Hz modulated microwave irradiation. The interference pattern observed in the figure is a result of imaging through a faraday cage grating. Bottom: High speed color image sequence of the same.

IV. CONCLUSION

This work demonstrates the ability to enhance the flame temperature of a burning aluminized AP composite propellant using low level sodium nitrate doping to support formation of microwave supported plasmas within the composite propellant flame. High speed imaging suggests plasma formation is assisted by localized high temperatures of Al particles, in which plasma formation initially occurs, then grows from the thermal ionization of sodium nitrate to spread through the flame. Furthermore, two color pyrometry and curve fitting of high speed IR spectral radiance data both suggest that during plasma coupling events, flame temperature enhancement of ~800 K is possible with localized regions of even greater temperature enhancement. Using the technique, dynamic temperature enhancement can be made to occur near the burning surface, where enhanced thermal feedback to the propellant surface can increase burning rate. Results indicate that thermally excited regions spread quickly within flames and serve as energy deposition sites for subsequently applied microwave energy. As such, pulsed microwave application techniques would be beneficial in control of spread/anchoring of thermally enhanced regions within flames.

Further efforts will focus on measurement of microwave plasma formation of doped solid propellant in atmospheric condition utilizing a high power pulsed magnetron source in a well-characterized impedance-matched and tuned microwave waveguide cavity. These studies will enable study of the effects of microwave pulse profiles to control the spread of thermal enhancement. Experiments within a waveguide cavity will additionally measurement of energy deposition to the flame for determination of power requirements of the technique. Pulsed microwave application techniques are expected to be particularly advantageous, as they have peak powers multiple orders of magnitude higher than continuous techniques and have much lower average power requirements. Pressure is expected to additionally play an important role on thermal quenching times and will additionally be studied. Sodium PLIF will also be utilized to map the sodium ion distribution in the flame before and during plasma formation. Overall, this and previous efforts at atmospheric pressure indicate sodium nitrate doping techniques combined with microwave plasma enhancement can significantly enhance propellant burning rate and flame temperature; the technique holds promise to enable dynamic enhancement and control of motor thrust and burning rate. The technique may additionally be used to gain control of gas phase flame thermal feedback in order to extinguish propellant combustion.

V. REFERENCES

[1] Chakravarthy, S. R., Seitzman, J. M., Price, E. W., and Sigman, R. K., "Intermittent Burning of Ammonium Perchlorate-Hydrocarbon Binder Monomodal Matrixes, Sandwiches, and Propellants," *Journal of Propulsion and Power*, vol. 20, 2012, pp. 101-109.

[2] Parr, T., and Hanson-Parr, D., "Optical Diagnostics of Solid-Propellant Flame Structures," *Solid Propellant Chemistry, Combustion, and Motor Interior Ballistics*, V. Yang, T. B. Brill, and W. Ren, eds., Reston, Va.: 2000, pp. 381-411.

[3] Culick, F. E. C., *Unsteady Motions in Combustion Chambers for Propulsion Systems*, NATO Research and Technology Organization Report AG-AVT-039, 2006.

[4] Sawka, W. N., Katzakian, A., and Grix, C., "Solid State Digital Propulsion Cluster Thrusters for Small Satellites Using High Performance Electrically Controlled Extinguishable Solid Propellants," *The Annual AIAA USU Conference on Small Sattelites*, 2005, pp. 1-7, SSC05-XI-3.

[5] Li, J., Litzinger, T. A., and Thynell, S. T., "Plasma Ignition and Combustion of JA2 Propellant," *J. Propul. Power*, vol. 21, 2005, pp. 44-53.

[6] Li, J., Litzinger, T. A., Das, M., and Thynell, S. T., "Recombination of electrothermal plasma and decomposition of plasma-exposed propellants," *Journal of Propulsion and Power*, vol. 22, 2006, pp. 1353-1361.

[7] Porwitzky, A. J., Keidar, M., and Boyd, I. D., "On the Mechanism of Energy Transfer in the Plasma-Propellant Interaction," *Propellants Explosives Pyrotechnics*, vol. 32, 2007, pp. 385-391.

[8] Yong, J., and Baoming, L., "Calculation of Plasma Radiation in Electrothermal-Chemical Launcher," *Plasma Science and Technology*, vol. 16, 2014, pp. 50-53.

[9] Li, X., Li, R., Jia, S., and Zhang, Y., "Interaction features of different propellants under plasma impingement," *Journal of Applied Physics*, vol. 112, 2012, p. 063303.

[10] Alimi, R., and Berdichevsky, V., "Mechanism of solid propellant combustion submitted to a high plasma flux," *Propellants, Explosives, Pyrotechnics*, vol. 33, 2008, pp. 118-121.

[11] Porwitzky, A. J., Scalabrin, L. C., Keidar, M., and Boyd, I. D., "Chemically reacting plasma jet expansion simulation for application to electrothermal chemical guns," *16$^{th}$ Plasmadynamics Lasers Conference*, Miami Fla.: 2007, pp. 1-17, AIAA 2007-4600.

[12] Michael, J. B., Dogariu, A., Shneider, M. N., and Miles, R. B., "Subcritical microwave coupling to femtosecond and picosecond laser ionization for localized, multipoint ignition of methane/air mixtures," *Journal of Applied Physics*, vol. 108, 2010, p. 093308.

[13] Popović, S., Exton, R. J., and Herring, G. C., "Transition from diffuse to filamentary domain in a 9.5 GHz microwave-induced surface discharge," *Applied Physics Letters*, vol. 87, 2005, p. 061502.

[14] Esakov, I. I., Grachev, L. P., Khodataev, K. V., Bychkov, V. L., and vanWie, D. M., "Surface Discharge in a Microwave Beam," *IEEE Transactions on Plasma Science*, vol. 35, 2007, pp. 1658-1663.

[15] Barker, P. F., McAndrew, B., Macheret, S. O., and Miles, R. B., "Control of sub-critical microwave filamentary plasma in dense gases," *IEEE ICOPS*, New Orleans, La.:, 2000, p. 158.

[16] Hasue, K., Tanabe, M., and Watanabe, N., "Initiation of some energetic materials by microwave heating," *Propellants, Explosives, Pyrotechnics*, vol. 15, 1990, pp. 181-186.

[17] Daily, M. E., Glover, B. B., Son, S. F., and Groven, L. J., "X-Band Microwave Properties and Ignition Predictions of Neat Explosives," *Propellants Explosives Pyrotechnics*, vol. 38, 2013, pp. 810-817.

[18] J. Lynch, Manny Ballestro, S. J. Barkley, R. Cazin, J. B. Michael, T. R. Sippel., "Microwave-Supported Plasma Combustion Enhancement of Composite Solid Propellants Using Alkali Metal Dopants,"*AIAA Aerospace Sciences Meeting*, San Diego Calif.: Jan. 5, 2016.

[19] "Standard Test Method to Qualify Single-Use Foodservice Packaging for Use in Microwave Oven," FoodService Packing Institute, February, 2007

[20] Shankar N., "Interaction of carbon nanotubes and diamonds under hot-filament chemical vapor deposition conditions," Ph.D. Dissertation, Department of Mechanical Engineering, University of Illinois at Urbana-Champaign, Champaign, Ill., 2007.

[21] Terry, B. C., Lin, Y.-C., Manukyan, K. V., Mukasyan, A. S., Son, S. F., and Groven, L. J., "The Effect of Silicon Powder Characteristics on the Combustion of Silicon/Teflon/Viton Nanoenergetics," Propellants, Explosives, Pyrotechnics, vol. 39, 2014, pp. 337-347.

[22] Price, E. W., in Fundamentals of Solid Propellant Combustion (K. K. Kuo and M. Sommerfield, Eds.), Progress in Astronautics and Aeronautics, New York, N.Y., 1984, Vol. 90, pp. 479-513.

F. Specific Example 4 (FIGS. 29-32)

This fourth example is with reference to FIGS. 29 to 32. It is in the context of an energetic material in the form of a doped solid composite propellant and microwaves in pulsed mode in an experimental setup. The example is proof of concept of enhancement of combustion.

This example uses microsecond pulses of higher power microwave energy to excite flames. It shows through measurement of microwave energy directed at, reflected from, and absorbed by propellants and flames that enhancement of the propellant flame is an efficient process. Results support pulsed technique can produce similar burning rate enhancement to continuous irradiation using two or three times less power (approximately 300 watts average power under the described context and parameters).

Pulsed Microwave Enhancement of Doped Composite Solid Propellants

Development of higher impulse and advanced functionality solid propulsion systems requires efficient techniques for establishing in-flight, dynamic control of the burning rate and thrust of high specific impulse propellants. Previous work has demonstrated that doping solid propellants with alkali earth metals can enhance the electronic environment of a propellant flame through thermal ionization, enabling the ability to form and sustain plasma kernels within a propellant flame using ~1 kW continuous microwave irradiation. While enhancement observed using 1 kW continuous irradiation is promising, improved plasma volume control and more efficient enhancement may be possible using shorter duration, higher field strength pulsed microwave energy. Pulsed sources can preferentially deposit energy to high temperature or high ionization regions while minimizing parasitic losses and can maintain better control of the plasma volume through duty cycle. Further, the higher field strengths produced by pulsed sources may eliminate the need for alkali dopants. This study explores use of 30 kW, ~1-2 microsecond duration, 3.0 GHz pulsed radiation application to a burning composite solid propellant within a resonant single-mode waveguide cavity. Forward and reflected power measurements and imaging are used to explore energy absorption to the flame as well as its effects on combustion of a sodium nitrate doped aluminized AP composite propellant. Findings indicate that pulsed microwave energy is efficiently absorbed by the propellant flame and that energy absorption is localized near the propellant burning surface. These results combined with separate studies conducted using a modulated continuous field suggest energy absorption by burning aluminum agglomerates and their resulting flame/product structure are important and may serve as a mechanism through which pulse enhancement occurs. Further study of the flame structure under pulse enhancement as well as exploration of the enhancement of different compositions (with and without dopant) are needed.

V.

I. INTRODUCTION

The development of strategies for on-demand control and enhancement of composite solid propellant combustion can enable game changing improvements in solid rocket motor performance, utility, and safety. Currently, several propellant combustion control techniques exist to date including chamber pressure control (e.g. pintle nozzles or rapid depressurization quench)[1], infrared laser irradiation of the burning surface[2], development of inherently unstable combustion chamber geometries (producing either local pressure or velocity perturbation)[3], and the use of hydroxylammonium nitrate (HAN)-based formulations that have voltage potential sensitive burning rates.[4] These techniques have several drawbacks in that they are formulation-specific, result in significantly reduced motor mass fraction, are not easily implemented in a motor configuration, or produce only a single perturbation.

To date, the use of plasmas for propellant ignition and burning rate enhancement has been studied in electrothermal-chemical (ETC) gun launch system, which suggests improvement in flame spread, pressurization rate, and enhance propellant burning rate.[5,6] Burning rate enhancements of up to 21% have been experimentally observed[9], and computational studies suggest much higher burning rate enhancement may be possible with higher propellant solid loading.[10] The ETC propellant system utilizes arc discharge technique for plasma generation, which cannot sustain plasma control over a long combustion duration and is only capable of a single shot in a limited size volume (10's of centimeter in length).[11] Consequently, arc discharge plasmas cannot be easily used for solid rocket motor combustion control.

Pulsed, microwave-seeded plasmas are a noninvasive technique with which to gain control over propellant combustion process. The technique does not suffer many of the aforementioned drawback and employs short duration, high power microwave pulses, affording precise control over plasma growth processes which become problematic in non-vacuum environments. Pulsed microwave sources operate with high peak power and low duty cycle, allowing rapid generation of plasmas from volumes of high electron number density. High peak power (>30 kW) microwave sources are commercially available in the S- and X-band range (2-12 GHz), providing long wavelengths relative to typical reaction zones (mm to cm). One strategy for pulsed microwave plasma generation has been demonstrated for both laser-generated ionization and in atmospheric pressure hydrocarbon flames,[12-14] which involves operating in a subcritical regime, below the threshold for ionization in the ambient gas. This strategy allows for preferential coupling to regions of high ionization while avoiding parasitic gas breakdown and absorption at other locations.[12-15] Successful attempts at microwave supported plasma enhancement of premixed gas-phase flames[12] resulted in an increase in flame speed, a ~500° C. increase in flame temperature, and higher flammability limits. Further, the microwave transparency of many propellant ingredients[16,17] may enable uniform pre-plasma field distributions in complex grain shapes and multi-segment motors. Modification of a motor for microwave enhancement requires no moving parts and is simplified by utilization of the motor casing as an in-situ waveguide, requiring only the addition of an RF pressure window transition for magnetron interfacing. Microwave plasma enhancement within a motor for on-command control may enable throttling of higher performance propellant formulations (e.g. aluminized composites) that have flame temperatures too high to be easily controlled with pintle nozzles.

Presently, a series of experiments and simulation have revealed the ability of a solid propellant doped with sodium nitrate ($NaNO_3$) to generate from thermal ionization electron populations capable of coupling with microwave irradiation to generate plasmas at 1 atm.[18,19] Briefly, this technique is achieved by doping a composite solid propellant with an alkali earth metal dopant which upon decomposition electronically enhances the propellant flame through thermal ionization formation of $Na^+$ ions and free electrons which upon interaction with a microwave E-field, seed formation of a thermal plasma with temperature more than the propellant flame temperature. Higher flame temperature can increase heat feedback to the propellant burning surface, increasing regression rate. Using this technique, atmospheric pressure flame temperature enhancements of 500-1000 K have been observed.[19] Plasma kernels were frequently observed to seed in the near-burning surface portion of the flame, in regions of metal particle combustion events, where localized flame temperatures are highest and prevalent sodium ionization is expected. Though significant enhancement was observed from these experiments, the multimode, continuous wave cavity environment of these experiments frequently led to convective transport of plasma enhanced regions away from the burning surface, resulting in non-ideal deposition of energy to hot combustion products far from the burning surface. As such, significant burning rate enhancement beyond demonstrated improvements using continuous wave techniques, as well as improved combustion control is expected to be possible with pulsed microwave techniques. Pulsed microwave enhancement could take advantage of short seeding and plasma relaxation times to prevent parasitic energy deposition to features far from the burning surface, effectively optimizing heat feedback to the burning surface by "anchoring" plasma enhancement regions.

The specific aims of the research include: (1) investigation of the efficiency pulsed microwave irradiation energy deposition to the flame of a sodium nitrate doped, aluminized AP composite propellant; (2) exploration of pulsed microwave effects on plasma formation and flame structure; (3) exploration of pre- and post-pulse environments to understand control timescales of pulsed microwave techniques. These objectives are achieved through high speed, high magnification imaging of propellant combustion in a tuned, single-mode, standing wave atmospheric pressure microwave-combustion applicator utilizing diode power measurement.

II. EXPERIMENTAL PROCEDURE

A. Propellant Manufacture

The propellant formulations used in this study were produced in 200 g batches. Propellants were comprised of ammonium perchlorate (AP) (200 µm, <90 µm Firefox Chemicals), sodium nitrate ($NaNO_3$) (<75 µm Firefox Chemicals) and Al (30 µm, Valimet; 80 nm, Novacentrix) particles. Particle sizes are controlled through use of as-manufactured materials (AP, Al), or through milling, sieving and sieve size analysis ($NaNO_3$). The formulation utilized a bimodal AP blend of 4:1 coarse/fine ratio (2/<90 µm). Propellant was mixed using a 6-quart dual planetary mixer. The propellant formulations used in this study are shown in Table 3. The binder system consisted of R45 monomer, isodecyl pelargonate (IDP) plasticizer, isophorone diisocyanate (IPDI) curative, and HX-878 (tepanol) bonding agent (RCS Rocket Motor Parts). Propellant was mixed for 1.5 hours in a planetary mixer and was deaerated at room temperature for 30 minutes at roughing vacuum pressure. Strands were cast using a polytetrafluoroethylene (PTFE) propellant strand mold and molds were placed in an explosion proof oven at 60° C. (140° F.) for seven days to cure. Packing densities of similarly manufactured propellants have been measured to be >95% of theoretical maximum density.

TABLE 3

Propellant formulations

| Formulation | Propellant Composition (wt. %) | | | | |
|---|---|---|---|---|---|
| | $NaNO_3$ (<75 µm) | cAP (200 µm) | fAP (<90 µm) | Al (30 µm) | HTPB |
| Al-AP-NaNO3 3.5% | 3.5 | 56.4 | 14.1 | 14.6 | 11.5 |
| Al-AP-NaNO3 1.0% | 1.0 | 57.8 | 14.4 | 14.9 | 11.9 |
| Al-AP-NaNO3 0.1% | 0.1 | 58.3 | 14.6 | 15.0 | 12.0 |
| Al-AP | 0.0 | 58.4 | 14.6 | 15.0 | 12.0 |
| AP | 0.0 | 70.4 | 17.6 | 0.0 | 12.0 |

B. Pulsed Microwave Cavity and Propellant Combustion

Figure 29:
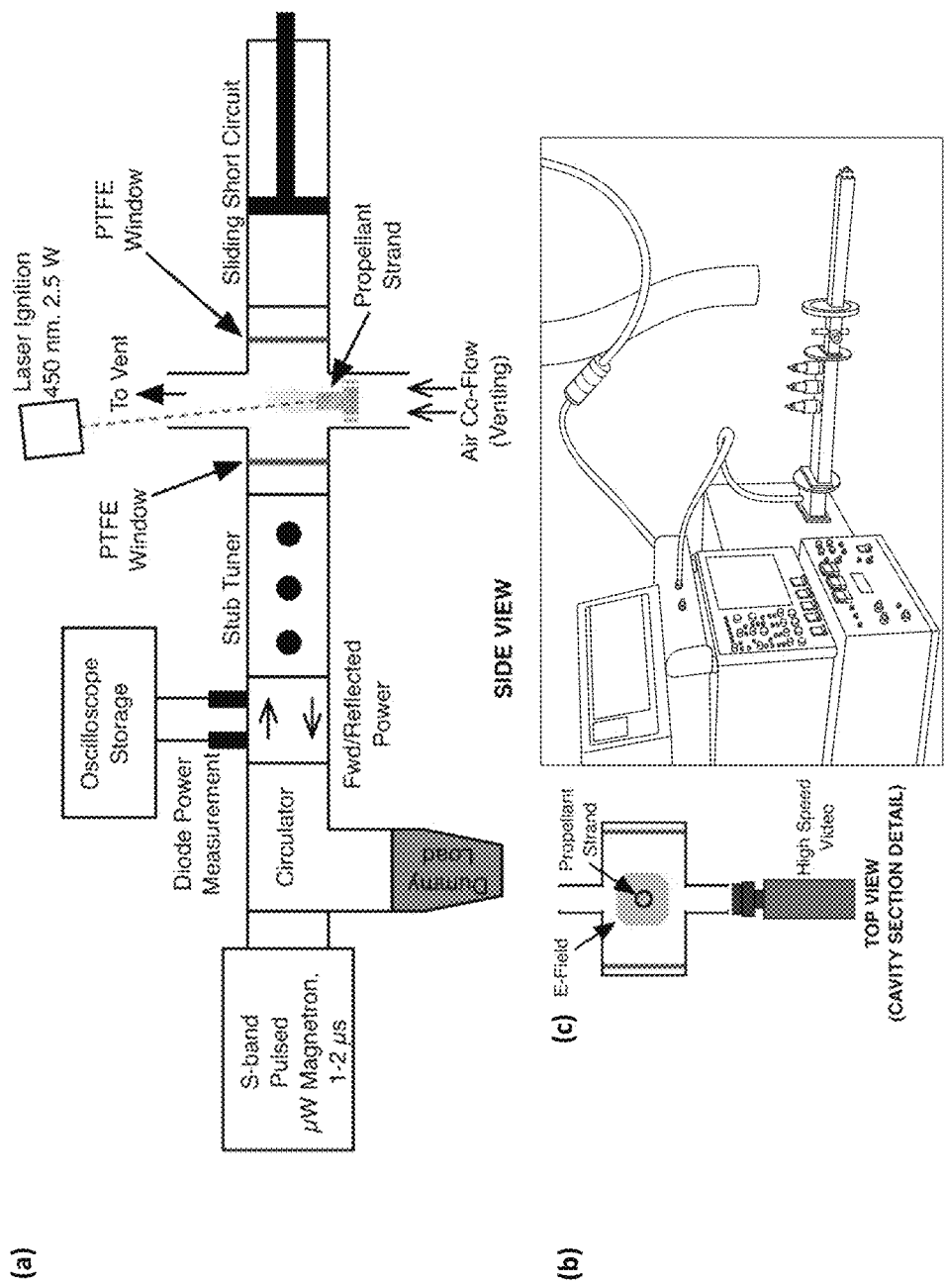
FIG. 29 are diagrams and a color photo of an experimental set up according to another exemplary embodiment of the present invention; here specifically using a pulsed microwave source.

A characterized, $TE_{10}$ mode microwave cavity was used to conduct experimental studies. The propellant strand was studied at in an E-field node at 1 atm in open atmosphere. A Pulsed Systems 3.00 GHz, 30 kW peak power microwave generator with a New Japan Radio S-band magnetron (M1302A) was used in the experimental setup. Pulse duration and repetition rate were set to 2 µs and 500 Hz, respectively (0.001 duty cycle). This pulse duration and duty cycle were used, as they were observed to produce significant microwave coupling. Power was transmitted to the propellant via a circulator, power coupler, three stub tuner, applicator section, and a sliding short (Gerling) (FIG. 29). The source was protected with a dummy load at the circulator return. The cavity was initially tuned using a candle flame, then tuned to the final position with a propellant flame. Ignition was achieved by 450 nm, 1.5 W laser irradiation of the propellant burning surface. During combustion of propellant, the test section had a slight negative pressure applied to vent products from the test section. Teflon microwave windows were placed within the waveguide, isolating the combustion test section as shown in FIG. 29, to protect the short and stub tuner from the gaseous and condensed propellant combustion products. During microwave irradiation, forward and reverse power measurements were made using Schottky diodes (Pasternack PE8003) to determine time-resolved microwave energy absorption of the propellant flame and the condensed phase. Diode measurements were acquired using an oscilloscope (Tektronix MS070404C) acquiring at 2.5 GS/s. Prior to use, diodes and the pulsed microwave source were calibrated by measurement of forward pulsed source average power using an Agilent E4418B average power meter. Diode response was then measured from the calibrated pulsed source. Typical diode voltages for experiments were between 500 and 300 mV, just below the linear response region of the diodes. The experimental data from the diode measurements was processed and converted into normalized absorptions using Eq. (1), where a is the normalized absorption, Fwd is the forward power, and Ref is reflected power. A Photron Fastcam S A-X2 with a Nikon 60 mm macro lens was used to capture high speed image sequences of the microwave pulse supported plasma enhancement of the propellant flame at 40,000 kHz and 10 μs exposure. A digital pulse delay generator (Berkeley Nucleonics) was used to trigger the microwave generator and high-speed camera to acquire video data of multiple, distinct plasma events during a combustion experiment.

$$\alpha = \frac{Fwd - Ref}{Fwd} \quad (1)$$

C. High Magnification Imaging Near Burning Surface

The experimental procedure used to conduct continuous wave (CW) microwave enhancement experiments is described in Barkley et al.[19] Here, a multimode microwave cavity connected to a 60 Hz modulated 2.45 GHz, 1 kW magnetron was used to conduct experimental studies. The location of a strong node in the cavity was determined using both experimental microwave power output measurement and simulation techniques. Briefly, a ~100 g load of distilled water having roughly the same shape and dimension as the propellant flame volume was heated for 30 s at the identified E-field node and resulting temperature rise was used to calculate average E-field strength at this location. A model of the microwave cavity in COMSOL Multiphysics 5.0 was used to simulate the average field strength. Results from both experimental and computational field strength measurement techniques were within 10% and indicate a field strength of ~7.0 kV/m at the testing location. Combustion of propellants was conducted at 1 atm and observed using high magnification video (Photron Fastcam S A-X2 with Infinity K2 microscope lens, 12,500 Hz) observed near burning surface interaction with Al particles.

See FIG. 29—(a) Diagram of optically accessible microwave cavity consisting of (from left to right) pulsed source, circulator, dummy load, forward/reflected diode power measurement, stub tuner, optically accessible propellant combustion cavity, and sliding short. (b) Top view detail of combustion cavity. (c) Photograph of pulsed microwave combustion cavity and supporting hardware.

III. RESULTS & DISCUSSION

A. Pulsed Microwave Energy Absorption

Figure 30:
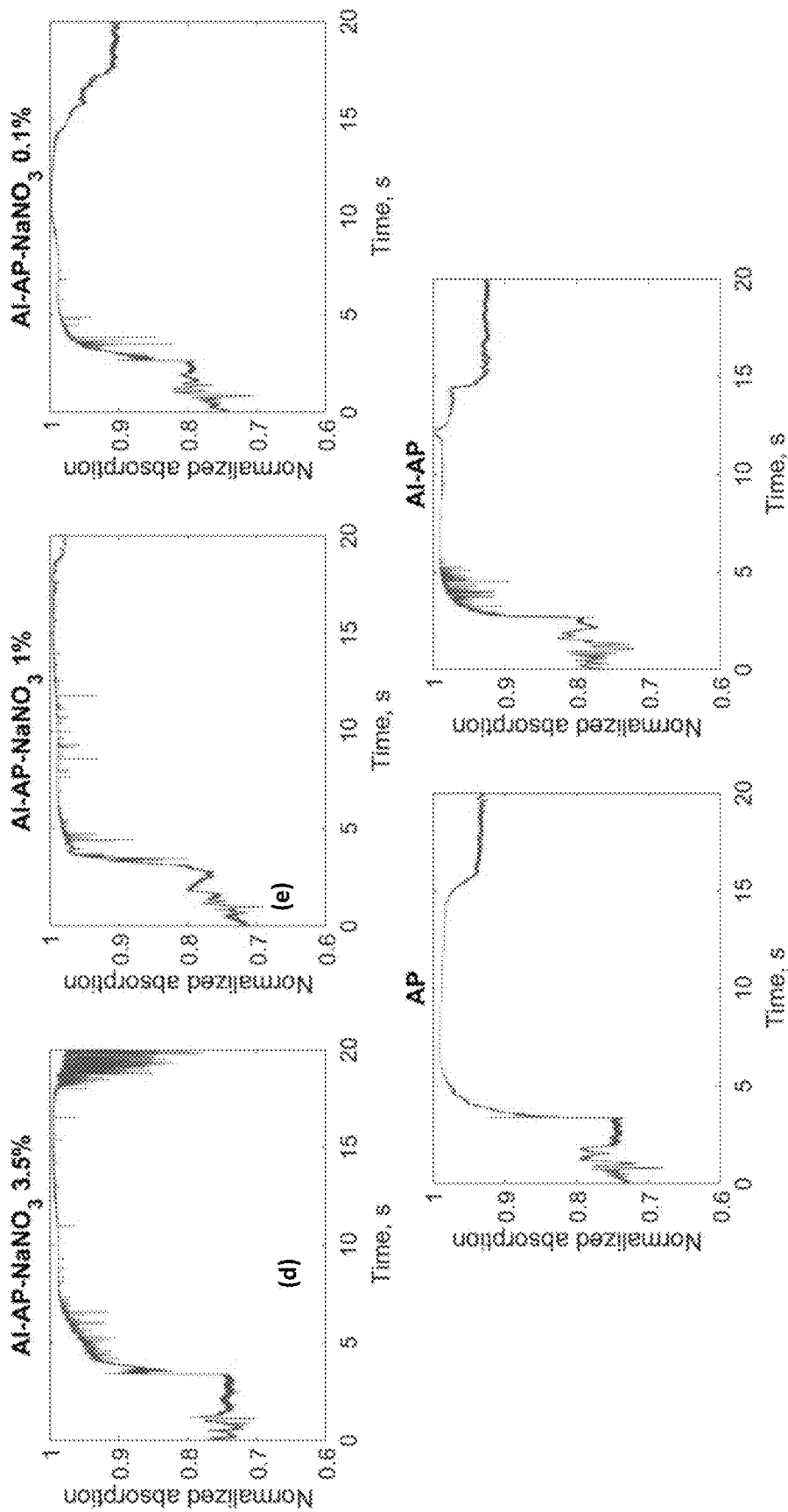
FIG. 30 are graphs related to microwave power absorption of burning propellants using the pulsed microwave set up of FIG. 29.

Forward and reflected power measurements taken during the pulsed application of a 2 μs duration application of a 30 kW, 3.0 GHz microwave pulse indicate significant microwave absorption of the flame occurs. For all propellant formulations, absorptions and coupling of the propellant flame is observed. In each of the propellant formulations, propellants with $NaNO_3$ absorbed more microwave energy during the propellant burn than compared with the non-doped aluminized AP composite propellant and AP composite propellant (FIG. 30). This is expected to be a result of sodium thermal ionization and subsequent free electron absorption. Within doped propellants, short duration excursions of lower absorption are observed, which may be a result of microwave reflection resulting from charge shielding effects in highly ionized plasmas. These effects appear slightly more prevalent in propellants containing higher $NaNO_3$ dopant levels of 3.5 and 1.0 wt. %.

Microwave absorption of undoped, aluminized propellant flames is similar to that of doped propellants at pulsed field strengths investigated. However, at lower power levels (field strengths), it is expected that energy absorption to aluminum oxide features becomes more important. In addition to the ionic absorption of $NaNO_3$-doped flames, (2) aluminum oxide dipolar absorption can be significant, as indicated by the strong temperature dependence of the alumina loss tangent. The dielectric losses increase exponentially with increase in temperatures due to electron promotion to valence shells.[20,21] At temperatures of 1500 K, aluminum oxide dielectric heating is 3000% more efficient than at room temperature, producing thermal runaway. The unaluminized AP propellant had a slightly lower absorption than aluminized doped and undoped propellants, which is expected to be a result of lower flame temperatures, absence of dopant, and absence of aluminum oxide which can absorb energy through dipole interactions.

Another mechanism for absorptions of microwave is condensed phase Maxwell-Wagner heating due to conductive spherical Al within a non-conductive matrix of AP and HTPB.[22] However, this is expected to be minimal based upon forward/reflected diode measurements conducted on an unignited propellant strand. Taken together, measurements indicate the microwave energy absorption of all the propellant formulations is high, indicating efficient energy deposition to a variety of propellant formulations can be achieved with pulsed, high peak power (field strength) microwave irradiation. It is expected that the various modes of energy absorption and doping are more important at lower field strength, as is indicated by previous results using continuous microwave irradiation.[23] See FIG. 30—Normalized microwave power absorption measurements of burning composite propellants in the microwave cavity excited by a 30 kW peak power, 3 GHz field applied with 2 μs pulse duration and 0.001 duty cycle.

B. Pulsed Microwave Energy Coupling and Relaxation

Figure 31:
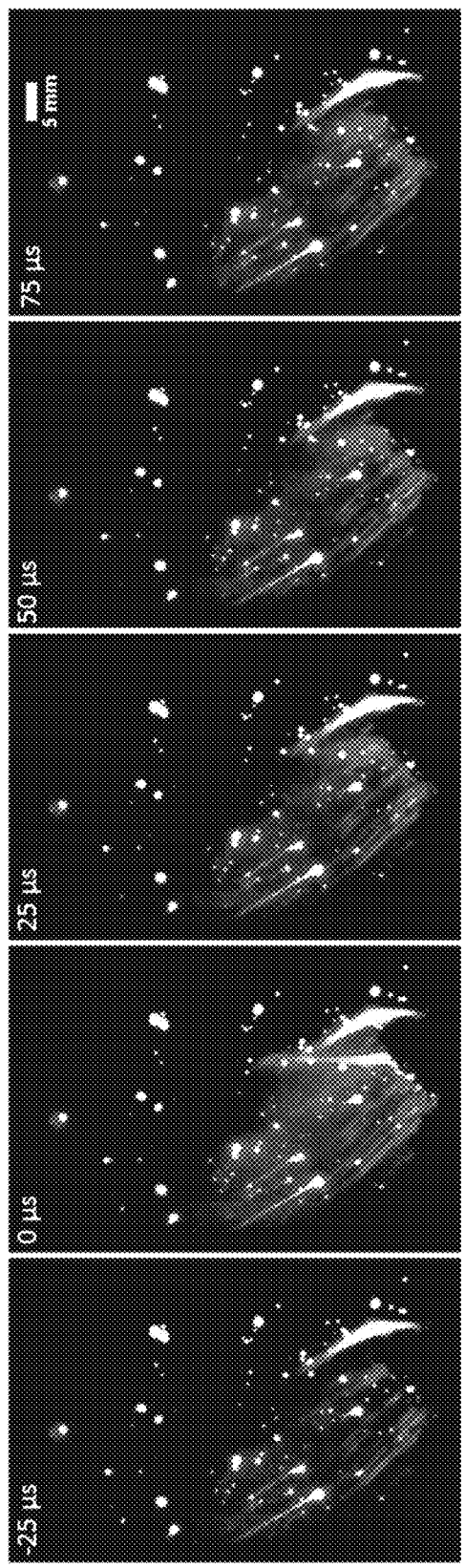
FIG. 31 is a color image sequence of flames of a sodium nitrate doped composite propellant burning under pulsed microwave irradiation (0 μs) in the experimental set up of FIG. 29.

To explore the combustion environment before, during, and after field application, high-speed imaging of the pulse-microwave seeding within a composite propellant flame has been conducted using the same 2 μs duration pulse with 500 Hz (0.001 duty cycle). Some evidence exists suggesting enhancement events from subsequent 2 μs duration pulses are independent events, including the extinction of aforementioned high ionization charge shielding effects during subsequent microwave pulses as well as pulse-to-pulse similarity of the power absorption over a number of pulses. An image sequence of a typical pre- to post-enhancement environment (40,000 kHz, 10 μs exposure) of the burning surface of a piece of composite propellant is shown in FIG. 31. Pulsed field application is observed to result in significant and rapid growth of emission at the burning surface (0 to 25 μs) accompanied by enhanced emission from the reaction zone attached to the burning surface and extending ~2.5 cm. Significant relaxation of the enhanced zone occurs within 25 μs as evident by the lack of persistent emission, though it is unclear whether some near-surface enhancement persists at the location of enhancement. As flame structure at the burning surface of a composite propellant is highly heterogeneous, containing both premixed and diffusion flames as well as heating/igniting aluminum particles as well as oxide smoke from burning Al agglomerates, the source of the significant and rapid emission enhancement remains unclear, but will be explored through experimentation on propellants having varying flame feature length scales and composition. The similarity of emission during pre- and post-field application times indicates the unique ability of pulsed microwave fields to rapidly perturb the near-burning surface flame structure of a composite propellant.

See FIG. 31—Image sequence showing microwave enhancement of the near-surface burning structure of an aluminized AP composite solid propellant by a 30 kW peak power, 2 μs, 500 Hz pulse of 3.00 GHz energy transmitted in a tuned resonant cavity. Application of the field occurs at approximately 0 μs. Frame rate and exposure duration are 40,000 kHz and 10 μs, respectively. False color is used to indicate emission intensity differences.

Figure 32:
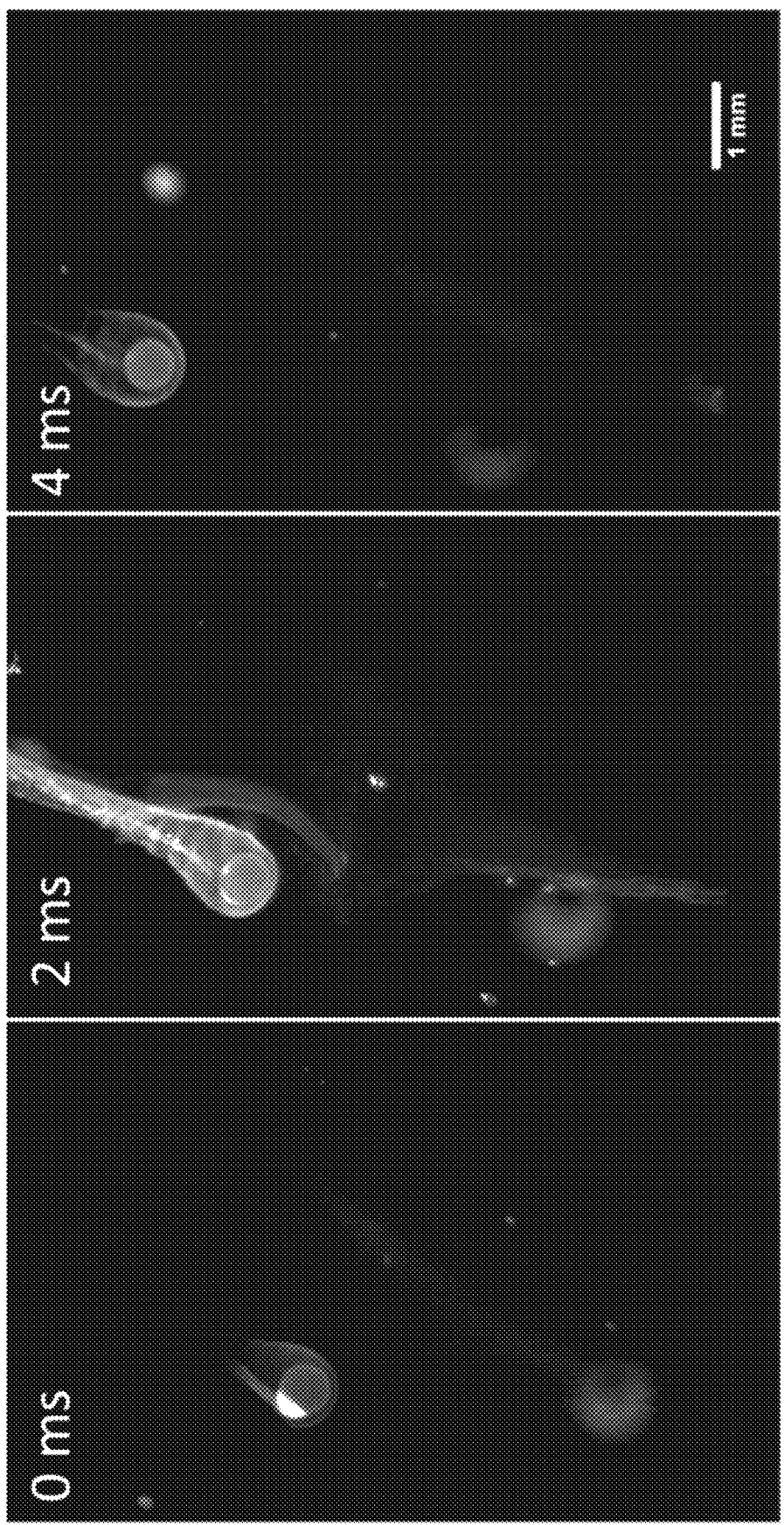
FIG. 32 are magnified images of the microwave combustion enhancement of an aluminum agglomerate near the propellant surface with application of a microwave field (0 ms) within the set-up of FIG. 1.

C. Near Burning Surface Aluminum Combustion Enhancement under Continuous Microwave Irradiation During plasma enhancement of the aluminized AP composite propellant is irradiated by 1 kW, 2.45 GHz continuous wave energy within a multimode cavity. A high magnification backlit image sequence is shown in FIG. 32. A 2 ms, the microwave modulation on results in energy deposition to high temperature aluminum oxide features near burning Al agglomerates, causing an increase in emission as a result of oxide heating caused by the aforementioned temperature enhanced dielectric absorption of aluminum. Local temperatures of the propellant flame are highest near burning Al agglomerates due to the high combustion temperature of the aluminum diffusion flame. In previous efforts investigating the effects of CW microwave irradiation of doped propellants, [24] plasma kernel formation has been frequently observed to occur at aluminum particles as a result of favorable sodium thermal ionization conditions in these high temperature regions. Previous studies in CW cavities additionally showed improved plasma formation occurring in propellant formulations containing both aluminum and NaNO$_3$ dopant. As a result, dielectric absorption within aluminum oxide features and electronic absorption due to sodium thermal ionization are expected to be synergistic.

See FIG. 32—High-speed imaging near the burning surface of aluminum agglomerate combustion occurring with application of a CW microwave field. The first image is pre-modulation of the field. At 2 ms, the microwave field is modulated on, causing an increase in emission intensity of aluminum oxide features of the Al diffusion flame. At 4 ms, (post-modulation of the field), the Al particle flame structure thermally relaxes.

IV. CONCLUSIONS

The work demonstrates the ability to rapidly perturb the combustion of an aluminized AP composite propellant using pulsed microwave field application to sodium nitrate-doped propellants which previously have been observed to exhibit flame temperature and burning rate enhancement under continuous S-band microwave irradiation. Measurements of forward and reflected power during application of 2 μs duration 30 kW fields suggest microwave energy absorption to the propellant flame is significant for all formulations. High-speed imaging during pulse applications demonstrates energy deposition occurs rapidly near/at the propellant burning surface as indicated by significant gas phase emission enhancement. Emission relaxation of plasma events occurs rapidly, with little residual emission enhancement observed after 25 μs. While the particular mechanism responsible for emission enhancement at the burning surface remains unknown, separate experiments conducted using 1 kW continuous irradiation of a burning propellant indicate significant microwave enhancement of the flame structure of burning aluminum agglomerates occurs, indicating thermal enhancement of the diffusion combustion/product zone of aluminum agglomerates. These findings suggest aluminum combustion may be an important mechanism through which near-burning surface pulsed microwave enhancement can occur. More experiments are required to investigate near burning surface combustion enhancement mechanisms and pulse/post-pulse thermal environments. This effort demonstrates pulse microwave techniques can significantly and rapidly perturb (enhance) burning surface propellant flame structure. With respect to propulsion devices, pulse techniques may hold promise to enable dynamic enhancement and control of motor thrust, burning rate, and combustion stabilization.

V. REFERENCES

[1] Chakravarthy, S. R., Seitzman, J. M., Price, E. W., and Sigman, R. K., "Intermittent Burning of Ammonium Perchlorate-Hydrocarbon Binder Monomodal Matrixes, Sandwiches, and Propellants," *Journal of Propulsion and Power*, vol. 20, 2012, pp. 101-109.

[2] Parr, T., and Hanson-Parr, D., "Optical Diagnostics of Solid-Propellant Flame Structures," *Solid Propellant Chemistry, Combustion, and Motor Interior Ballistics*, V. Yang, T. B. Brill, and W. Ren, eds., Reston, Va.: 2000, pp. 381-411.

[3] Culick, F. E. C., *Unsteady Motions in Combustion Chambers for Propulsion Systems*, NATO Research and Technology Organization Report AG-AVT-039, 2006.

[4] Sawka, W. N., Katzakian, A., and Grix, C., "Solid State Digital Propulsion Cluster Thrusters for Small Satellites Using High Performance Electrically Controlled Extinguishable Solid Propellants," *The Annual AIAA USU Conference on Small Sattelites*, 2005, pp. 1-7, SSC05-XI-3.

[5] Li, J., Litzinger, T. A., and Thynell, S. T., "Plasma Ignition and Combustion of JA2 Propellant," *J. Propul. Power*, vol. 21, 2005, pp. 44-53.

[6] Li, J., Litzinger, T. A., Das, M., and Thynell, S. T., "Recombination of electrothermal plasma and decomposition of plasma-exposed propellants," *Journal of Propulsion and Power*, vol. 22, 2006, pp. 1353-1361.

[7] Porwitzky, A. J., Keidar, M., and Boyd, I. D., "On the Mechanism of Energy Transfer in the Plasma-Propellant Interaction," *Propellants Explosives Pyrotechnics*, vol. 32, 2007, pp. 385-391.

[8] Yong, J., and Baoming, L., "Calculation of Plasma Radiation in Electrothermal-Chemical Launcher," *Plasma Science and Technology*, vol. 16, 2014, pp. 50-53.

[9] Li, X., Li, R., Jia, S., and Zhang, Y., "Interaction features of different propellants under plasma impingement," *Journal of Applied Physics*, vol. 112, 2012, p. 063303.

[10] Alimi, R., and Berdichevsky, V., "Mechanism of solid propellant combustion submitted to a high plasma flux," *Propellants, Explosives, Pyrotechnics*, vol. 33, 2008, pp. 118-121.

[11] Porwitzky, A. J., Scalabrin, L. C., Keidar, M., and Boyd, I. D., "Chemically reacting plasma jet expansion simulation for application to electrothermal chemical guns," 16th *Plasmadynamics Lasers Conference*, Miami Fla.: 2007, pp. 1-17, AIAA 2007-4600.

[12] Michael, J. B., Dogariu, A., Shneider, M. N., and Miles, R. B., "Subcritical microwave coupling to femtosecond and picosecond laser ionization for localized, multipoint ignition of methane/air mixtures," *Journal of Applied Physics*, vol. 108, 2010, p. 093308.

[13] Popović, S., Exton, R. J., and Herring, G. C., "Transition from diffuse to filamentary domain in a 9.5 GHz microwave-induced surface discharge," *Applied Physics Letters*, vol. 87, 2005, p. 061502.

[14] Esakov, I. I., Grachev, L. P., Khodataev, K. V., Bychkov, V. L., and vanWie, D. M., "Surface Discharge in a Microwave Beam," *IEEE Transactions on Plasma Science*, vol. 35, 2007, pp. 1658-1663.

[15] Barker, P. F., McAndrew, B., Macheret, S. O., and Miles, R. B., "Control of sub-critical microwave filamentary plasma in dense gases," *IEEE ICOPS*, New Orleans, La.:, 2000, p. 158.

[16] Hasue, K., Tanabe, M., and Watanabe, N., "Initiation of some energetic materials by microwave heating," *Propellants, Explosives, Pyrotechnics*, vol. 15, 1990, pp. 181-186.

[17] Daily, M. E., Glover, B. B., Son, S. F., and Groven, L. J., "X-Band Microwave Properties and Ignition Predictions of Neat Explosives," *Propellants Explosives Pyrotechnics*, vol. 38, 2013, pp. 810-817.

[18] J. Lynch, Manny Ballestro, S. J. Barkley, R. Cazin, J. B. Michael, T. R. Sippel., "Microwave-Supported Plasma Combustion Enhancement of Composite Solid Propellants Using Alkali Metal Dopants,"*AIAA Aerospace Sciences Meeting*, San Diego Calif.: Jan. 5, 2016.

[19] S. J. Barkley, K. Zhu, J. B. Michael, T. R. Sippel, "Microwave Seeded Plasma Enhancement of Composite Propellant Flame Temperature," 52*nd AIAA/SAE/ASEE Joint Propulsion Conference*, Salt Lake City, Utah: Jun. 27, 2016

[20] Kenkre, V. M., Skala, L., Weiser, M. W., and Katz, J. D., "Theory of Microwave Interactions in Ceramic Materials: the Phenomenon of Thermal Runaway," Journal of Materials Science, vol. 26, 1991, pp. 2483-2489.

[21] Sutton, W. H., "Microwave Processing of Ceramic Materials," American Ceramic Society Bulletin, vol. 68, 1989, pp. 376-386.

[22] Metaxas, A. C., and Meredith, R. J., Industrial microwave heating, London, UK: P. Peregrinu, 1983.

[23] Barkley, S., Zhu, K., Lynch, J., Ballestero, M., Michael, J., and Sippel, T. R., "Microwave-Supported Plasma Combustion Enhancement of Composite Solid Propellants Using Alkali Metal Dopants," 54th AIAA Aerospace Sciences Meeting, February 2016.

[24] Barkley, S. J., Zhu, K., Ballestero, M., Michael, J., and Sippel, T. R., "Measurements of Dielectric Properties of Condensed Phase Aluminized Composite Propellants," 52nd AIAA/SAE/ASEE Joint Propulsion Conference, 2016.

A. Options/Alternatives

As previously mentioned, variations are possible with respect to the invention. Variations obvious to those skilled in the technical field are included within the invention which is not limited by the examples described herein.

Some of those examples have been discussed. It is envisioned that variations in the propellant composition, microwave source and operation, and other factors will be developed that will provide additional options or alternatives for the invention in the future.

Below are some further examples of options and alternatives related to one or more aspects of the invention:

Applications. As mentioned, aspects of the invention are envisioned to be applied to functioning machines. One example is a rocket motor such as FIGS. 10, 12-13. An aspect of the invention includes control of burning rate (including extinguishment). FIG. 12 refers to a throttleable thruster. FIG. 13 shows solid propellant applications on a bigger scale to which aspects of the invention might be applied. Aspects of the invention could be to control burning rate with microwave operation in the context of periodically operated rocket thrusters. But as indicated elsewhere, aspects of the invention can be applied to other combustion/propulsion systems. For example, the technique is easily applied to other classes of non-composite solid propellants such as double base, triple base, and composite-modified double base propellants. Additionally, doping and/or microwave plasma techniques can be utilized within liquid fuels of a liquid rocket engine or air-breathing combustors in order to enhance performance and, with application to liquid rocket engines, to damping-stabilize catastrophic combustion instabilities that may occur during normal engine operation. Additionally, doping and/or microwave plasma techniques may be applied to solid fuel grain hybrid rocket engine and ramjet engines in order to enhance fuel regression rates and enhance combustion performance. The technique may also be applied to pyrotechnic formulations either already containing substantial quantities of an alkali earth metal or through use of a dopant in order to enhance regression rate, luminous intensity, and to enable combustion control. The described microwave-plasma enhancement technique may also be used in research and development settings, where the technique innately enables oscillatory control over the burning rate, pressure, and flame temperature within a variety of combustion devices (solid, liquid, hybrid, ramjet) and pyrotechnics. See FIG. 11 for such a lab set-up. Gaining a better understanding of how doping, microwave seeding, and interoperability of the two can lead to other applications.

Propellant formulations. FIGS. 14 and 15 illustrate one non-limiting form.

As microwave energy is electromagnetic energy, aspects of the invention can be applied in analogous ways with other forms of electromagnetic energy. One non-limiting example is radio frequency. Other frequencies are possible. Techniques to generate electromagnetic energy of frequencies other than microwave are known to those skilled in the art.

It is to be understood that different phase states of fuels are possible. Solid propellants are one. Liquid phase is another.

What is claimed is:

1. A method for modifying multiphase diffusion combustion flames produced from decomposition or volatilization of an energetic material, wherein the energetic material is a solid energetic material or a liquid energetic material, the method comprising:
   a. localizing application of an electromagnetic energy to the multiphase diffusion combustion flames to thereby increase ionization in the multiphase diffusion combustion flames compared to ionization from combustion of the energetic material without the localizing application of the electromagnetic energy, wherein the electromagnetic energy comprises:

a microwave energy of a pulsed mode, wherein the pulsed mode comprises pulse width modulation (PWM) of 5 µs pulse duration of a multimode 1 kW average continuous power 1-4 GHz S-band or 8-12 GHz X-band microwave source with 100 kW peak power;

and b. controlling coupling of the electromagnetic energy to the multiphase diffusion combustion flames by mode and power to modify a decomposition rate of the solid energetic material or a volatilization rate of the liquid energetic material to thereby perturb combustion from an equilibrium state.

2. The method of claim 1 wherein the energetic material comprises one of:
  a. a solid propellant doped with an ionization enhancer;
  b. an undoped solid propellant; and
  c. a liquid fuel adapted for mixing with a liquid or gaseous oxidizer.

3. The method of claim 2 wherein the ionizing enhancer comprises an alkali metal.

4. The method of claim 2 wherein the ionizing enhancer comprises:
  a. an atomic form of: lithium, sodium, potassium, rubidium, cesium, aluminum, calcium, gallium, silicon, titanium, chromium, manganese, boron, nickel, copper, tantalum, or bismuth;
  b. an alloy of: lithium, sodium, potassium, rubidium, cesium, aluminum, calcium, gallium, silicon, titanium, chromium, manganese, boron, nickel, copper, tantalum, or bismuth;
  c. salts, nitrates, perchlorates, chlorates, sulfates, or persulfates including any of: lithium, sodium, potassium, rubidium, cesium, aluminum, calcium, gallium, silicon, titanium, chromium, manganese, boron, nickel, copper, tantalum, or bismuth; or
  d. cocrystals of which at least one component comprises a molecule containing atoms of any of: lithium, sodium, potassium, rubidium, cesium, aluminum, calcium, gallium, silicon, titanium, chromium, manganese, boron, nickel, copper, tantalum, or bismuth.

5. The method of claim 2 wherein the ionizing enhancer comprises a composite solid propellant comprising $NaNO_3$ combined with:
  a. HTPB, PBAN, nitrocellulose, GAP, nylon, or polystyrene; and
  b. one or more of ammonium perchlorate (AP), RDX, HMX, CL-20, and ammonium nitrate.

6. The method of claim 5 wherein the composite solid propellant comprises:
  a. $NaNO_3$ at 3.5 to 16 wt. %;
  b. AP at 40 to 90 wt. %;
  c. HTPB at 10 to 20 wt. %; and
  d. Al at 0 to 25 wt. %.

7. The method of claim 5, wherein the composite solid propellant is formed into:
  a. strands;
  b. cylinders;
  c. motor segments of a multi-ported geometry; or
  d. end burning propellant grains.

8. The method of claim 1 wherein the energetic material comprises;
  a. a solid propellant containing a granular fuel, an oxidizer, and a binder;
  b. a solid propellant containing a granular oxidizer and a binder;
  c. a solid propellant containing a granular fuel and granular oxidizer particles of average particle sizes ranging from 10 pm to 800 pm;
  d. a solid propellant containing a granular fuel and/or an oxidizer and an energetic binder;
  e. a ramjet fuel grain containing a granular fuel and energetic or non-energetic granules and/or a binder;
  f. a hybrid propellant containing a solid fuel adapted for oxidation by a liquid oxidizer or a gaseous oxidizer;
  g. a liquid rocket propellant containing a liquid fuel and a liquid oxidizer; or
  h. a liquid fuel adapted for oxidation by a gaseous oxidizer.

9. The method of claim 1 wherein the energetic material is a propellant comprising:
  a. an alkali metal doped composite modified double base propellant,
  b. an alkali metal doped triple base solid propellant;
  c. an alkali metal doped hybrid rocket propellant; or
  d. an alkali metal doped liquid fuel.

10. The method of claim 1, wherein the electromagnetic energy is generated by an electromagnetic energy source comprising a magnetron having an output into a wave guide cavity containing the energetic material.

11. The method of claim 10 further comprising one or more of:
  a. controlling a duty cycle of the electromagnetic energy source to: enhance coupling with the multiphase diffusion combustion flames of the energetic material, control of plasma growth, or reduce parasitic loss;
  b. actively damping out growth of combustion instabilities;
  c. actively inducing combustion instabilities;
  d. increasing burning rate;
  e. enhancement of flame temperature; and
  f. extinguishing of the combustion through impulsive, microwave-induced change in an energy release rate from the multiphase diffusion combustion flames.

12. The method of claim 1 further comprising:
  a. providing the energetic material in the form of a solid propellant;
  b. placing the solid propellant in a combustion chamber;
  c. providing a source of electromagnetic energy;
  d. providing a guide for the electromagnetic energy to the solid propellant during combustion; and
  e. controlling the electromagnetic energy to increase a burning rate of the energetic material.

13. The method of claim 12 wherein the solid propellant comprises an alkali metal doped propellant.

14. The method of claim 12, wherein the combustion chamber comprises a tunable resonant electromagnetic cavity for the electromagnetic energy.

15. The method of claim 14 wherein the source of electromagnetic energy is a magnetron and the guide for the electromagnetic energy includes the tunable resonant electromagnetic cavity.

16. The method of claim 15 further comprising providing a driving circuit and a tuning mechanism for the magnetron.

17. The method of claim 12 wherein the combustion chamber is the combustion chamber of:
  a. a solid rocket motor;
  b. a hybrid rocket motor;
  c. a ramjet thruster; or
  d. a liquid rocket engine.

18. The method of claim 5 further comprising one or more of:
  a. an additive comprising aluminum, boron, or silicon; and
  b. an additive comprising iron oxide, lithium oxide, or titanium oxide.

19. The method of claim 5 wherein the energetic material includes one of:
  a. a single base propellant system; or
  b. a double base propellant system.

* * * * *